US012701107B1

(12) United States Patent
Layton et al.

(10) Patent No.: US 12,701,107 B1
(45) Date of Patent: *Aug. 4, 2026

(54) SYSTEM AND METHOD FOR CRYPTOLOGICALLY TETHERING USER DEVICES TO ONE ANOTHER IN ADAPTABLE MANNER FOR TRUSTED COMMUNICATION ACROSS UNTRUSTED NETWORK

(71) Applicant: The Government of the United States as represented by the Director, National Security Agency, Ft. George G. Meade, MD (US)

(72) Inventors: William J. Layton, Sykesville, MD (US); Andrew H. White, Catonsville, MD (US)

(73) Assignee: The Government of the United States as represented by the Director, National Security Agency, Ft. George G. Meade, MD (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/958,369

(22) Filed: Nov. 25, 2024

Related U.S. Application Data

(63) Continuation of application No. 17/894,855, filed on Aug. 24, 2022, now Pat. No. 12,199,958.

(51) Int. Cl.
*H04L 9/40* (2022.01)

(52) U.S. Cl.
CPC ...... *H04L 63/0435* (2013.01); *H04L 63/0414* (2013.01); *H04L 63/062* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 6,253,321 B1 | 6/2001 | Nikander et al. |
| 6,922,774 B2 | 7/2005 | Meushaw et al. |
| 7,712,143 B2 | 5/2010 | Comlekoglu |
| 7,809,955 B2 | 10/2010 | Comlekoglu |

(Continued)

*Primary Examiner* — Atta Khan

(57) ABSTRACT

A high assurance system provides for communication between trusted user devices with auxiliary adaptation for augmenting communication security across an untrusted environment. First and second main encrypting devices coupled to respective trusted user devices are cryptologically tethered to one another by a main communication link established across the untrusted environment between trusted user devices in cryptologically protected manner. An auxiliary encrypting device is cryptologically tethered to the first main encrypting device by an auxiliary communication link established across the untrusted environment between a trusted auxiliary device and one trusted user device in cryptologically protected manner. The main and auxiliary encrypting devices define portals traverse trust boundaries between trusted and untrusted environments, each including at least one encryption unit and a communication unit coupled thereto by a connectionless interconnect. The encryption unit encrypts and decrypts message data, while the communication unit transmits and receives encrypted message data through the communication links.

20 Claims, 30 Drawing Sheets

(56)         References Cited

U.S. PATENT DOCUMENTS

| 10,630,467 | B1 | 4/2020 | Gilbert et al. | |
| 11,095,610 | B2 * | 8/2021 | Gilbert | H04L 63/1408 |
| 11,405,189 | B1 * | 8/2022 | Bennison | H04L 9/083 |
| 11,588,798 | B1 * | 2/2023 | Cline | H04L 63/0272 |
| 11,677,545 | B2 * | 6/2023 | Ladd | H04L 9/0841 |
| | | | | 713/153 |
| 11,689,359 | B2 | 6/2023 | Gilbert et al. | |
| 2004/0158706 | A1 * | 8/2004 | Moritomo | H04L 63/0464 |
| | | | | 713/153 |
| 2008/0016344 | A1 * | 1/2008 | Holden | H04L 63/061 |
| | | | | 713/166 |
| 2012/0201383 | A1 * | 8/2012 | Matsuo | H04L 9/12 |
| | | | | 380/255 |

\* cited by examiner

Trusted Infrastructure (red dots)
distributed by PFED across
Untrusted infrastructure (black)

SYSTEM AND METHOD FOR CRYPTOLOGICALLY TETHERING USER DEVICES TO ONE ANOTHER IN ADAPTABLE MANNER FOR TRUSTED COMMUNICATION ACROSS UNTRUSTED NETWORK

CROSS REFERENCE TO RELATED APPLICATIONS

This application is a continuation of patent application Ser. No. 17/894,855, filed Aug. 24, 2022, having the title "System and Method for Cryptologically Tethering User Devices To One Another In Adaptable Manner for Trusted Communication Across Untrusted Network," currently pending, the contents of which are hereby incorporated by reference herein in their entirety.

FIELD OF THE INVENTION

The present invention is generally directed to preserving the integrity of communications between various user devices operating respectively within trusted, or cryptologically secured, environments across a communication network outside those trusted environments. That is, the present invention is generally directed to maintaining the cryptologically secured integrity of communications between the user devices by cryptologically tethering them together to establish a trusted communication link extending across a communication network that may not be sufficiently secured against cryptologic compromise to be trusted. More specifically, the present invention is directed to a system and method employing paired encrypting devices for cryptologically tethering one trusted device with another in adaptable manner for secure communication through a main communication link established therebetween across an untrusted network. The system and method in certain applications provide for functional adaptation through an auxiliary communication link established between encrypting devices for the trusted device and an auxiliary device. The system and method in certain applications provide for functional adaptation through optimal selection from multiple communication links to be established between encrypting devices for different trusted devices. Security and reliability of communications between trusted devices across an untrusted communication network are thereby augmented.

BACKGROUND OF THE INVENTION

In so called high assurance systems known in the art, data transmitted between devices must remain secure against cyberattack under practically all operating conditions. Effectively and reliably preserving the integrity of such high assurance systems over extended periods of use, and in a manner that adapts to changing computer and network technologies, remains an ongoing challenge in the art.

In high assurance systems, isolation between trusted and untrusted environments is maintained by a cryptographic trust boundary established by one or more suitable cryptographic engines. Any data leaving a network or other established environment that is trusted must pass through a suitable cryptographic engine. Likewise, any data entering the trusted network must pass through such cryptographic engine. Any flow of data between the trusted and untrusted networks in bypass of the cryptographic engine would then be identified as a breach. Such breach may be caused intentionally or unintentionally.

Among other things, high assurance systems require thorough analysis of all communications passing between trusted and untrusted networks. This requires clear delineation of the trust boundary between trusted and untrusted networks in order to effectively validate isolation and accurately certify appropriate assurance levels for a given system design or implementation. High assurance systems also require multiple countermeasures that must be overcome for any information on the trusted network to be compromised, necessitating more than a single event for breach of the trust boundary.

Cryptographic engines employed by high assurance systems known in the art generally include three types: 1) software-based, 2) dedicated hardware, and 3) software-hardware hybrid. A software-based engine generally includes cryptographic software executed within an operating system running on a conventional microprocessor (e.g. Windows on an x86-based computer using transport layer security (TLS) in a browser or networking with a VPN). A dedicated hardware engine provides for hardware (e.g. an ASIC or FPGA) programmably configured to carry out specific cryptographic functions. A software-hardware hybrid engine provides for limited-purpose software to perform dedicated tasks on hardware such as a microcontroller (e.g. Arduino). The microcontroller runs one or more dedicated programs and typically does not include an operating system.

A hybrid engine may, for example, utilize such platforms as an FPGA, ASIC, or the like known in the art to provide physical isolation between the trusted and untrusted environments. Unlike a dedicated hardware model, an FPGA/ASIC retains programmability and therefore may be customized to perform specific operations. In addition, an FPGA/ASIC is typically powerful enough to do high strength cryptography. Custom built hardware such as an FPGA could allow one to claim complete knowledge of what went into the logic (and didn't) as it may be built from the ground up by trusted developers. In addition, FPGA/ASIC logic may be designed to perform unique custom operations not typically available with a conventional CPU.

Each cryptographic engine type has strengths and weaknesses, and the selection of cryptographic engine type may be determined based on the requirements of the particularly intended application. Historically, the overall cost of producing a certified high-assurance implementation within a given IT ecosystem has tended to be costly and lengthy. Maintaining high-assurance certification despite unavoidable evolution of the IT ecosystem remains an ongoing challenge. Vendors typically create solutions from the ground up using complex, expensive technologies. Evaluators must keep abreast of many varied implementations thoroughly enough to certify that solutions will survive the test of time. This does not scale well and creates a perverse incentive to lock in yesterday's technology given the heavy lift needed to stay technologically current while remaining high-assurance certified.

Active cryptologic key management is necessary as the number of devices invariably grows in many systems. Keys and certificates must be securely created, delivered, updated, revoked, and validated throughout the relatively long timeframes over which systems must remain operational. Creating the infrastructure required to manage keys securely is costly, and operating the infrastructure adds sustainment costs for users.

Given such high (sunk) cost of high assurance devices, users are reluctant to refresh them more frequently. This perpetuates a costly support tail for both the users and the vendors as the lifecycle extends out over decades due to factors like limited availability of parts. High assurance crypto gear is therefore not readily disposable.

For all of the foregoing reasons, high assurance cryptography remains difficult to achieve for vendors, evaluators, and users. Low cost, ease of use, sustainability, and high performance are difficult to realize in a single standalone package. Factoring in the size, weight and power (SWAP) requirements that mobile applications normally demand makes high assurance cryptography even more difficult to achieve in practice. Once high assurance cryptography is achieved for a given system, therefore, suitable measures are needed to preserve the same.

An example of a mobile use application in which high assurance is desired is a mobile phone. Stock commercial mobile devices fail as high assurance devices because the radios associated with the mobile phone is built within the trusted boundary. Radios host and run an extensive amount of software (often millions of lines of C code), most of which has unknown provenance and is directly accessible from the untrusted network, all of which has access to the rest of the device, and none of which has been seriously analyzed from a high-assurance failure point of view. The radio package is not under the control of the user. The radio's implementation is dictated by the device manufacturer, the radio's chipset manufacturer, and the network operator(s). The radio may or may not be protected by a security feature, and its underlying implementation can be changed at any time, often remotely and outside of the user's awareness or control. The radio is highly privileged and has direct connectivity to many other modules on the phone. Even if a radio is physically separate, it will remain logically connected (thus trusted) to other parts of the platform to maintain low cost, flexibility, and positive user experience.

Furthermore, integrated measures such as the addition of traditional FPGA encryption modules by the vendor to safely isolate the rest of the platform, where critical user data is stored, from the potentially toxic radio subsystem tends to be undesirable because FPGA's are power hungry, large, and run hot. Any security benefit provided by a radio of a conventional off-the-shelf device is therefore typically incidental. No software code of any appreciable size within such conventional off-the-shelf radio heretofore known has been fully immune from exploitation. Worse, a failure within radio software may be readily leveraged to an immediate compromise of the whole device because the radio subsystem is a highly privileged and trusted part of a platform required to work with other parts of the platform such as the power management subsystem, the application processor, and the like in order to deliver a competitively positive user experience.

Widely available mobile communication devices like mobile smart phones may be used as trusted end user devices in a given system, but may be easily misplaced, lost, or stolen. In the wrong hands, such mobile communication devices could be used to undermine a system's trusted environment. Auxiliary measures may be employed to augment device security by preventing the exploitation of trusted devices in the event of such mishaps. Examples of auxiliary measures in this regard include applying a convenient and independent factor to activate/enable mobile communication devices for operation to enhance device security. But known factors like hardware keys and tokens require either physical connection to the trusted device, or unprotected wireless communication therewith. Whereas physical connection may subject the added factor to misplacement or loss along with the trusted device, unprotected wireless communication may breach the trust boundary or expose the same to breach.

Other auxiliary measures may be employed to augment security less directly. For example, measures may be employed to provide for safe yet conveniently access to a trusted device for adjustment, reconfiguration, or other adaptation of that trusted devices. In certain cases, such auxiliary measures may be locally coupled to a trusted device within the confines of its trusted environment. In cases where that is not possible, however, coupling auxiliary measures disposed outside the trusted environment with the trusted device for unprotected wireless communication therewith would also breach the trust boundary or expose the same to breach.

Hence, there is a need to augment the security and reliability of communication between trusted devices in a high assurance system. There is a need for measures by which communication between trusted devices may be securely established through an untrusted network. There is also need for measures by which the security of this communication may be preserved by safely yet conveniently adapting the system to suit a given application. There is a need for such measures which may be employed without breaching a trust boundary between trusted and untrusted networks or exposing the same to breach.

SUMMARY OF THE INVENTION

It is an object of the present invention to augment the security and reliability of communication between trusted devices in a high assurance system.

It is another object of the present invention to preserve the security and reliability of communication between trusted devices through a cryptologically tethered link established across an intervening untrusted environment.

It is yet another object of the present invention to provide selective adaptation of the high assurance system to preserve the security and reliability of communication between trusted devices across an untrusted communication network.

These and other objectives are attained by a high assurance system provided in accordance with certain embodiments of the present invention for maintaining secure communication between trusted user devices in adaptable manner across an untrusted environment. The system includes first and second main encrypting devices respectively coupled to the trusted user devices. The first and second main encrypting devices are cryptologically tethered to one another by a main communication link established exclusively therebetween to traverse the untrusted environment in cryptologically protected manner. At least one auxiliary encrypting device is coupled to a trusted auxiliary device. The auxiliary encrypting device is cryptologically tethered to the first main encrypting device by an auxiliary communication link established exclusively therebetween to traverse the untrusted environment between one of the trusted user devices and the trusted auxiliary device in cryptologically protected manner. Each of the main and auxiliary encrypting devices defines a portal for traversing a trust boundary between trusted and untrusted environments. Each of the main and auxiliary encrypting devices includes at least one encryption unit configured to encrypt message data for transmission and decrypt received encrypted message data, and at least one communication unit coupled to the encryption unit by a connectionless interconnect, the communication unit being configured to transmit and receive encrypted message data through a corresponding one of said main and auxiliary communication links.

In accordance with certain other embodiments, a trusted system is provided for cryptologically secured communication in adaptable manner between remotely disposed trusted devices operating within respective trusted environments separated by an untrusted environment. The trusted system includes a plurality of encrypting devices respectively coupled to different trusted devices, corresponding ones of the encrypting devices being mutually paired to establish a uniquely dedicated communication link therebetween across the untrusted environment. The encrypting devices are thereby cryptologically tethered, with at least one of the encrypting devices having a multi-channel configuration defining a plurality of encryption channels. Each of the encrypting devices defines a portal for traversing a trust boundary between trusted and untrusted environments. Each of the encrypting devices includes at least one encryption unit configured to encrypt data traffic for transmission and decrypt received encrypted data traffic, as well as at least one communication unit coupled to the encryption unit by a connectionless interconnect. The communication unit is configured to transmit and receive encrypted data traffic through a corresponding communication link.

In accordance with certain additional embodiments, a high assurance method is provided for cryptologically tethered communication in adaptable manner between first and second user devices operating within respective trusted environments separated by an untrusted environment. The method includes establishing at least one set of first and second main encrypting devices coupled respectively to the first and second user devices. The first and second main encrypting devices are mutually paired to establish a uniquely dedicated main communication link therebetween across the untrusted environment. At least one auxiliary encrypting device is coupled to an auxiliary device operating within a trusted environment; and, the first main encrypting device and auxiliary encrypting device are mutually paired to establish a uniquely dedicated auxiliary communication link therebetween across the untrusted environment. Each of the first and second main encrypting devices and the auxiliary encrypting device are configured to define a portal traversing a trust boundary between the trusted and untrusted environments. Each of the main and auxiliary encrypting devices executes at least one encryption unit to encrypt message data for transmission and decrypt received encrypted message data. Each of the main and auxiliary encrypting devices also executes at least one communication unit coupled to the encryption unit by a connectionless interconnect to transmit and receive encrypted message data through a corresponding one of the main and auxiliary communication links.

BRIEF DESCRIPTION OF THE DRAWINGS

Various aspects of the present invention, as well as the structural and operational features of certain exemplary embodiments disclosed herein, may be better understood by reference to the following description, taken in connection with the accompanying drawings, wherein like reference numerals and characters identify like elements, in which.

DETAILED DESCRIPTION OF THE PREFERRED EMBODIMENTS

Figure 1:
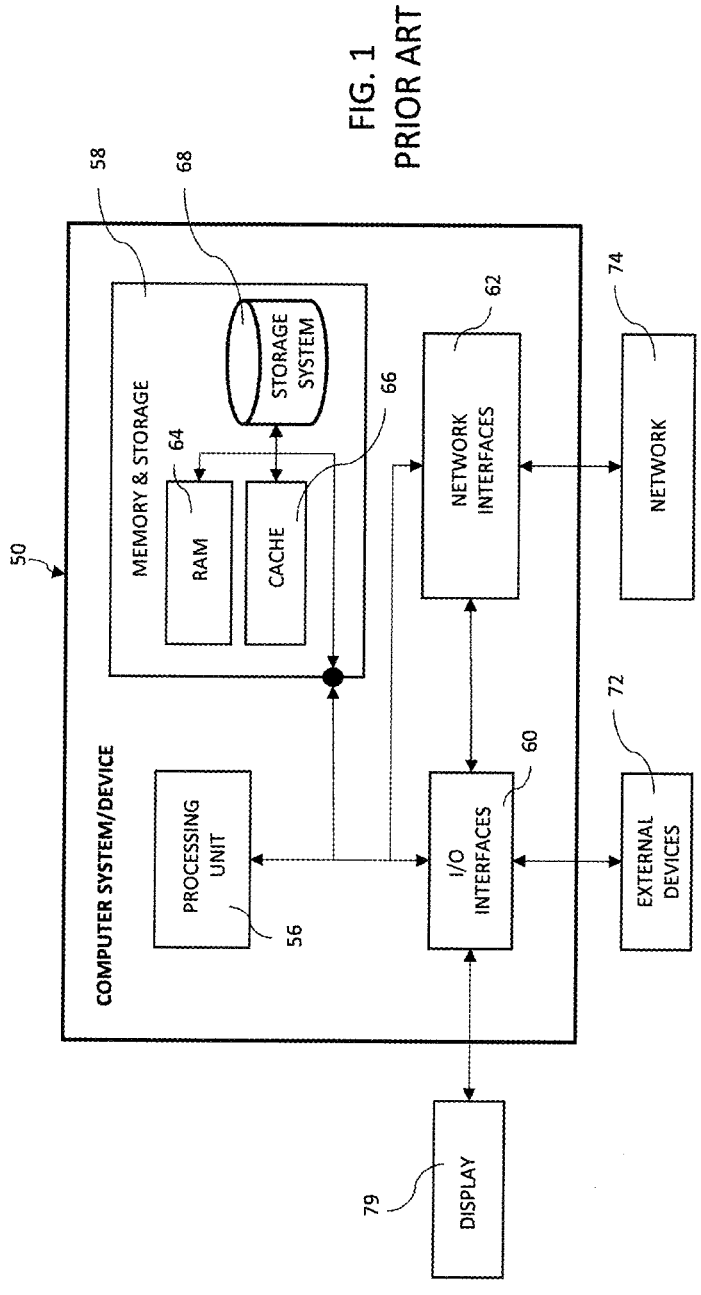
FIG. 1 is a schematic diagram illustrating the general architecture of a conventional processing system or device for various computer controlled equipment known in the art.

While the present invention may be embodied in various forms suitable for particular applications, there are shown in the accompanying drawings and described in illustrative detail herein specific embodiments which exemplify the principles of the invention as implemented for certain illustrative applications. It is to be understood that this collective disclosure is meant to be illustrative and exemplary, and is not intended to limit the invention to what is illustrated and described herein.

An example of a system and method implemented in accordance with an exemplary embodiment of the present invention are disclosed herein. In the interests of brevity and simplicity of description, the system and method are referred to herein collectively as a "trusted system," unless otherwise noted.

Briefly, the subject trusted system serves to establish and maintain high assurance communication between a "trusted" user device and another "trusted" user device. A device is "trusted" in that it operates within a "trusted environment," such as a communications network employing suitable security measures known in the art to maintain sufficient cryptologic protection against intentional or unintentional breach. In accordance with certain aspects of the present invention, the subject trusted system serves to maintain secure communication between two trusted devices, even across an untrusted communications network, by ensuring that all transmissions of data between those trusted devices occur through a communication link reserved exclusively for that purpose. The trusted system operates effectively as a transparent intermediary to ensure that transmissions of data packets between two particular trusted devices occur through a uniquely dedicated communication link suitably established for those trusted devices, or more specifically between respective encrypting devices that the trusted system couples to those trusted devices. In functional terms, the trusted system cryptologically tethers the trusted devices together, albeit by wireless means, for cryptologically protected communication via their encrypting devices—much as if the trusted devices were linked physically by a dedicated communication hotline directly and exclusively therebetween.

Communications between the trusted devices occurs, then, through this dedicated link, traversing the untrusted space between them. The encrypting devices which serve the trusted devices are suitably paired with one another so that data packets encrypted for transmission and decrypted upon reception are delivered without undue distortion from one trusted device to the other. The encrypting device pair may be employed thereby to establish a main communication link through which one trusted user device may communicate securely with another trusted user device across a trust gap between trusted environments, such as across an untrusted network. In certain cases, multiple alternative encryption channels may be provided from which to optimally select the main communication link to establish between encrypting devices for different trusted devices. Encrypting device pairs may also be employed in certain cases to similarly establish one or more auxiliary communication links to cryptologically tether a trusted user device to one or more auxiliary devices of various type for selective adaptation of the trusted system.

One or more auxiliary communication links may be established thereby for selective adaption of the encrypting device serving a given trusted device. Such auxiliary communication links enable trusted communication with auxiliary trusted devices, via their encrypting devices, to effect various measures for augmenting the security and/or reliability of communications across an untrusted communication network. Examples of auxiliary trusted devices include such things as an authentication token (for example, a wireless token of predetermined operational range) to add multifactored activation of the given trusted user device or at an encrypting device thereof. They may also include in certain embodiments a management console or the like which may be linked securely to the encrypting device of the trusted user device to enable adjustment, calibration, adaptation, or other adaptation of the same depending on the requirements of the particularly intended application.

These are but two examples of suitable auxiliary devices and measures which may be incorporated through one or more auxiliary communication links cooperatively established by unique encrypting device pairs. As noted herein, each encrypting device pair serves to establish communication links distinctly dedicated to the trusted devices they serve—be they both trusted user devices like mobile phones or other personal communication equipment, or a combination of different yet trusted device types.

In certain embodiments, communications between mobile or other trusted user devices remotely distributed about an enterprise infrastructure are facilitated by a so-called hub and spoke architecture, where the spokes bridge the trust gap between individual trusted user devices and the hub. More specifically, each trusted user device is operably coupled across an untrusted network by its own dedicated communication link (spoke) to a trusted hub defined within a trusted environment. The trusted hub includes the enterprise infrastructure equipped with suitable server, switching, retransmission, and other communication management resources known in the art, and a bank of available encrypting devices selectively called upon to serve the enterprise infrastructure as needed. Each of the trusted hub's encrypting devices correspond to the encrypting device of a particular trusted user device for secure cryptologically tethered communication therewith.

A first trusted device within this enterprise may communicate with a second trusted user device within the enterprise by transmitting appropriate data packets to the trusted hub via the dedicated communication link established between its local encrypting device and corresponding encrypting device accordingly selected at the trusted hub. Suitable resources of the enterprise infrastructure execute to effectively pass the data packets along to the second trusted user device via another spoke, namely a dedicated communication link established across the untrusted network between the paired encrypting devices designated for the second trusted device which are disposed respectively at the hub and device. A so-called hairpin transmission of data packets occurs in this manner.

The trusted hub defines for the given enterprise infrastructure certain uniquely dedicated access points for trusted communication to and from each remotely distributed trusted user device. Each access point is preferably used exclusively for and by one particular trusted user device in its secure communications with the enterprise infrastructure.

In certain other embodiments, trusted user devices may be remotely distributed and adaptable for roaming operation over multiple enterprise infrastructures. Different enterprise structures may provide optimal coverage zones for different global regions, for example. It may be that a trusted user device normally supported by one enterprise infrastructure could be more efficiently or effectively supported on a given occasion by another enterprise infrastructure. Accordingly, one or more trusted user devices in those embodiments is preferably equipped with multiple alternative encrypting devices configured for paired communication with corresponding encrypting devices disposed respectively at the trusted hubs of different enterprise infrastructures. The trusted user device may then roam as needed from trusted hub to trusted hub upon adaptive local selection from the multiple encrypting devices to accommodate a change in trusted hubs. The selected encrypting device would suitably establish an access point at the new trusted hub.

Cryptologically secured systems are typically subject to periodic updates, such as replacement of cryptologic keys for instance. To guard against or mitigate operational disruption, a backup enterprise server may be employed in certain embodiments, which are configured for example to maintain a key-based pairing data profile for each designated encrypting device served. Such backup enterprise server would remain on standby, ready and available for subrogating execution to adaptively restore a profile, if and when execution of the primary enterprise server is disrupted.

The trusted system's user encrypting devices and auxiliary encrypting devices are implemented in one or more computer devices/systems or host platforms suitably equipped and configured to carry out the processes illustratively disclosed herein. The various encrypting devices employ one or more computer processors suitably programmed with software to, among other things, execute cryptological engine functions on data passed between trusted and untrusted environments. The cryptological engine functions include generation and storage of data, protocol free encryption and decryption of data, and management or control of processes relating thereto.

By way of background, a computer program which is executed by a microprocessor (or generally, "processor") based computer processing device is normally generated as source code, or a human-readable listing of instructions for the processor to carry out a certain process. The source code is compiled to corresponding object code that is represented in a machine language form readable to the particular type of CPU (central processing unit) employed by the processor. In some instances, the machine language (such as with Assembly/Assembler language) may employ certain notation or mnemonics so as to be in human readable form as well. The object code may be executable as is in some applications. But in many applications the object code must also be linked/paired by a suitably configured linker to one or more libraries of other object code files in order to be fully executable. The resulting executable code, or binary, is then available for execution by the processor to carry out the corresponding process.

Computer Processing Device/Architecture Example

Executable code of a process may be accessed, temporarily loaded onto volatile memory, and run accordingly over one or more run sessions by a computer processing device 50 of any suitable type known in the art. FIG. 1 schematically illustrates an example of the general architecture typical of processing devices at the core of various computer controlled equipment known in the art. The computer processing device 50 is shown in general form with certain basic operational components operably coupled by system buses, interconnects, or other suitable communication links known in the art. The components generally include one or more central processing units (CPU's) 56, memory and storage units 58, input/output (I/O) interfaces 60, and network or other communication interfaces 62.

The memory and storage unit 58 includes volatile storage 64 typically in the form of random access memory (RAM) or the like operably coupled for access by a CPU 56. The memory and storage unit 58 may also include additional volatile storage in the form cache or other such auxiliary memory for higher speed retrieval of certain data. Such volatile storage is also referred to in connection with the particular embodiments disclosed herein generally as "volatile memory," or as "running memory" while serving to temporarily store the executable instructions and data required for a process during its execution. Volatile storage may be represented in certain cases (as in the embodiment illustrated herein) through a "virtual memory" whose address space maps to physical memory in any manner known in the art suitable for the given application. The memory and storage unit 58 may further include a nonvolatile storage system 68 in the form of solid state, magnetic/optical hard drive, or other such media for long term storage of data.

The CPU 56 communicates through the I/O interfaces 60 with respective external devices 72 such as such as keyboards, mouse, and other peripherals. The CPU 56 communicates through the network interfaces 62 with one or more networks 74 to which the computer processing device 50 may be operably coupled, such as Internet Protocol (IP) networks. A display and/or other user interface may be coupled through the I/O interface units for user interaction with the computer processing device 50.

Among other things, the computer processing device 50 may be employed in specialized computing devices such as embedded controllers, supervisory control and data access (SCADA) systems, and industrial control systems (ICS). The general architecture illustrated may be adapted by adding or deleting certain units or components to suit the needs of a particular embodiment and its intended application.

Trusted System

The system and method disclosed herein—collectively "trusted system"—generally provide measures which implement high assurance cryptology, preferably employing a hybrid hardware-software cryptographic engine to preserve the security of communications between trusted devices. Each trusted device served by the trusted system is suitably configured to operate in a cryptologically secure, or trusted, environment. The trusted system also incorporates measures to augment the security and reliability of communication between trusted devices, preferably in a manner which leverages the advantages of its high assurance cryptographic engine(s). Such measures may augment the security and reliability of the trusted system directly, for instance by guarding against such risks as misplacement, loss, or theft of the trusted device. Such measures may also augment security less directly, for instance by enabling secure yet convenient access to the encrypting device serving a particular trusted device, and selectively adapting the same by (for instance reconfiguration) in the event of disruption, compromise, or other change in operational environment.

Examples of systems implemented with high assurance cryptography are disclosed in U.S. patent application Ser. No. 17/200,468 directed to "Protocol Free Encrypting Device" (PFED). In these systems, mutually paired encrypting devices are employed to establish a uniquely dedicated communication link between trusted devices for high assurance communication across an untrusted network. The encrypting devices combine the flexibility of software and the strengths of hardware preferably by running known commercially available software on hardware that is also known and commercially available. The encrypting devices execute to encrypt and decrypt packets of data, without restriction on the data packets to a particular protocol for successful processing and further transmission. Digital communication of known protocols (e.g. an Ethernet frame, ATM frame, etc.) provide for at least some indication of start and stop for the transmitted packet. No more is required for a packet of any packet protocol to be properly processed by an encrypting device of PFED type in facilitating secure communication to and from trusted devices. That is, a PFED encrypting device is suitably configured to receive and transmit all data packets, regardless of the protocol used by the trusted devices in generating the packets. A PFED encrypting device is thus said to be "protocol-free."

Corresponding PFED encrypting devices are paired with one another to, in effect, functionally/cryptologically tether together the trusted devices they serve with a wireless communication link, such that any transmission of data between those trusted devices occurs exclusively through the wireless tether. Consider, for example, that in telephony applications there are two general types of connections: nailed and pinned. Nailed connections refer to those connections established between two fixed, unchanging endpoints, while pinned connections refer to those connections established between two endpoints that are not permanently fixed. The cryptologic tethering realized by the subject trusted system combines aspects of a nailed connection in that cryptography binds two encrypting devices, such as two PFED devices, which are uniquely paired together, as well as a pinned connection in that the endpoints served by the paired encrypting devices may not remain in communication at all times and may be displaced relative to one another. Yet, the encrypting devices remain cryptologically coupled exclusively to one another if and when a communication link is restored between them.

PFED, as disclosed in U.S. patent application Ser. No. 17/200,468 and briefly described below consistent with the disclosures of U.S. patent application Ser. No. 17/200,468, is but one exemplary implementation of paired encrypting devices which the subject trusted system may employ to establish such wirelessly tethered communication through an untrusted environment between trusted devices. Other suitable implementations of paired encrypting devices may be employed in that regard in certain alternate embodiments of the trusted system.

PFED Example

Figure 2:
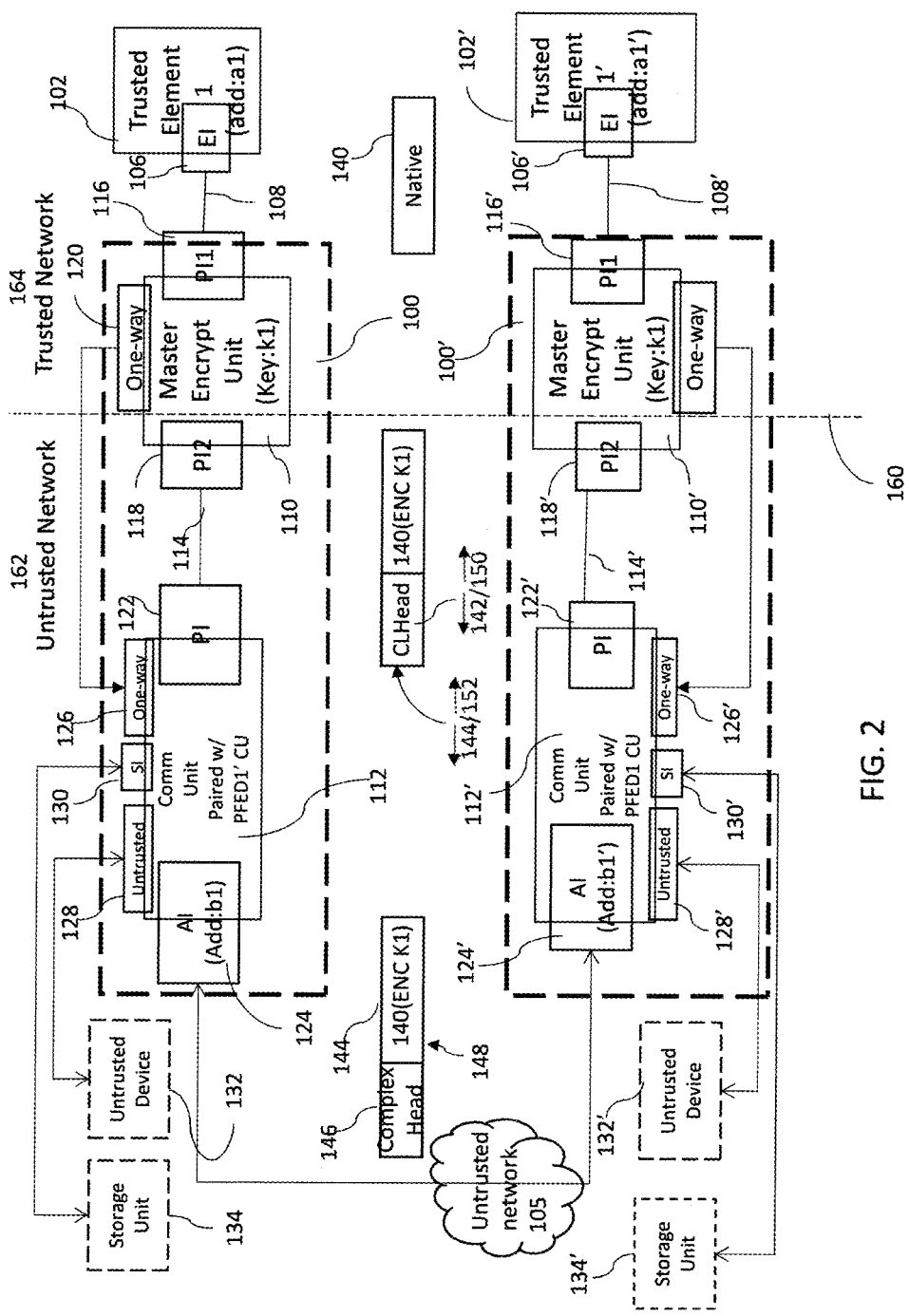
FIG. 2 is a block diagram schematically illustrating mutually paired PFED encrypting devices in a system formed in accordance with one exemplary embodiment of the present invention.

Reference is now made to FIG. 2, which schematically illustrates certain portions of a trusted system as implemented in accordance with one exemplary embodiment of the present invention. As FIG. 2 illustrates, the trusted system in this embodiment employs mutually paired PFED encrypting device 100, 100' coupled respectively to two trusted elements 102, 102' for cryptologically tethered communication therebetween. The encrypting devices 100, 100' in this embodiment are configured to link wirelessly and exclusively with one another to provide a dedicated conduit for communications between the trusted elements 102, 102' through an untrusted network 105. Each trusted element 102, 102' may include any device in a network address space suitable for a given application. In one example, a subnet in an enterprise network forms a given network address space. A phone, tablet, laptop computer, desktop computer, or router may be disposed as trusted devices in the network address space. In the embodiment illustrated, trusted element 102 is associated with an address a1, while trusted element 102' is associated with an address a1'.

The encrypting devices 100, 100' illustrated in FIG. 2 each represents a hardware implementation of the encrypting device. Each trusted element 102, 102' includes an interface 106, 106' for receiving a trusted interconnect 108, 108' providing a wired connection between the encrypting device 100, 100' and the trusted element 102, 102', thereby providing high assurance communications between the trusted element 102, 102' and the encrypting device 100, 100'. Encrypting device 100 is associated with trusted element 102 via a trusted interconnect 108 and encrypting device 100' is associated with trusted element 102' via a trusted interconnect 108'. In order for communication to occur between trusted element 102 and trusted element 102', encrypting device 100 and encrypting device 100' must be mutually paired in the manner described herein.

A sending/transmitting trusted element 102, 102' generates native packets 110 to be received by the other trusted element 102, 102'. These native packets may be of any suitable form known in the art for transmission between the trusted elements as if the encrypting devices 100, 100' were not utilized. For example, the native packets may be of IP packet form riding in an Ethernet frame.

As illustrated in FIG. 2, each encrypting device 100, 100' generally includes a master encryption unit 110, 110' and a communications unit 112, 112'. Encrypting device 100 and encrypting device 100' are preferably of substantially identical form and operate in substantially like manner. Description as to the functional features of encrypting device 100 is therefore applicable to those of encrypting device 100' as well. Within an encrypting device 100, 100', a master encryption unit 110 and a communications unit 112 are preferably linked via a connectionless interconnect 114 provided by a bus. The connectionless interconnect 114 utilizes a point-to-point connectionless protocol for the transmission of messages between the master encryption unit 110 and the communication unit 112. This point-to-point connectionless interconnect simply sends messages between the encryption unit 110 and the communications unit 112. No prior arrangement is required between the encryption unit 110 and the communications unit 112 for the transmission of messages therebetween. That is, the sending unit need not perform a "handshake" to configure the receiving unit adequately for reception of the message.

Each master encryption unit 110, 110' is preferably configured with a predetermined key for encrypting and decrypting messages. In order for trusted element 102 to communicate with trusted element 102', the master encryption unit keys of their respective encrypting devices 100 and 100' must match. The master encryption units of encrypting devices 100 and 100' are both keyed with a common encryption key k1.

The master encryption unit 110 includes first and second passive interfaces 116, 118 and a one-way interface 120. Each passive interface 116, 118 of the master encryption unit 110 may be, for example, an Ethernet port, a serial port, or a USB port. The first passive interface 116 of the master encryption unit 110 communicates with the trusted element interface 106 of trusted element 102 via a trusted interconnect 108 such as an Ethernet cable, a serial wire, a USB cable, or the like. The first and second passive interfaces 116, 118 are not associated with any particular address, and are preferably of "promiscuous" type to pass all received messages on to the master encryption unit 110 for further processing. As the passive interface 116 is not addressable, messages it receives are treated strictly as data, not as network packets until processed by the master encryption unit 110.

The one-way interface 120 of the master encryption unit 110 may be suitably formed, for example, as a GPIO pin, the transmit (Tx) side of a twisted pair serial wire, or the like. The one-way interface 120 allows for instructions generated by the master encryption unit 110 to be passed to the communications unit 112. For example, the master encryption unit 110 may provide an instruction to the communications unit 112 to halt operations.

Each communications unit 112 in this embodiment includes a passive interface 122 and an active/addressable interface 124. The passive interface 122 of the communications unit 112 of encrypting device 100 is in communication with the second passive interface 118 of the master encryption unit 110 of that same encrypting device 100 via the connectionless interconnection 114. The active/addressable interface 124 of the communications unit 112 is associated with a predetermined address. As illustrated in FIG. 2, the active interface 124 of the communications unit of encrypting device 100 is associated with address b1 and the active interface 124' of the communications unit of encrypting device 100' is associated with address b1'.

The communications units of the encrypting devices 100 and 100' are paired with one another. The communications unit of each encrypting device 100, 100' is configured to communicate any packet from the passive interface into a form suitably routable to the other communication unit of the other encrypting device 100, 100'. As a result of this pairing, messages sent by the communications unit 112 of encrypting device 100 include the source address b1 and destination address b1' to be received solely by the communications unit 112' of the other encrypting device 100'. Conversely, messages sent by the communications unit 112' of encrypting device 100' include the source address b1' and destination address b1 to be received solely by the communications unit 112 of the other encrypting device 100.

Communications exclusively between the communications units 112, 112' occur over the untrusted network 105 in this manner. The untrusted network 105 may be of any type known in the art suitable for the particularly intended application. For example, the trusted network 105 for a given application may be the internet, one or more enterprise networks, or the like.

Each communications unit 112 also includes a one-way interface 126 for receiving one-way communications from the master encryption unit 110. As described in preceding paragraphs, these one-way communications may include, for example, an instruction to halt operations.

Optionally, each communication units 112 may also include an untrusted device interface 128 and/or a storage interface 130. The untrusted device interface 128 provides for communication between the communications unit 112 and an untrusted device 132. This interface 128 may be used for instance to configure the communication unit 112. Typically, a webserver presents to the browser on an untrusted device 132 configuration options such as setting the address b1' of the communication unit 112' of the paired encrypting device 100'. Additionally the untrusted device interface 128 may serve as a hotspot access point and provide NAT (network address translation) for the untrusted device 132 to operate within the untrusted network 105. This provides an additional advantage for the case of captive portals such as those found in hotels or coffee shops, where the address of the connecting device is authenticated. Since the encrypting device 100 prevents its trusted element 102 from communicating directly with the untrusted network 105, the untrusted device 132 may serve as a proxy to enter the credentials required by the captive portal.

The storage unit interface 130 provides for communications between the communication unit 112 and a suitable storage unit 134 such as a blue tooth dongle, a USB device, or the like. The storage unit 134 may be, for example, a wallet to contain a key split. It could serve as a geo fence or tether, such that if the presence of the storage device within a certain proximity were not detected, the encryption unit would stop. The communications unit 112 routes data between the storage unit and the encryption unit's isolation/trust boundary in much the manner that data from the untrusted network is passed to the encryption unit.

Communications from trusted element 102 to trusted element 102' is described herein with the understanding that communications the other way, from trusted element 102' to trusted element 102, occur in similar manner. Trusted element 102 generates a native packet 140 for delivery to trusted element 102'. The native packet 140 can be, for example, an Ethernet frame and may include a frame header identifying the source address a1 and destination address a1'. The native packet 140 is delivered to master encryption unit 110 of encrypting device 100 via the trusted interconnect 108 and the first passive interface 116 of the master encryption unit 110. When the native packet 140 is received by the master encryption unit 110, the master encryption unit 110 ingests the entire native pack 140 (including the frame header and the payload) and encrypts the entire native packet 140 using encryption key k1. Master encryption unit 110 also adds a connectionless header 142 to the encrypted native packet 140 to form an outgoing connectionless datagram 144. The connectionless datagram 144 is an atomic, stateless datagram.

The connectionless header 142 may include fields identifying message boundaries (e.g. length) or other static properties of the message. The receiver is free to accept or reject a frame independent of the contents of the connectionless datagram 144 using pre-specified criteria associated with the fields of the connectionless header 142. For example, the connectionless header 142 may include fields such as for example, length. The length field may be bound by a pre-specified constant defining the maximum length of the frame that the receiver (i.e. the master encryption unit 110 or the communications unit 112) will accept. If the length of the connectionless datagram 144 exceeds the pre-specified maximum length as determined by the receiver, the receiver (110/112) may safely discard the connectionless datagram 144. Because no dynamic properties are included in the connectionless header 142, the receiver 110/112 can process a frame without maintaining any previous state information. As a result, the logic and state machine required of the receiver 110/112 to accurately process the connectionless header 142 is greatly simplified. Every state can be humanly inspected to a known termination. This significantly improves the ability to evaluate the security boundary logic for the purpose of certification and correctness.

The outgoing connectionless datagram 144 is delivered from the master encryption unit 110 to the communications unit 112 via the second passive interface 118 of the master encryption unit 110, the connectionless interconnect 114, and the passive interface 122 of the communications unit 112. Upon receipt, the communications unit 112 adds a complex header 146 to the encrypted packet 140 in place of the connectionless header 142 to form a packet 148. The complex header 146 is understood by the untrusted network 105 and allows for delivery of the packet 148 to the paired communications unit 112'. For example, the complex header 146 includes source address b1 and a destination address b1'. The complex header may also include dynamically defined fields.

The untrusted network 105 routes the packet 148 as required to achieve delivery of the packet 148 to the paired communication unit (i.e., the communications unit 112' of encrypting device 100'). Upon receipt of the packet 148, the communications unit 112' of encrypting device 100' removes the complex header 146 added by the communications unit 112 and adds a connectionless header 150 to the encrypted packet 140 to form an incoming connectionless datagram 152. As described above, the connectionless header 150 may include fields identifying message boundaries (e.g. length) or other static properties of the message.

The communications unit 112' transmits the incoming connectionless datagram 152 to the master encryption unit 110' of encrypting device 100'. The master encryption unit 110' of encrypting device 100' receives the incoming connectionless datagram 152, decrypts the encrypted native packet 140, and delivers the decrypted native packet 140 to trusted element 102'.

From the perspective of trusted element 102 and 102', the encrypting device 100 and encrypting device 100' are transparent. Trusted elements 102 and 102' behave as if they are directly communicating with each other at the ISO OSI layer 2 level and above. That is, trusted devices 102 and 102' communicate via the untrusted network 105 as if encrypting device 100 and encrypting device 100' were not present in the communication path. Each encrypting device pair 100-100' provides a cryptographically-paired, point-to-point link enforcing logical and physical isolation to provide a trust boundary 160 between the untrusted environment 162 and the trusted environment 164. Physical isolation is preserved by providing independent devices at the endpoints of the connectionless interconnect 114 (i.e. at the master encryption unit 110 and at the communications unit 112). The complex native untrusted network processing is done on the communications unit 112 separate from the simple connectionless network processing done by the master encryption unit 110. The logical isolation is accomplished by the transformation of the untrusted native packet 140 sent to active/addressable interface into a connectionless packet 148. The native packet 140 is necessarily encrypted before it passes from the trusted element 102 to the communications unit 112 and is cryptographically authenticated by master encryption unit 110' of the paired encrypting device 100' before it is allowed to pass ultimately to the trusted element 102'. Because all packets arriving at the trusted element 102' must be received via the master encryption unit 110', an entity located on the communication unit 112' side of the connectionless-interconnect 114' cannot manufacture a packet 148 that has meaning to the trusted element 102' unless the key (k1) is known to that entity.

Preferably, an entity located on the untrusted network (i.e., on the communications unit 112' side of the connectionless-interconnect 114') cannot manufacture and deliver a connectionless datagram 152 to the encryption unit 110'. In order to deliver a connectionless datagram 152 that did not originate from the paired encrypting device 100, a failure must occur on the communication unit 112'. Thus, the communications unit 112' is acting effectively as a crumple zone. And the encrypting device pair 100-100' provides in effect a virtual wire connecting two devices 102, 102' in trusted spaces via a tunnel through untrusted spaces, i.e., the encrypting device pair 100-100' creates a tunnel across the untrusted network 105.

In this illustrative manner, the trusted and untrusted environments 162, 164 remain completely isolated from each other. No knowledge about the other is shared. This is what is meant by "protocol-free." The encryption and networking are independent "protocols." Although the point-to-point link is restrictive from a sophisticated network topology point of view, it avoids any requirement to perform routing within the cryptography, obviating the need to create a bypass between the trusted and untrusted environments. In effect, each encrypting device is doing blind routing to deliver the trusted element plaintext native packet 140 across the untrusted network 105.

As illustrated in FIG. 2, the master encryption units 110, 110' are configured to transmit inter-PFED control messages 170 in order to manage themselves. These inter-PFED control messages 170 are used, for example, to manage the cryptographic state of the encryption units 110, 110'. For example, the master encryption unit 110 of PFED 100 can generate an inter-PFED control message 170 for delivery to the master encryption unit 110' of PFED 100' to rekey, manage the cryptographic algorithm, manage the status of the encryption units (e.g., log, online/offline, etc.), or begin a new session, etc. These inter-PFED control messages 170 are originated at the master encryption unit 110, are encrypted by the master encryption unit 110 using key K1, packetized as connectionless packets and travel along the same PFED-to-PFED' tunnel much as with the native packets 140 originating at the trusted element 102, except they are tagged as control messages. Because the inter-PFED control messages 170 are tagged as control messages, they are not sent to the trusted element 102'.

Figure 3:
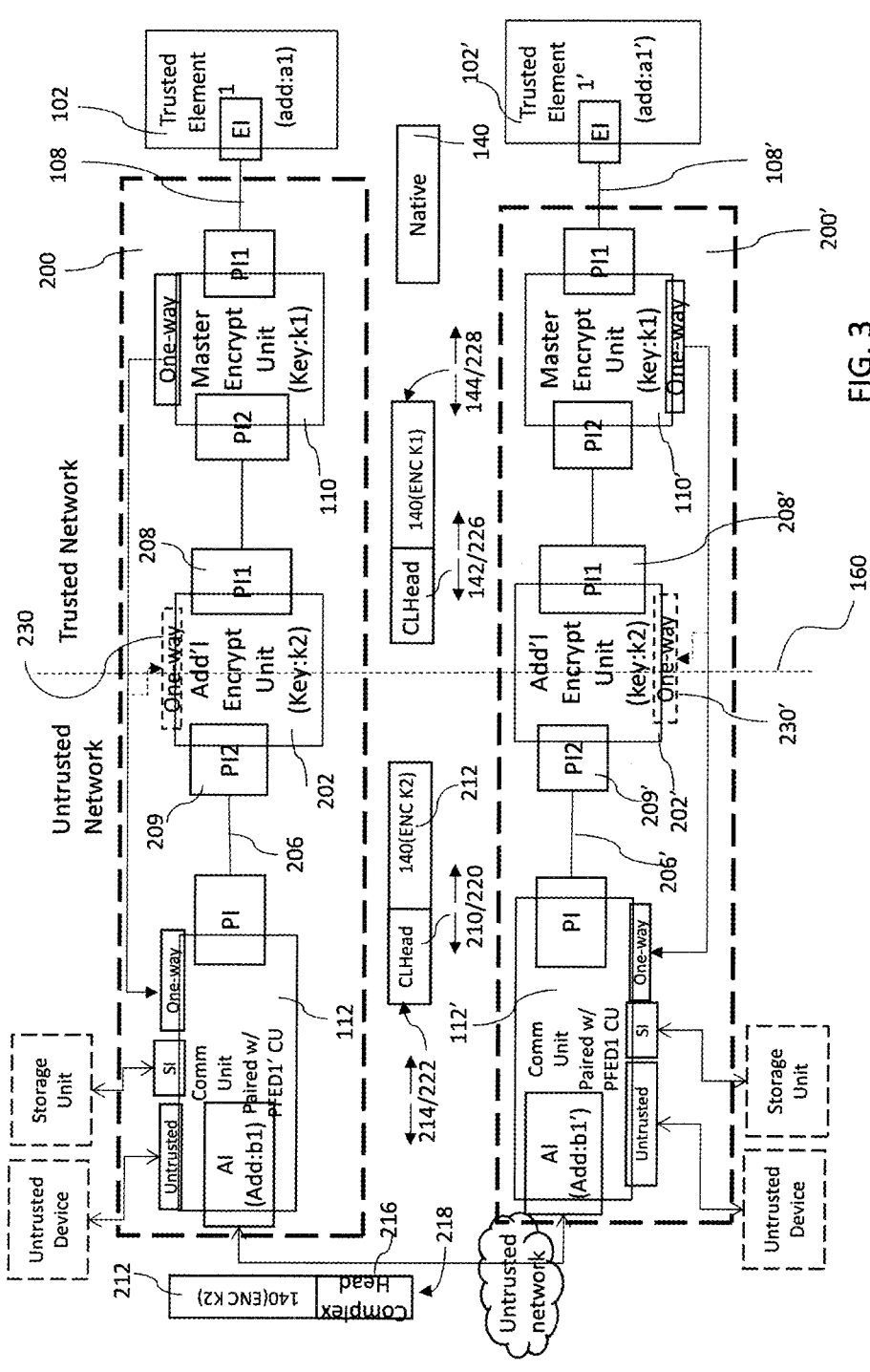
FIG. 3 is a block diagram schematically illustrating mutually paired PFED encrypting devices in a system formed in accordance with an alternate embodiment of the present invention, wherein multiple encryption units are employed within each encrypting device.
Figure 3A:
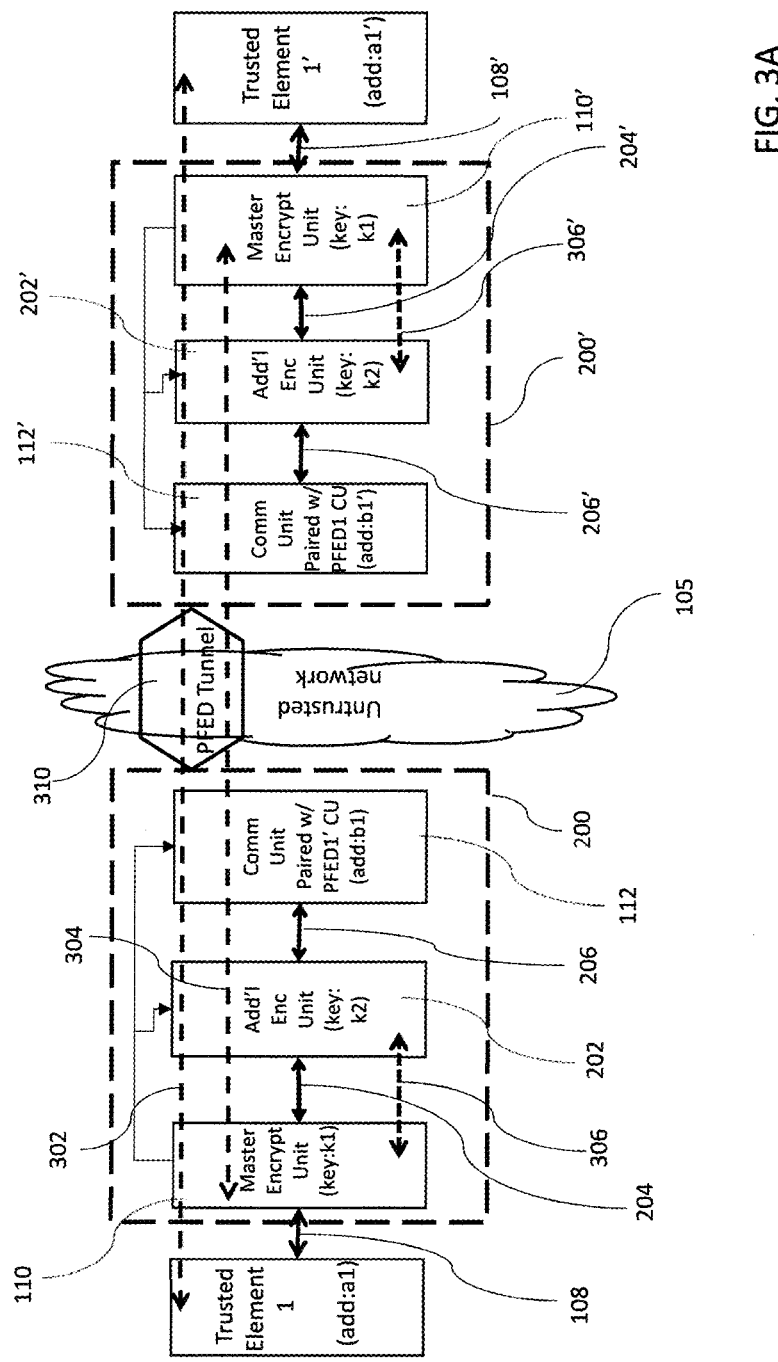
FIG. 3A is a block diagram schematically illustrating certain interconnects and communication paths provided by PFED encrypting devices in the embodiment of FIG. 3.

Referring to FIGS. 3 and 3A, an alternate embodiment is illustrated, wherein the paired PFED encrypting devices 200, 200', which serve to preserve trusted communications between trusted elements 102 and 102' despite transmission via an untrusted network 105, each include one or more additional encryption units 202, 202' to provide an added layer(s) of encryption. The additional encryption unit 202, 202' of each PFED device 200, 200' is coupled to its corresponding master encryption unit 110, 110' via a connectionless interconnect 204, 204', and to its corresponding communications unit 112, 112' via a connectionless interconnect 206, 206'. Each additional encryption unit 202, 202' includes a first passive interface 208, 208' and a second passive interface 209, 209'. Each encryption unit 202, 202' serves to encrypt and decrypt messages using a key k2.

The PFED encrypting devices 200, 200' in the embodiment illustrated in FIGS. 3-3A operate in similar manner to the PFED encrypting devices 100, 100' in the embodiment of FIG. 2. But the outgoing connectionless datagram 144 generated by master encryption unit 110 containing the encrypted native packed 140 and connectionless header 142 is received by the additional encryption unit 202 prior to transmission to the communications units 112. More specifically, the outgoing connectionless datagram 144 generated by the master encryption unit 110 is received at the first passive interface 208 of the additional encryption unit 202, and the additional encryption unit 202 identifies the payload for encryption. The payload to be encrypted includes the encrypted native packet 140. The additional encryption unit 202 further encrypts the payload using key k2 and adds a connectionless header 210 to the further encrypted payload 212 to form an outgoing connectionless datagram 214.

The communications unit 112 of each PFED encrypting device 200, 200' in this embodiment receives the connectionless datagram 214 formed by the additional encryption unit 202 and operates in substantially the same manner as the communications units 112 of FIG. 2. For example, the communication unit 112 of PFED device 200 receives the outgoing connectionless datagram 214 from the additional encryption unit 202, and adds a complex header 216 in place of the connectionless header 210 (which is removed from connectionless datagram 214 upon successful receipt), to form a packet 218 adapted for delivery to the communication unit 112' of the paired encrypting device 200'. Upon receipt of the packet 218 containing the encrypted payload 212, the communications unit 112' of PFED device 200' removes the complex header 216 previously added by the communications unit 112 of PFED device 200 then adds a connectionless header 220 to form an incoming connectionless datagram 222.

The additional encryption unit 202' of PFED device 200' receives the incoming connectionless datagram 222 including the encrypted payload 212 at the second passive interface 209' and removes the previously added connectionless header 220 upon successful receipt. The unit 202' decrypts the encrypted payload 212 using key k2. A connectionless header 226 is then added to the decrypted payload (which includes the k1-encryption of the native packet 140) to form an incoming connectionless datagram 228. The master encryption unit 110' of PFED device 200' receives the incoming connectionless datagram 228 and removes the connectionless header 226 upon successful receipt. It then decrypts the encryption of the native packet 140 using key k1, thereafter delivering the decrypted native packet to trusted element 102'.

In addition to providing a one-way connection between the master encryption unit 110, 110' and the communications unit 112, 112' within each PFED device 200, 200', the additional encryption unit 110, 110' preferably also includes an optional one-way interface 230, 230' which provides a one-way interface between the master encryption unit 110, 110' and the additional encryption unit(s) 202, 202'. This one-way interface 230, 230' may be employed, for example, to pass such control instructions as an instruction to perform a power cycle, or to pass any other suitable instruction that does not require two-way communication. The one-way interface may also serve as an emergency path for which the type of existing interconnect would be immaterial.

FIG. 3A illustrates the various interconnects provided by the PFED device 200. A trusted element interconnect 108, 108' provides connection between the trusted element 102, 102' and the master encryption unit 110, 110'. In the event the master encryption unit 110, 110' is utilized as the only encryption unit, a connectionless interconnect provides a connection between the master encryption unit 110, 110' and the communications unit 112, 112'. In the event a master encryption unit 110, 110' and an additional encryption unit 202, 202' are provided by the PFED device as shown, a connectionless interconnect 204, 204' is provided between the master encryption unit 110, 110' and the additional encryption unit 202, 202', while a connectionless intercon-nect 206, 206' is provided between the additional encryption unit 202, 202' and the communications unit 112, 112'.

FIG. 3A also illustrates the various communication paths provided by the paired PFED devices 200, 200', including a traffic communication path 302, an inter-PFED communi-cation path 304, as well as intra-PFED communication paths 306, 306'. The endpoints of the traffic communication path 302 are defined by the first and second trusted elements 102, 102'. Messages carried on this path may generally constitute the primary communication "traffic" between the trusted elements 102, 102', which is processed by the master encryption units 110, 110', any additional encryption units 202, 202', and the communications units 112, 112'.

The endpoints of the inter-PFED communication path 304 are defined by the paired master encryption units 110, 110'. Messages carried on this path 304 generally constitute inter-PFED control messages normally generated by the master encryption units 110, 110' and accordingly processed by the intervening additional encryption units 202, 202' and communications units 112, 112'. An inter-PFED control message originating from the master encryption unit 110, 110' typically serves much as a control frame. For example, an inter-PFED control message may be created by master encryption unit 110 of PFED 200, encrypted using key k1, and supplied with a connectionless header. The inter-PFED control message is then be passed to the additional encryp-tion unit 202 via the connectionless interconnect 204 for further encryption thereby using key k2. A connectionless header is then added for appropriate routing to the commu-nications unit 112 via the connectionless interconnect 206. The communications unit 112 applies a complex header to the inter-PFED control message so that it may be delivered via the untrusted network 105 to the communications unit 112' of the paired PFED 200'.

Upon receipt of the inter-PFED control message, the paired PFED device's communications unit 112' removes the complex header, adds a connectionless header and delivers the inter-PFED control message to the additional encryption unit 202' via connectionless interconnect 206'. The additional encryption unit 202' decrypts the inter-PFED control message using key k2, adds a connectionless header and delivers the decrypted inter-PFED control message to the master encryption unit 110' via connectionless intercon-nect 204'. The master encryption unit 110' decrypts the inter-PFED control message using key k1 and processes the decrypted results (namely, control instructions) accordingly. These inter-PFED control messages are typically meant to serve internal PFED utility functions. As such, they are not forwarded to the trusted device 102'.

Such inter-PFED control messages provided between master encryption units allow for more sophisticated opera-tions beyond just encryption. Because a PFED device 200 is only active with its paired PFED device 200' (i.e., may only communicate with its paired PFED), the need for conven-tional key management measures by a trusted administrator is obviated. Inter-PFED control messages allow paired PFED devices to autonomously manage themselves by sending suitably required commands back and forth over the inter-PFED communications path 304.

For example, inter-PFED control messages may be uti-lized to re-key the PFED pair 200-202', zeroize a paired PFED, provision new keys, recover from key desynchroni-zation, download a data log, send a patch, or the like. These operations may be performed safely, for instance, by pre-sharing an initial key for the PFED pair 200-200', there being no need to physically do anything more beyond an initial pre-sharing of a key in order to initiate an autonomous cryptographic lifecycle. The inter-PFED communications path 304 may be provisioned and managed completely by suitably predefined inter-PFED control messages. Authen-tication of a peer (i.e. a paired PFED) may be automatic because the key k1 would be unique to paired PFEDs 200 and 200'. Thus, in the event PFED 200' is able to success-fully decrypt received messages, the source of the messages would necessarily be its exclusively paired PFED 200. Conversely, if PFED 200 is able to successfully decrypt received messages, the source of the messages would nec-essarily be its exclusively paired PFED 200'.

All message traffic and any inter-PFED control messages may be safely routed between PFED 200 and PFED 200' via an untrusted network 105, such as the internet at large, since any messages sent by the communication unit 112 of PFED 200 may only be delivered successfully to the communica-tions unit 112' of PFED 200' exclusively, and vice versa. The communication path/link for the messages through the untrusted network 105 forms, effectively, a PFED tunnel 310 through that untrusted network 105, which is dedicated to transporting these messages between the paired PFED devices 200-200', and those particular PFED devices only. In that way, the paired PFED devices are operationally tethered together, wirelessly or otherwise.

As also illustrated in FIG. 3A, the endpoints of the intra-PFED communication paths 306, 306' are established between the respective master encryption unit 110, 110' and additional encryption unit 202, 202' of each PFED device 200, 200'. Messages carried on this path 306, 306' generally constitute intra-PFED control messages which are commu-nicated only to the additional encryption unit 202, 202'. Intra-PFED control messages do not leave the given PFED 200, 200', and are generated by the master encryption units 110 and 110' to manage their respective additional encryp-tion units 202 and 202'. Such intra-PFED control messages may include, for example, commands to start, stop, restart, use a certain key, install new software, and the like.

FIGS. 2, 3, 3A illustrate pairs of PFED devices, each pair providing a point-to-point communication link, or path, which carries transmission of messages exclusively between the trusted devices they serve. It is to be understood that any number of trusted devices may be mutually paired via corresponding PFEDs in this manner to establish unique point-to-point connection paths between them. As the num-ber of paired trusted devices increases, the number of paired PFED devices providing the point-to-point connections could become untenable. A solution may be provided in certain embodiments and applications by virtualizing the PFEDs using software and hosting a plurality of PFED devices on a server.

Figure 3B:
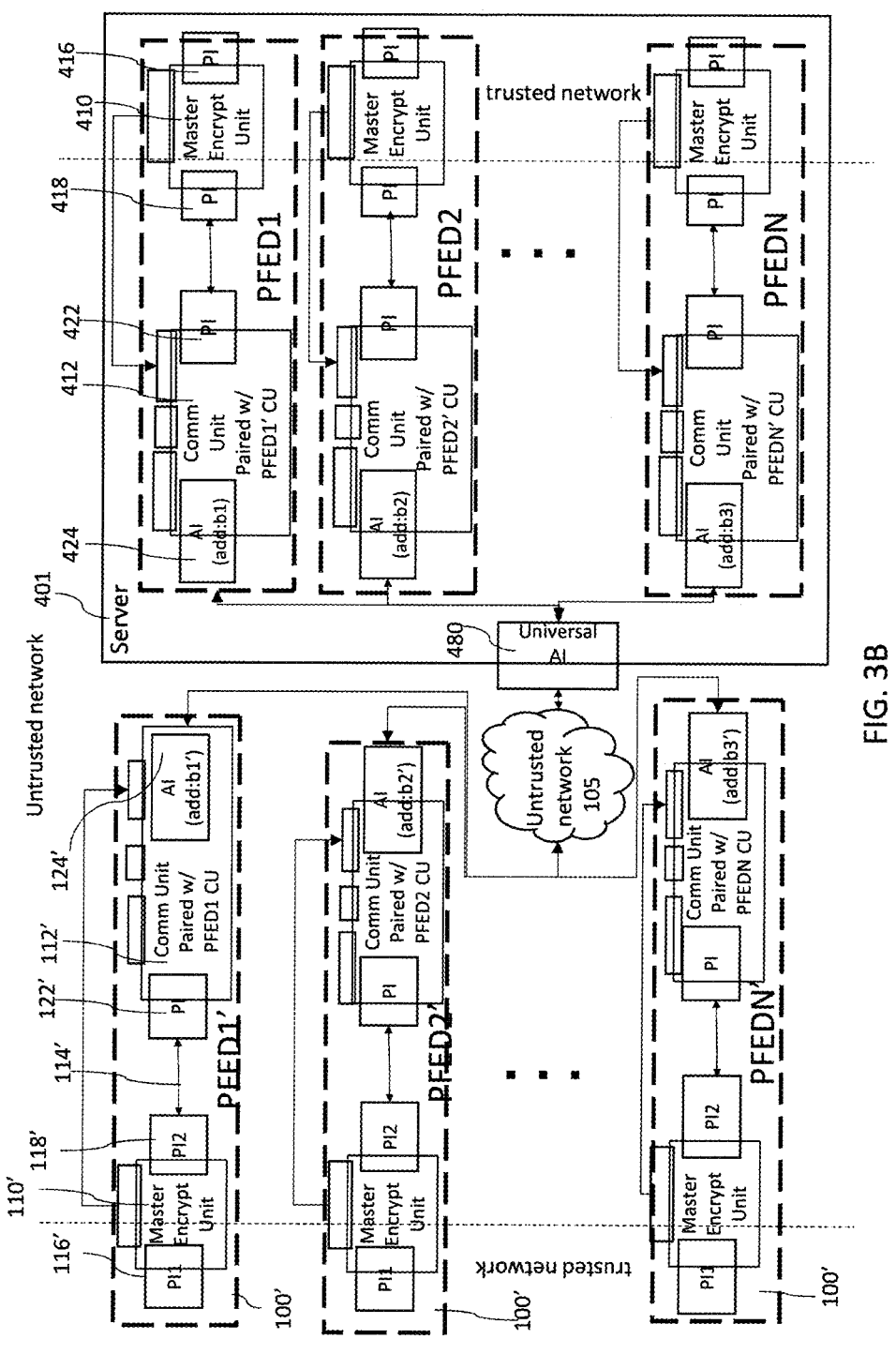
FIG. 3B is a block diagram schematically illustrating examples of implementation for paired encrypting devices, including certain client-side PFED encrypting devices implemented with hardware and certain server-side PFED encrypting devices implemented on a common server in virtualized form in support of various exemplary embodiments of the present invention.

One portion of an exemplary embodiment incorporating this type of implementation is illustrated in FIG. 3B, which illustrates a system 400, wherein a plurality of PFEDs (PFED1-PFEDN) are virtualized on a server 401 while a corresponding plurality of PFEDs (PFED1'-PFEDN') paired therewith are implemented separately in hardware. The hardware implementations of PFED1'-PFEDN' may be configured in much the manner as the hardware implementations 100' in the embodiment of FIG. 2, or in the event an additional layer of encryption is employed, in much the manner as the PFEDs 200' are implemented in the embodiment of FIG. 3.

Any suitable number of virtualized PFEDs may be provided on the server 401. Each virtualized PFED1-PFEDN in this embodiment is illustratively (though not necessarily) configured as the functional equivalent of the hardware implementations 100 illustrated in FIG. 2, or in the case of an additional layer of encryption, as the functional equivalent of the hardware implementations 200 illustrated in FIG. 3. Each virtualized PFED1-PFEDN includes a master encryption unit 410 and a communications unit 412. A connectionless interconnect 414 provides communication between the master encryption unit 410 and the communications unit 412. The master encryption unit 410 includes a passive interface 416 for receiving native data packets 140 from a trusted device (not shown in FIG. 3B). The communications unit 412 includes an active/addressable interface 424 in communication with a universal active interface 480 provided on the server 401. The universal active interface 480 provides a hardware interface between the virtualized active interfaces 424 of the virtualized PFED1-PFEDN and the untrusted network 105, and serves to route messages between the virtualized devices PFED1-PFEDN and the paired devices PFED1'-PFEDN'.

Hub & Spoke Enterprise Application

Figure 4:
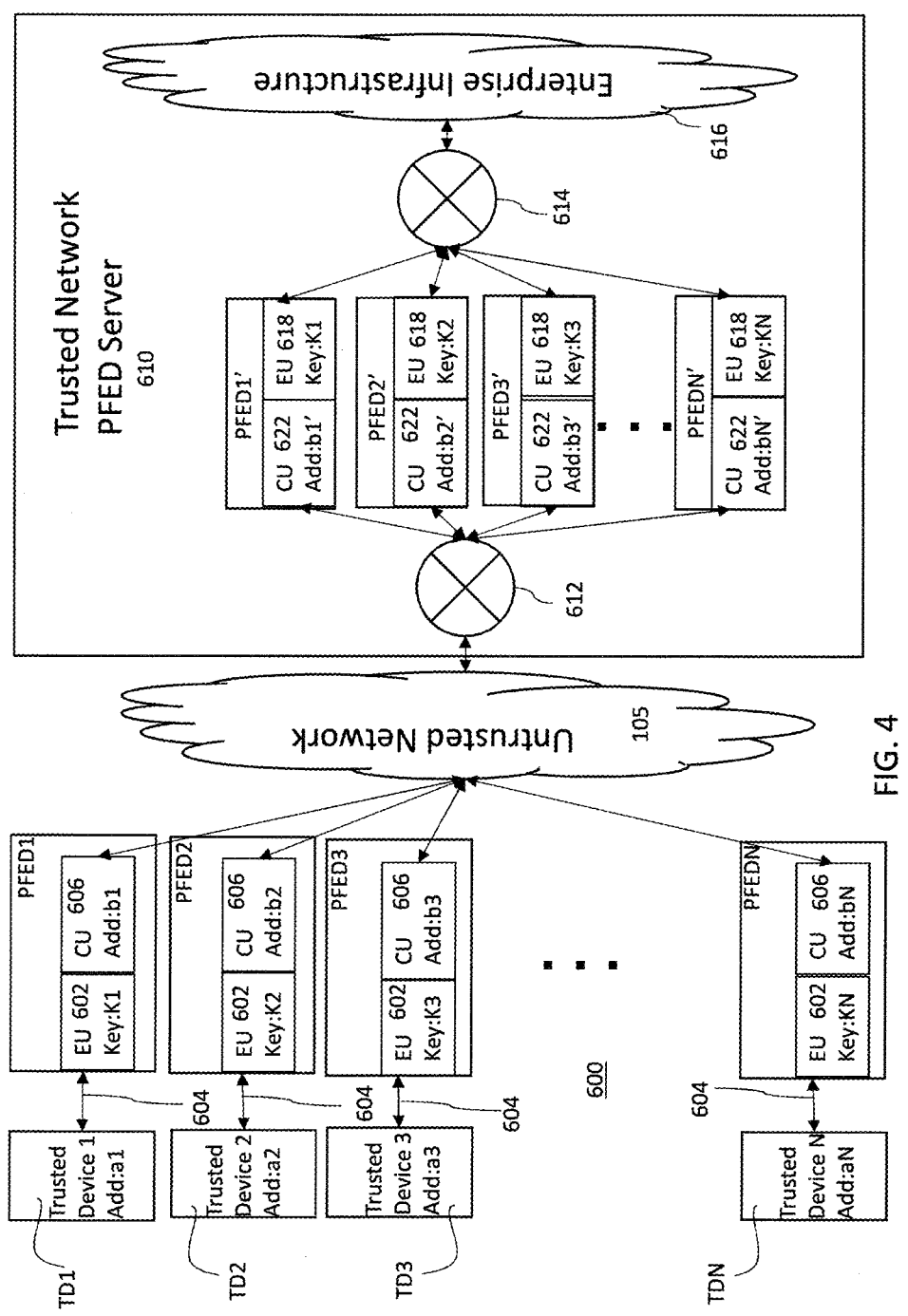
FIG. 4 is a block diagram schematically illustrating a plurality of PFED encryption devices arranged in a hub-and-spoke topology in accordance with various exemplary embodiments of the present invention.

FIG. 4 illustrates a system 600 implementing paired PFED devices disposed in a hub-and-spoke topology to support communication between trusted devices TD1-TDN. As illustrated, a number of client-side encrypting devices PFED1-PFEDN in this embodiment are in communication with server-side encrypting devices PFED1'-PFEDN' respectively paired therewith via an untrusted network 105. Each client side encrypting device PFED1-PFEDN receives packets of data from a client-side trusted device TD1-TDN. Although details of individual encrypting devices are omitted for simplicity of view and clarity of description, it is to be understood that the encrypting devices PFED1-PFEDN, PFED1'-PFEDN' may be suitably implemented as disclosed herein, such as described for the encrypting device as illustrated in connection with FIGS. 2, 3, 3A. The encrypting devices PFED1-PFEDN each include an encryption unit 602 having a passive interface in communication with a trusted device TD1-TDN via a trusted interconnect 604 and a communications unit 606 having an active/addressable interface for communication through an untrusted network 105.

The server-side encrypting devices PFED1'-PFEDN' are hosted on a PFED server 610 of a trusted network. The PFED server 610 also hosts an untrusted router 612 (at the untrusted side of the given trust boundary) in communication with the untrusted network 105 (e.g. the Internet), and a trusted router 614 (at the trusted side of the given trust boundary) in communication with the enterprise infrastructure 616 of the trusted network. Each server-side encrypting device PFED1'-PFEDN' includes an encryption unit 618 having a passive interface in communication with the trusted router 614 via a trusted interconnect 620, and a communications unit 622 having an active/addressable interface for communication through the untrusted network 105 via the untrusted router 612.

Each client-side PFED device PFED1-PFEDN is paired with a server-side PFED device PFED1'-PFEDN' to form a PFED pair. For example, a client-side PFED1 (having a communications unit addressable interface associated with address b1) is paired with the server-side PFED1' (having a communications unit addressable interface associated with address b1'). The client-side PFED2 (having a communications unit addressable interface associated with address b2) is paired with the server-side PFED2' (having a communications unit addressable interface associated with address b2'). Similarly, the client-side PFED3 (having a communications unit addressable interface associated with address b3) is paired with the server-side PFED3' (having a communications unit addressable interface associated with address b3'), and so on.

To illustrate the transmission of messages between trusted devices TD1-TDN one example of a message is described as transmitted from trusted device TD1 to trusted device TD2. For example, trusted device TD1 generates a native packet identifying in its header its own address a1 as the source address and the address a2 of TD2 as the destination address a2. The native packet is encrypted by encryption unit 602 of PFED1 and passed in encrypted form by its communications unit 606 across the untrusted network 105, on to the untrusted router 612. From there, the received packet is forwarded into a channel preferably pre-designated for the PFED device paired with PFED1, namely PFED1'. The packet is received by the communications unit 622 of PFED1' and decrypted by the encryption unit 618 of PFED1', whereby the native packet emerges onto the interconnect to the trusted router 614. At this point the trusted router determines where to send the packet.

The packet may be intended for another device within the Enterprise Infrastructure 616. Since the packet in this example is intended for another remotely located trusted device TD2, however, the router 614 effects a hairpin turn for transmission of the packet back through the untrusted network for delivery to TD2. The native packet is directed to the channel pre-designated for the PFED2' paired with the PFED2 which serves the destination device TD2. The packet is encrypted and transmitted by that PFED2' channel of the server 610 through the untrusted network 105, whereupon the encrypted packet is received by the communications unit 606 of PFED2 and decrypted by the encryption unit 602 of that PFED2. The native packet emerges on the interconnect 604 to be received at the destination address a2 by trusted device TD2.

FIG. 4 illustrates how multiple trusted devices TD1-TDN may route to each other without any knowledge of the untrusted network 105, in effect "blind routing." This is further enforced by the uniquely matching keyed nature of the paired PFEDs for the trusted devices routed together. For example, the communications unit 622 of the server-side encrypting device PFED1' is pre-configured to communicate with its counterpart at encrypting device PFED1 on the client side having the address b1. Similarly, the communications unit 606 of client-side encrypting device PFED1 is pre-configured to communicate with its counterpart at encrypting device PFED1' on the server side having the address b1'. If the untrusted router 612 maliciously or accidentally forwards frames from trusted device TD1 to a server-side encrypting device other than PFED1', the frame would be decrypted with the wrong key. As a result, the cryptographic authentication check would fail and that frame dropped before it enters the trusted router 614.

An advantage provided by the encrypting devices PFED1-PFEDN, PFED1'-PFEDN' is that no specialized trusted or untrusted networking hardware is required to integrate this encryption into an existing enterprise network. The network hardware may be fully off the shelf, such as standard CISCO/JUNIPER/server/etc. gear. In addition, only basic network configuration and administration skills are required to configure and administer the system 600. Thus, integration of the encrypting devices PFED1-PFEDN into any enterprise network requires minimal adaptation measures. The trusted network 610 operates in much the manner that it would if the untrusted network 105 were not traversed. It is noted that MACSEC performs OSI layer 2 point-to-point encryption between two physical interfaces on an existing interconnect. A PFED pair creates a layer 2 end-to-end MACSEC-like link without requiring an immediate neighbor device to be an endpoint. Use of a PFED pair thus solves the same problem CISCO's pseudo wire technology solves, but in a different way.

Another advantage provided by the encrypting devices PFED1-PFEDN, PFED1'-PFEDN' is that nearly any known type of trusted device may be suitably wired to the first passive interface of the encryption unit of an encrypting device (i.e., the "promiscuous end" of the encrypting device). So just about any known network may be connected to an addressable interface side of the communications unit of the encrypting device (i.e. the "addressable end" of the encrypting device). For example, one might connect a pair of USB headphones to the promiscuous end of the encrypting device. Alternatively, one might connect the addressable end of the encrypting device to a satellite phone instead of an Ethernet port. The cryptography provided by the encrypting device does not constrain the connections to the encrypting device because the encrypting device has no dependency with either the trusted or untrusted network traffic. The encrypting device is but a proverbial "bump on the wire" with respect to the data traffic safely passed therethrough. Thus, another advantage provided by the encrypting device is that the trusted devices on either side of the encrypting device bump may be replaced/refreshed at different time frames.

Figure 4A:
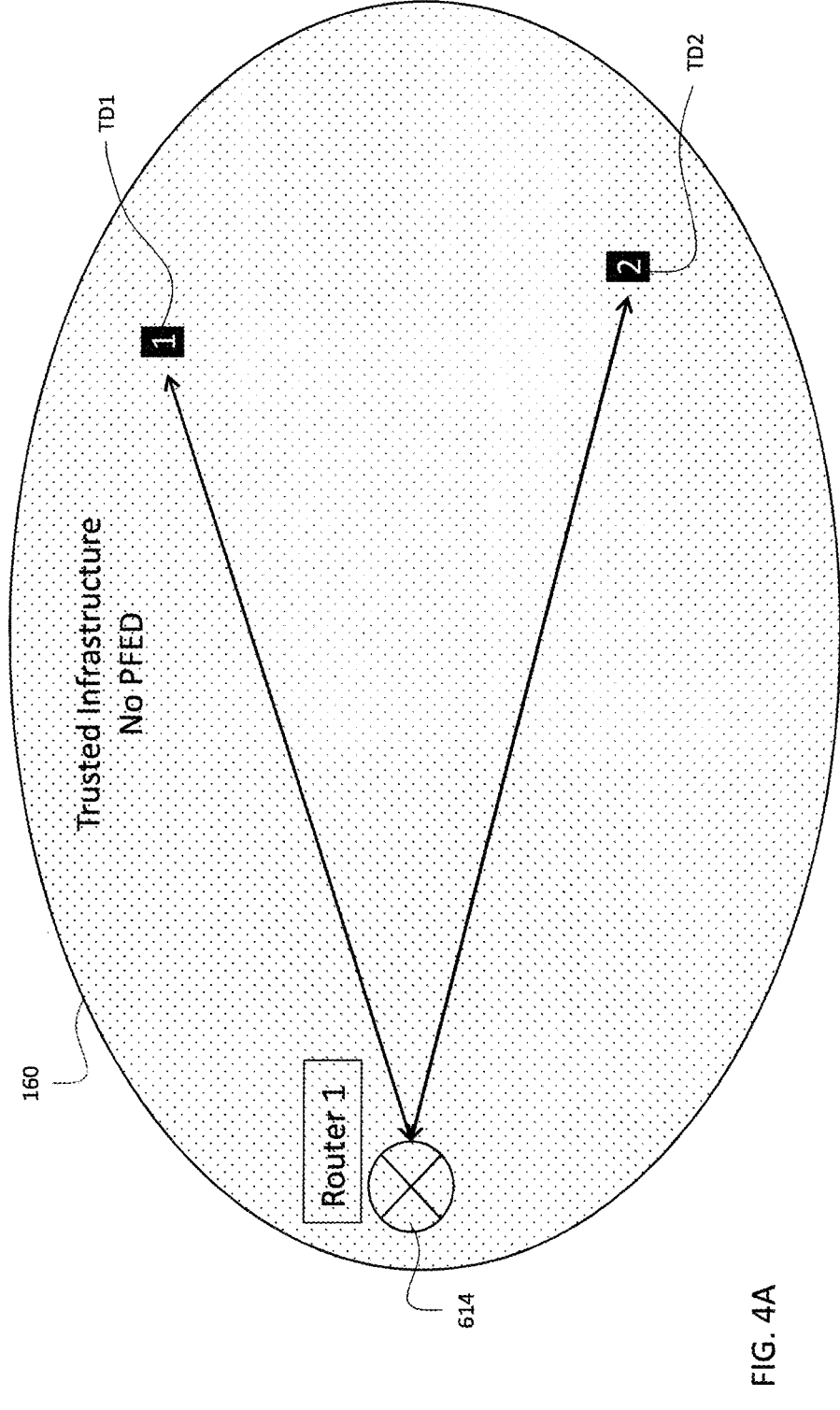
FIG. 4A is schematic diagram illustrating the hairpin routing of message traffic between trusted devices which may be carried out by various embodiments of FIG. 4.
Figure 4B:
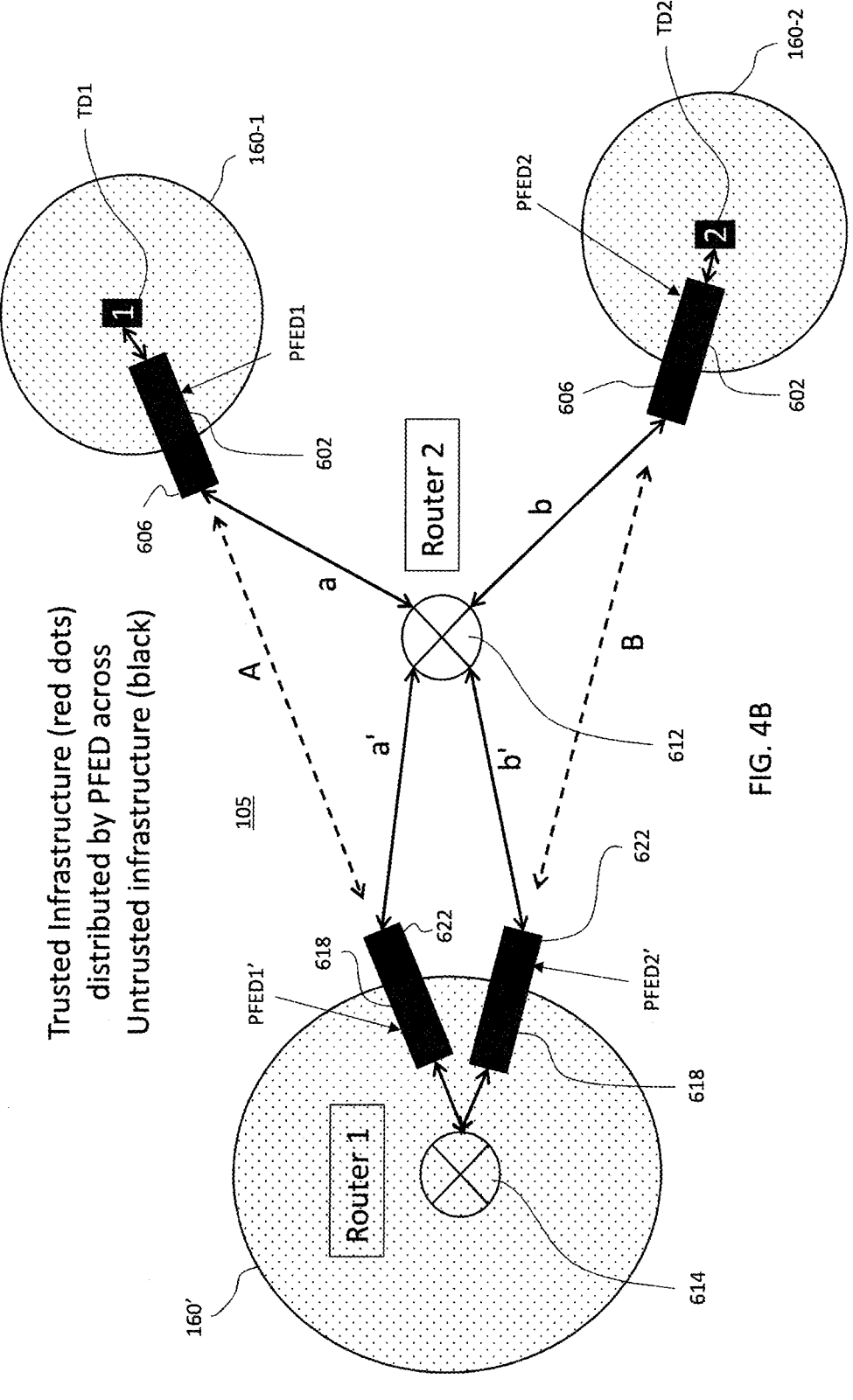
FIG. 4B is a schematic diagram illustrating in more detail the use of encrypting devices in the hairpin routing of message traffic shown in FIG. 4A.

FIGS. 4A, 4B are highly simplified schematic views which illustratively contrast the safe hairpin routing of message traffic between trusted devices TD1 and TD2 via an intermediary, namely the trusted router 614. In FIG. 4A, both the trusted devices TD1, TD2 are safely disposed within the trusted environment bounded by the same trust boundary 160, along with the trusted router 614. Since the message traffic between trusted devices TD1, TD2 remains fully within the trusted environment (does not cross the trust boundary 160), no encrypting device assistance is required to guard the integrity of trusted communication therebetween.

In the case illustrated in FIG. 4B, the trusted devices TD1, TD2 operate within their own trusted boundaries 160-1, 160-2, as does the trusted router 614 within its trust boundary 160'. Traffic originating from one of the trusted devices TD1, TD2 to the other must therefore cross both of their trust boundaries 160-1, 160-2, as well as the hairpin router's trust boundary 160'. In accordance with certain aspects of the present invention, each trust boundary crossing is protected by an encrypting device, preferably of PFED type, suitably paired with another encrypting device PFED' to effectively establish a uniquely dedicated wireless communication link A, B therewith. In practice, the dedicated communication links A as actually established between the encrypting device PFED1 serving trusted device TD1 and a corresponding encrypting device PFED1' serving the trusted router 614, for instance, may include segments a, a' which lead to and from one or more untrusted routers 612 in traversing the untrusted network 105 outside the trust boundaries 160-1, 160'. Similarly, the dedicated communication link B as actually established in practice between an encrypting device PFED2' serving the trusted router 614 and the encrypting device PFED2 serving trusted device TD2 may include the segments b, b' which lead to and from one or more untrusted routers 612 in traversing the untrusted network 105 outside the trust boundaries 160', 160-2.

Each encryption device PFED1, PFED1', PFED2, PFED2' includes an encryption unit 602, 618 interfacing with the trusted environment side of the given trust boundary, and a communications unit 606, 622 interfacing with the untrusted environment side of the given trust boundary. The encryption and communication units 602, 618 and 606, 622 operate to preserve the safe bidirectional passage of message traffic across each trust boundary, thereby guarding the trusted nature of communication between trusted devices (such as between TD1 and router 614, and between router 614 and TD2) across an intervening gap in trusted environment.

Auxiliary Adaptation Link

Figure 5:
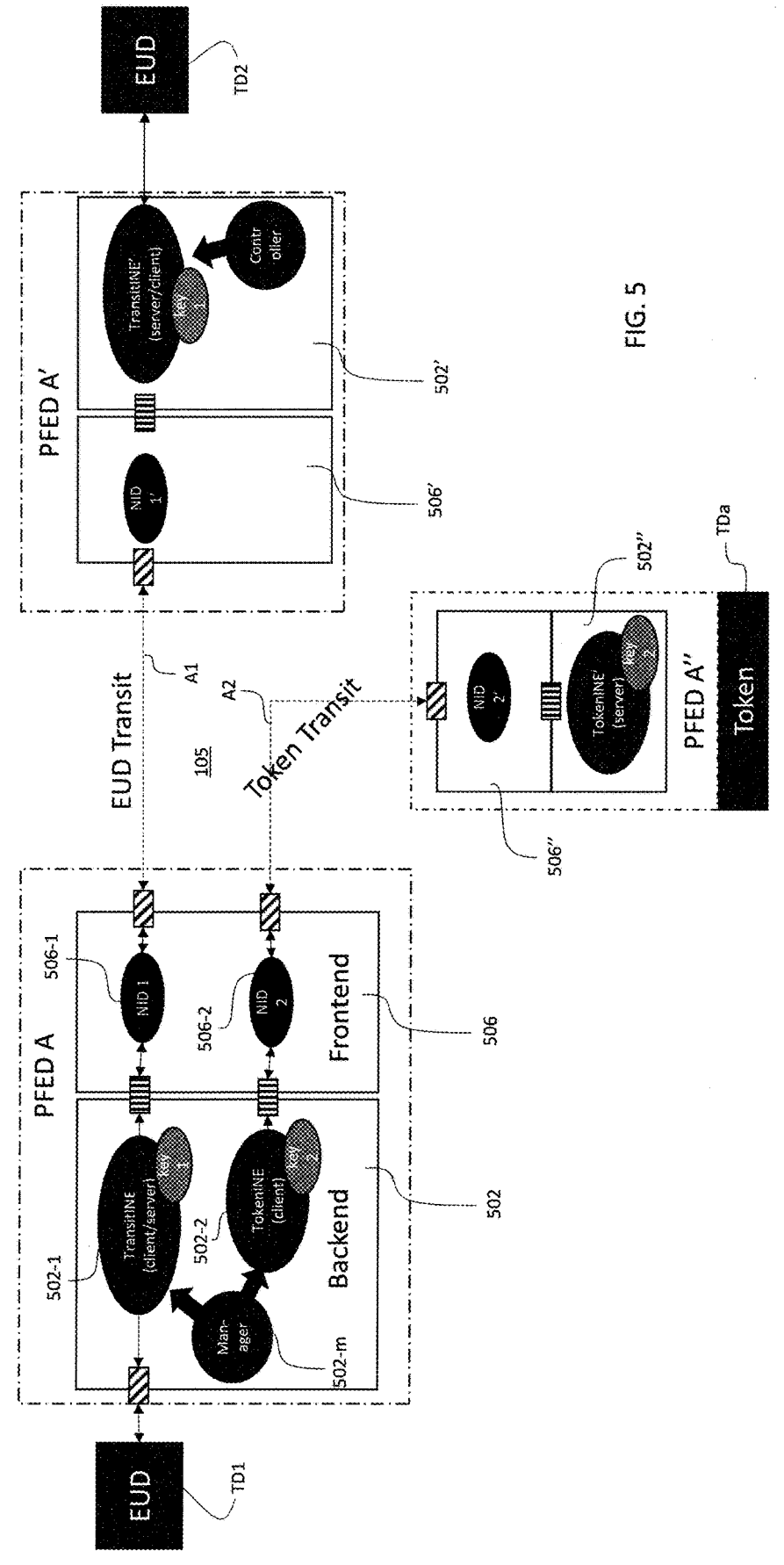
FIG. 5 is a schematic diagram illustrating the mutual pairing of a multi-channel main encrypting device with another main encrypting device and with an auxiliary encrypting device in accordance with an exemplary embodiment of the present invention.

FIG. 5 schematically illustrates more fully an exemplary embodiment of the trusted system formed in accordance with certain aspects of the present invention. The trusted system in this embodiment serves trusted devices TD1, TD2 in the form of end user devices (EUD) like mobile phones, for instance. The trusted system includes paired encrypting devices, PFED A, PFED A' which establish a wireless main communication link (marked EUD Transit) for bidirectional communication between the trusted devices. Much as in preceding embodiments, the trusted system thereby cryptologically tethers the user devices TD1, TD2 together for trusted communication with one another. Each encrypting device is preferably implemented as a PFED type devices, such as illustrated in the embodiments of FIGS. 2, 3, 3A. The encrypting devices PFED A, PFED A' respectively include encryption units 502, 502' coupled for passive communication interfaces to their trusted device TD1, TD2 via suitable trusted interconnects. The encrypting devices PFED A, PFED A' also respectively include communications units 506, 506' having active/addressable interfaces for bidirectional communication across an untrusted network 105.

In this embodiment, at least PFED A is formed with a multi-channel configuration, defining separate PFED channels having a fanout arrangement for separate cryptologic tethering to PFED A' and PFED A", under the control of a manager unit 502-m. As illustrated, the multiple PFED channels establish a main communication link EUD Transit with PFED A' which serves the user device TD2, as well as one or more auxiliary communication links such as a Token Transit link with PFED A" which serves the auxiliary device TDa in this case, namely a token.

In the example shown, the auxiliary encrypting device PFED A" is employed to establish an auxiliary communication link with one of the encrypting devices for the trusted user devices TD1, TD2 to augment security for the trusted system. Additional auxiliary encrypting devices may be employed to establish communication with one of the encrypting devices PFED A or PFED A' serving of the trusted user devices TD1, TD2, in certain alternate embodiments. The auxiliary encrypting device PFED A'' establishes an auxiliary communication link (marked Token Transit) with a corresponding channel of PFED A, whereby trusted communication may occur also between encryption units for the auxiliary device TDa and trusted user device TD1. Like PFED A', this auxiliary encrypting device PFED A'' is cryptologically tethered as disclosed herein to a channel of PFED A to establish for example a dedicated wireless auxiliary communication link therewith. A suitable auxiliary device TDa that is also trusted may then undergo trusted communication with the trusted user device TD1 across the untrusted network 105.

To establish the auxiliary communication link, the trusted system may be equipped with a separate PFED encrypting device comparable to the encrypting device PFED A. But in this embodiment PFED A is preferably configured as a multi-channel encrypting device having a fanout configuration of channels including both a main PFED channel establishing the main communication link with PFED A' and the an auxiliary PFED channel establishing the auxiliary communication link with PFED A''. The first PFED encryption channel is defined by encryption unit 502-1 and communication unit 506-1 which suitably operate in much the manner illustrated in connection with the embodiments of FIGS. 2, 3, 3A to establish the main communication link with PFED A' which serves trusted device TD2 coupled thereto. The encryption unit 502-1 in this particular embodiment operates to establish a main 'transit' communications link A1 for message traffic (EUD Transit) between the trusted End User Devices TD1, TD2. As such, it is denoted the Transit In-Line-Encryption unit (TransitINE) which operates as needed, either as a client or server to support EUD Transit message traffic initiated by either trusted device TD1, TD2 (with the paired TransitINE' of the trusted device TD2 operating in complementary manner as either a server or client to support the same).

The second PFED encryption channel is defined by encryption unit 502-2 and communication unit 506-2 which also operate suitably in much the manner illustrated in connection with the embodiments of FIGS. 2, 3, 3A, but do so to establish the auxiliary communication link with PFED A'' which serves a trusted auxiliary device TDa coupled thereto. In the exemplary embodiment shown, the auxiliary device TDa preferably forms a security token of any suitable type known in the art, such as a Crypto Ignition Key (CIK), and is integrated with the PFED A'' device (although it may be formed as a separate trusted device coupled to PFED A''). Such CIK token provides for multifactored enabling of cryptologically tethered communication between the trusted user devices TD1, TD2. More specifically, the encryption function will not start for PFED A of trusted user device TD1 without successful wireless tethering with the token TDa via PFED A''. If the trusted user device TD1 and/or its encrypting device PFED A are stolen, lost, or misplaced away from the CIK token TDa and its PFED A'', trusted communication with the trusted user device TD2 is safely and passively rendered inactive. Since a second key 2 for communication with the CIK token's PFED A'' is employed within PFED A, the trusted system is also protected from the security-compromising loss of a complete key for enabling communication with PFED A' which would otherwise reside fully within a stolen, lost, or misplaced PFED A.

The second encryption unit 502-2 in this particular embodiment operates as a 'transit' conduit for message traffic (Token Transit) between the trusted device TD1 and the CIK token TDa. The second encryption unit 502-2 is accordingly denoted the Token In-Line-Encryption unit (TokenINE) which operates normally as a client to support this Token Transit message traffic initiated by the trusted device TD1 (with the paired TokenINE' of the CIK token TDa operating responsively as a server).

Each of the communications units 506-1, 506-2 of the encryption channels defined by encrypting device PFED A are preferably formed to include a network interface device (NID) of any suitable type known in the art adapted for operation within the untrusted network 105. Similarly, the communications units 506', 506'' of encrypting devices PFEDA', PFED A'' are preferably formed to include an NID of suitable type known in the art adapted for communication respectively with the communications units 506-1, 506-2 of encrypting device PFED A through the untrusted network 105.

Although not separately distinguished, the untrusted network 105 traversed by the communication link A1 for EUD message transit between trusted devices TD1, TD2 may be different from the untrusted network 105 traversed by the communication link A2 for token transit between the trusted device TD1 and the auxiliary token device TDa. For example, link A1 in a given application may traverse a wide area radio network, such as a cellular for mobile phone devices, while the link A2 in the same application may traverse a more localized network such as a BLUETOOTH network.

The auxiliary token device TDa may be of any suitable type known in the art, depending on the requirements of the given embodiment and particularly intended application. If a mobile phone were employed as the trusted EUD TD1, the token device TDa could be another BLUETOOTH enabled mobile phone, a custom BLUETOOTH dongle, or the like. The token device provides token-based authentication in view of the trusted device TD1. It may be activated in certain embodiments and applications by predetermined event, such as a manual actuation of a push button, whereupon it broadcasts a digital token through the communications link A2. If a split-token approach is taken to mitigate risk, a portion of the token, or token split, is broadcast. If the manager unit **502-*m*** of the encrypting device PFED A for the trusted device TD1 is 'up and listening' for the token split, it receives the token split and authenticates the same. Suitable boot up processes may then ensue to establish the communications link A1, such that EUD message traffic may flow therethrough.

If authentication fails, the manager unit **502-*m* of PFED A for the trusted device TD1 continues to withhold boot up for communications link A1 until a good token split is presented. Alternatively, if authentication fails, the manager unit 502-*m*** of PFED A may create a new token split and transmit to PFED A'' of the token device TDa for a subsequent attempt.

Conventionally, CIK token devices are often implemented with wired connections to avoid the heightened risks normally associated with their wireless connection. This is obviated by use of PFED A'' to cryptologically tether a CIK token device TDa for trusted communication with the trusted EUD device TD1 (via that device's PFED A). Since the wireless cryptologic tethering function is established by the modular pair PFED A-PFED A'', it is transparent to the CIK token (much as it is for the trusted EUD device TD1). Hence, the CIK token device itself has no need to take on any cryptographic function and may be 100% off the shelf. Additionally, because operation is wireless, it obviates the need to create an additional physical penetration into the trusted environment of the host device TD1, as the connection of a wired CIK device would require. This minimizes both manufacturing cost and physical access risk.

Unlike a conventional wired token device which must be attached to its host device, moreover, when the host device is out of the user's possession (e.g. lost/stolen/etc.), the wireless token device TDa will not be attached, therefore not necessarily lost with it. Also unlike a conventional wired CIK device, the wireless token device TDa need not be repeatedly inserted and pulled out, tempting users to just leave the token device in place and defeat the very purpose of having separate security factor. Finally, the wireless token device TDa is free to be implemented with any suitable form factor for a given embodiment or application, such as by use of commercially available devices like smart watches running a suitable software application to implement PFED A" for the CIK token device TDa.

Figure 5A:
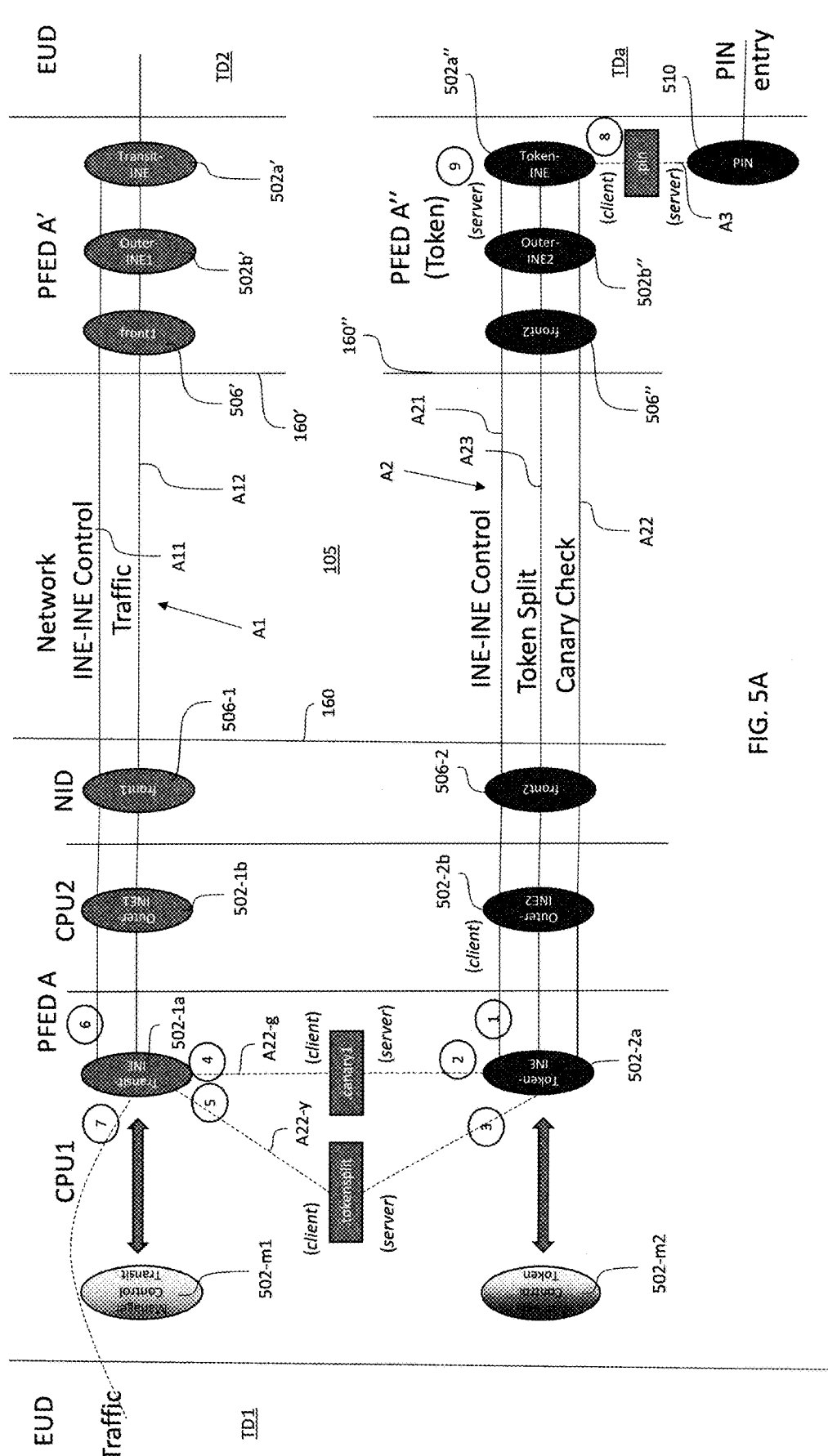
FIG. 5A is a schematic diagram illustrating an exemplary flow of processes during operation of the embodiment of FIG. 5 to cryptologically tether various trusted devices to one another for trusted communication through an untrusted network.

Turning to FIG. 5A, there is shown a diagram schematically illustrating an exemplary flow of processes for establishing the communications links A1, A2 to cryptologically tether to one another respective pairs of the trusted EUD and CIK token devices TD1, TD2, TDA in the trusted system embodiment of FIG. 5. The communication links A1, A2 cross respective ones of the trust boundaries 160, 160', 160" for the trusted devices TD1, TD2, TDa, and traverse the intervening untrusted network(s) 105 therebetween.

As shown in greater detail, the multi-channel encrypting device PFED A for trusted device TD1 includes TransitINE and TokenINE encryption units 502-1, 502-2 in its respective channels. Each encryption unit 502-1, 502-2 is preferably implemented with the multiple inline encryption unit configuration such as illustrated in FIG. 3. The TransitINE encryption unit 502-1 is thus configured with an inner encryption portion 502-1$a$ (Transit-INE) and an outer encryption portion 502-1$b$ (Outer-INE1). The TokenINE encryption unit 502-2 similarly configured with an inner encryption portion 502-2$a$ (Token-INE) and an outer encryption portion 502-2$b$ (Outer-INE2).

The encrypting device PFED A' for the other EUD trusted device TD2 includes a TokenINE encryption unit 502' preferably also implemented with the multiple inline encryption unit configuration as illustrated in FIG. 3. As such, encryption unit 502' is configured with an inner encryption portion 502$a$' (Transit-INE) and an outer encryption portion 502$b$' (Outer-INE1).

The encrypting device PFED A" for the auxiliary token device TDa includes a TransitINE encryption unit 502" preferably implemented as well with the multiple inline encryption unit configuration such as illustrated in FIG. 3. Encryption unit 502" of PFED A" is accordingly configured with an inner encryption portion 502$a$" (Token-INE) and an outer encryption portion 502$b$" (Outer-INE2).

The different encryption channels of encrypting device PFED A are preferably controlled by respective manager portions 502-$m$1, 502-$m$2 of manager unit 502-$m$. During operation, these portions of the manager unit 502-$m$ cooperatively control the Transit-INE portion 502-1$a$ and Token-INE portion 502-2$a$ of encrypting device PFED A to actuate independent processes that are intercoupled via the dashed communication paths A22-$y$ and A22-$g$. Client and server operational relationships are illustratively employed in establishing these and other communication paths, as shown. More specifically, the points marked (client), (server) indicate particular roles as presented at opposed endpoints of the given communication paths. Where indicated, a client attempts to connect a given communication path by making request at an endpoint of that communication path, but cannot proceed until its corresponding server is activated at the other endpoint to complete the client request.

Both the Transit-INE portion 502-1$a$ and Token-INE portion 502-2$a$ of PFED A are started and restarted respectively by Transit/Token manager portions 502-$m$1, 502-$m$2 defined by the manager unit 502-$m$. Such control is executed in a manner suitable for the particularly intended application. An exemplary flow of processes occurs as follows for the embodiment shown. For clarity of illustration, numbered processes carried out by certain INE portions are schematically marked by corresponding circled numbers in FIGS. 5A, 5B.

PFED A's Token-INE Portion: The Token-INE portion 502-2$a$ of PFED A is executed to carry out the following processes:

Process 1: Complete a successful authentication handshake with the remote Token-INE portion 502$a$" for the token device TDa. A successful authentication handshake establishes the INE-INE Control path A21 through which control messages and/or commands between the INE portions of PFED A and PFED A" may be exchanged. Preferably, a successful authentication handshake permits a so-called 'canary check' to be made of the token device TDa. That is, a check is made of the token device's operational status, for example, by simply checking for a valid response prompted from the token device TDa acting in this regard as the canary (much as in a coal mine). A request for response may be sent to the token device/canary; and, if a correct response is not received, the canary is presumed "dead." When canary=dead, appropriate action would be taken by the requestor (e.g. terminate certain operation/function). A Canary Check communication path A22 is established for confirming the operational status of the remote Token-INE portion 502$a$" in this manner. A Token Split communication path A23 may then be established for passage of the appropriate token split data upon successful canary check, as illustrated. Alternatively, the token device TDa may serve for example as a proximity sensor whose ON/OFF state simply determines whether or not the transit link (such as via the Traffic communication path A12) is established.

Process 2: Responsive to the successful authentication handshake of process 1, start or set a server signal/state at a suitably defined endpoint or node (.canary1) for the Transit-INE portion 502-1$a$ to connect to as a client when ready. Upon such client connection to .canary1 by the Transit-INE portion 502-1$a$, the Token-INE portion 502-2$a$ acknowledges, and the dashed communication path A22-$g$ between the two INE portions 502-1$a$, 502-2$a$ is responsively set up.

Process 3: Responsive to the successful authentication handshake of process 1, start or set a server signal/state at a suitably defined endpoint or node (.tokensplit) and await connection thereto by the Transit-INE portion 502-1$a$ as a client. Upon such client connection to .tokensplit by the Transit-INE portion 502-1$a$, the Token-INE portion 502-2$a$ acknowledges, and the dashed communication path A22-$y$ between the two INE portions 502-1$a$, 502-2$a$ is responsively set up.

Once all communication paths A21, A22, A23 are thus established to set up the suitable intercoupling of INE portions 502-1$a$, 502-2$a$ (via the dashed communication paths A22-$g$, A22-$y$), the communication paths between encrypting devices PFED A and PFED A' may be established to support EUD message traffic therebetween. If any of the communication paths A21, A22, A23 terminates, the communication paths between encrypting devices PFED A and PFED A' terminate as well, as at least one of the intercoupling paths A22-g, A22-y would be broken.

PFED A's Transit-INE Portion: The Transit-INE portion 502-1a of PFED A is executed to carry out the following processes:

Process 4: Connect as a client to .canary1 to establish the dashed communication path A22-g and complete the Canary Check communication path A22 with the Token-INE portion 502-2a. This process cannot complete unless the Token-INE portion 502-2a has successfully communicated with the Token-INE portion 502-2a of PFED A".

Process 5: Connect as a client to .tokensplit to establish the dashed communication path A22-y and complete the operational intercoupling with the Token-INE portion 502-2a. This process cannot complete unless the Token-INE portion 502-2a has successfully set a server at .tokensplit. When completed, a token is retrieved, used, then recomputed and stored on the remote Token-INE portion 502a" of the auxiliary device TDa over communication path A23.

Process 6: Complete a successful authentication handshake with the remote Transit-INE portion 502a' of PFED A' for the trusted device TD2. A successful authentication handshake establishes the INE-INE Control path A11 through which control messages and/or commands between the INE portions of PFED A and PFED A' may be exchanged. It also establishes the Traffic communication path A12 between encrypting devices PFED A and PFED A' for the passage of EUD message traffic therethrough.

Process 7: Open the EUD interface with trusted device TD1 and begin encrypting and decrypting message traffic between the trusted EUD devices TD1, TD2, as passed through the Traffic communication path A12.

If any of the communication paths A11, A12, A21, A22, A23 terminates, or if any of the intercoupling paths A22-g, A22-y is broken, the communications link A1 between encrypting devices PFED A and PFED A' is broken, and the flow returns to process 1 at the Token-INE portion 502-2a.

PIN Entry Unit: The Token-INE 502a" of PFED A" is executed to carry out the following processes:

Process 8: To further augment security, a personal identification number (PIN) entry unit 510 is preferably provided either with or as part of the encrypting device PFED A" for the auxiliary token device TDa in the illustrated embodiment. The PIN entry unit 510 sets a server at a node pin. The Token-INE portion 502a" attempts to establish the dashed communication path A3 with the PIN entry unit 510 by generating a client prompt at a node .pin. Once the communication path A3 is established, the Token-INE portion 502a" obtains a user entered PIN from the unit 510. This is repeated until the PIN provided by the PIN entry unit 510 successfully unwraps certain secured contents of the Token-INE portion 502a".

Process 9: Upon completion of process 8, the Token-INE portion 502a" is prepared for authentication by the Token-INE portion 502-2a of PFED A. The Token-INE portion 502a" thereafter remains responsive to commands from the PFED A Token-INE portion 502-2a. Preferably, if there is a proximity request generated by PFED A, and the auxiliary token device and PFED A" has moved out of range, the proximity request eventually fails. This then prompts a suitable sequence of responsive events at PFED A and trusted device TD1, in addition to reverting back to process 1 on the PFED A Token-INE portion 502-2a.

Figure 5B:
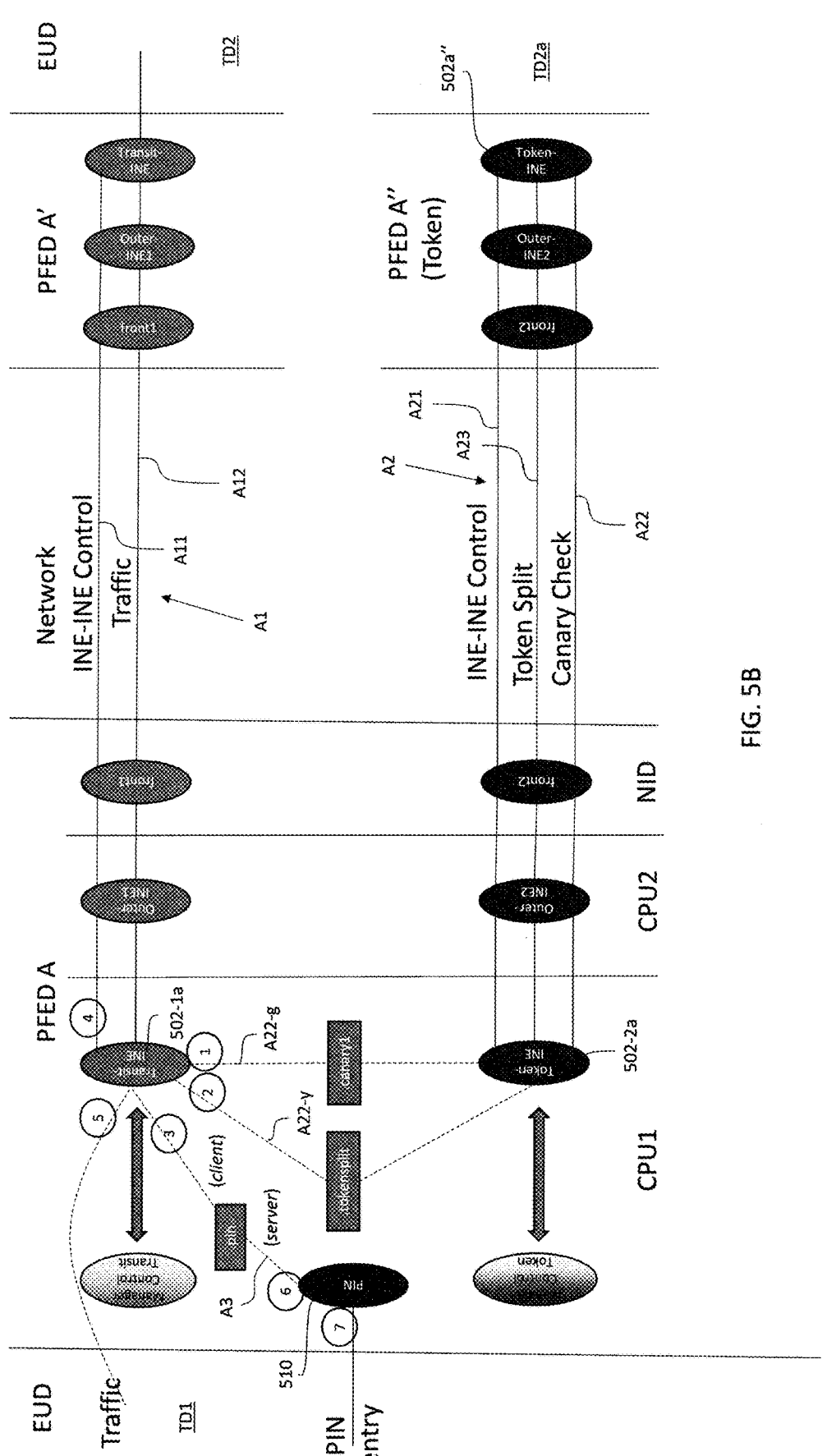
FIG. 5B is a schematic diagram illustrating an exemplary flow of processes during operation of the embodiment of FIG. 5, with a certain modification, to cryptologically tether various trusted devices to one another for trusted communication through an untrusted network.

FIG. 5B is a diagram schematically illustrating an exemplary flow of processes for establishing the communications links A1, A2 to cryptologically tether to one another respective pairs of the trusted EUD and CIK token devices TD1, TD2, TD2a in a slightly different trusted system embodiment than shown in FIG. 5A. In the embodiment shown in FIG. 5B, the PIN entry unit 510 is provided either with or as part of the encrypting device PFED A for the trusted device TD1, rather than the encrypting device PFED A" for the auxiliary token device TD2a. The flow of processes carried out by Token-INE portion 502-2a of PFED A upon execution is identical to that shown in FIG. 5A. But the flow of processes carried out by the Transit-INE portion 502-1a of PFED A upon execution is different. The PIN entry unit 510, of course, also interacts with that Transit-INE portion 502-1a in this embodiment.

In certain embodiments and applications, local pin entry may be locally initiated by the Transit-INE portion 502a' of PFED A'. The Transit-INE portion 502a' would issue a PIN request that travels to the token to be entered there and returned to Transit-INE portion 502a' once the required key is correctly unwrapped.

PFED A's Transit-INE Portion: The Transit-INE portion 502-1a of PFED A illustrated in FIG. 5B is executed to carry out the following processes:

Process 1: Connect as a client to .canary1 to establish the dashed communication path A22-g and complete the Canary Check communication path A22 with the Token-INE portion 502-2a. This process cannot complete unless the Token-INE portion 502-2a has successfully set a server at .canary1.

Process 2: Connect as a client to .tokensplit to establish the dashed communication path A22-y and complete the operational intercoupling with the Token-INE portion 502-2a. This process cannot complete unless the Token-INE portion 502-2a has successfully set a server at. tokensplit. When completed, token split data is retrieved, used, then recomputed and stored on the remote Token-INE portion 502a" of the auxiliary device TDa over communication path A23.

Process 3: The PIN entry unit 510 sets a server at a node .pin. The Transit-INE portion 502-1a attempts to establish the dashed communication path A3 with the PIN entry unit 510 by generating a client prompt at a node .pin. Once the communication path A3 is established, the Transit-INE portion 502-1a obtains a user entered PIN from the unit 510. This is repeated until the PIN provided by the PIN entry unit 510 successfully recognized by the Transit-INE portion 502-1a.

Process 4: Complete a successful authentication handshake with the remote Transit-INE portion 502a' of PFED A' for the trusted device TD2. A successful authentication handshake establishes the INE-INE Control path A11 through which control messages and/or commands between the INE portions of PFED A and PFED A' may be exchanged. It also establishes the Traffic communication path A12 between encrypting devices PFED A and PFED A' for the passage of EUD message traffic therethrough.

Process 5: Open the EUD interface with trusted device TD1 and begin encrypting and decrypting message traffic between the trusted EUD devices TD1, TD2, as passed through the Traffic communication path A12.

If any of the communication paths A11, A12, A21, A22, A23 terminates, or if any of the intercoupling paths A22-*g*, A22-*y* is broken, the communications link A1 between encrypting devices PFED A and PFED A' is broken, and the flow returns to the initial process at the Token-INE portion 502-2*a*.

PIN Entry Unit: The Transit-INE portion 502-1*a* of PFED A in FIG. 5B is executed to carry out the following additional processes:

Process 6. The PIN entry unit 510 sets a server at a node .pin. The Transit-INE portion 502-1*a* attempts to establish the dashed communication path A3 with the PIN entry unit 510 by generating a client prompt at a node .pin. Once the communication path A3 is established, the Transit-INE portion 502-1*a* obtains a user entered PIN from the unit 510. This is repeated until the PIN provided by the PIN entry unit 510 successfully recognized by the Transit-INE portion 502-1*a*.

Process 7. Upon completion of process 6, the Transit-INE portion 502-1*a* is prepared for intercoupling with the PFED A Token-INE portion 502-2*a* in accordance with processes 1-5. The Transit-INE portion 502-1*a* thereafter remains responsive to the trusted device TD1 for supporting trusted communication with the remoted trusted device TD2 and the Transit-INE portion 502-1*a'* of that trusted device's PFED A'.

Figure 5C:
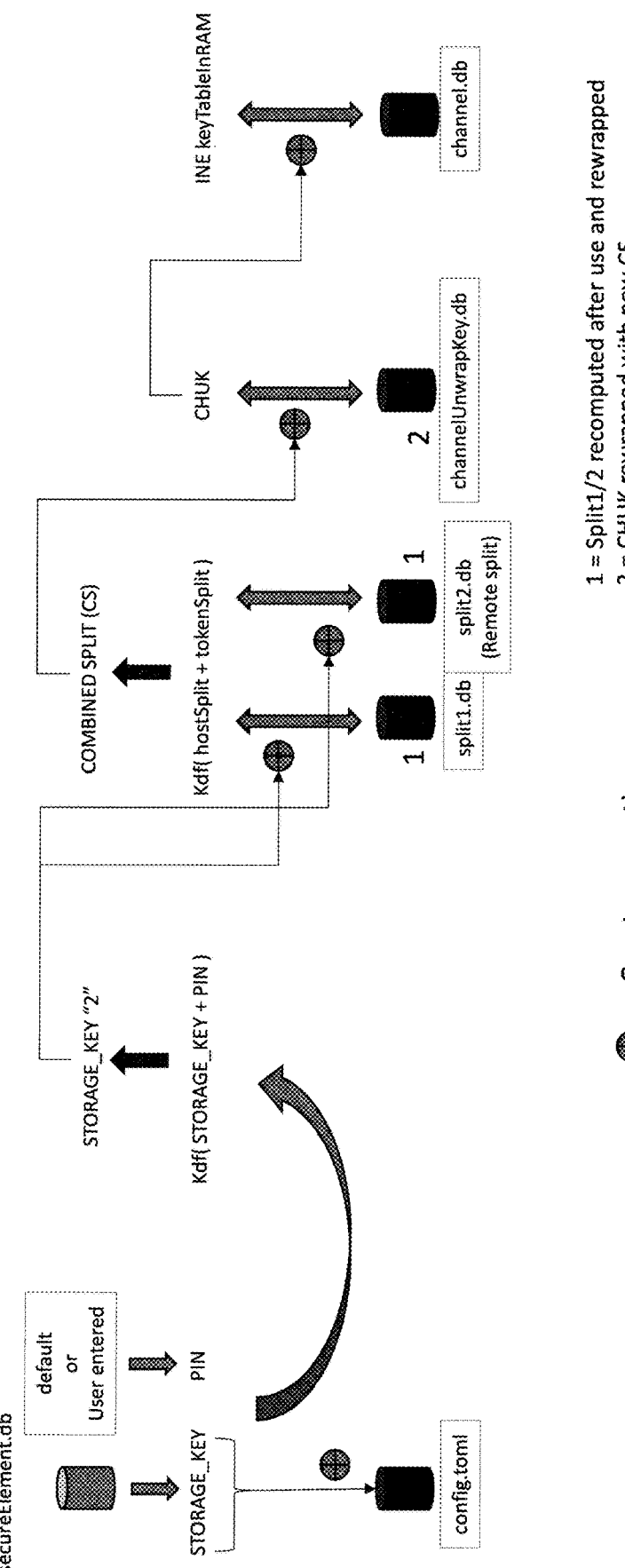
FIG. 5C is a schematic diagram illustrating one example of an 'unwrapping ceremony' process which may be carried out by the embodiment of FIG. 5 during system boot up.

When a token is employed, a key may be used for unwrapping the secured contents of a given encryption unit through a suitable process known in the art carried out during boot. FIG. 5C illustrates a so-called 'unwrapping ceremony' process carried out, for example, during boot up of a given unit/device/system. A storage key, STOR-AGE_KEY, retrieved from secured storage unwraps the configuration that will define how the rest of the system starts. As illustrated in the embodiments of FIGS. 5A, 5B, an optional PIN entry may be employed as well. In that case, the storage key and PIN are combined with a predetermined key derivation function (Kdf) to create a new storage key, STORAGE_KEY2, which is computer processed to unwrap a token split kept locally and one that is delivered by some other mechanism (for example, channel to a token). Once both token splits are available, they are combined by a Kdf to generate a combined token split CS. The CS is processed to unwrap the final channel unwrapping key, CHUK. In the meantime, the token splits are re-computed and entered in their respective storage media, and CHUK is re-wrapped with the newly generated CS. CHUK unwraps the final channel keys that are then loaded into RAM. Keeping CHUK the same simplifies unwrapping of the channel keys to run the given traffic, obviating the need to re-wrap the channel keys on disk had CHUK been changed.

Figure 5D:
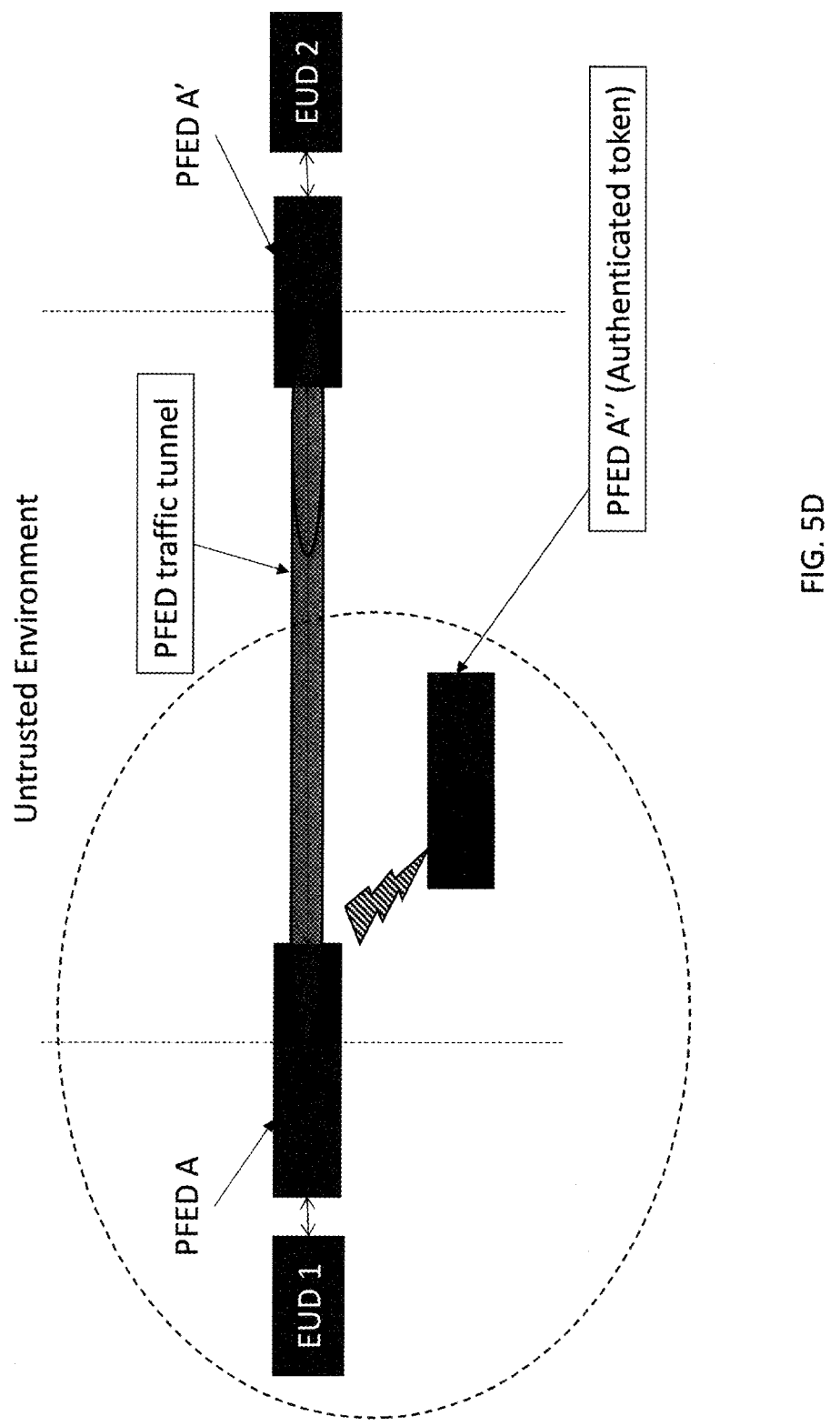
FIG. 5D is a schematic diagram illustrating the embodiment of FIG. 5 employing a certain type of proximity-limited auxiliary device for multifactored system activation, wherein the auxiliary device is disposed within an established proximity limit.
Figure 5E:
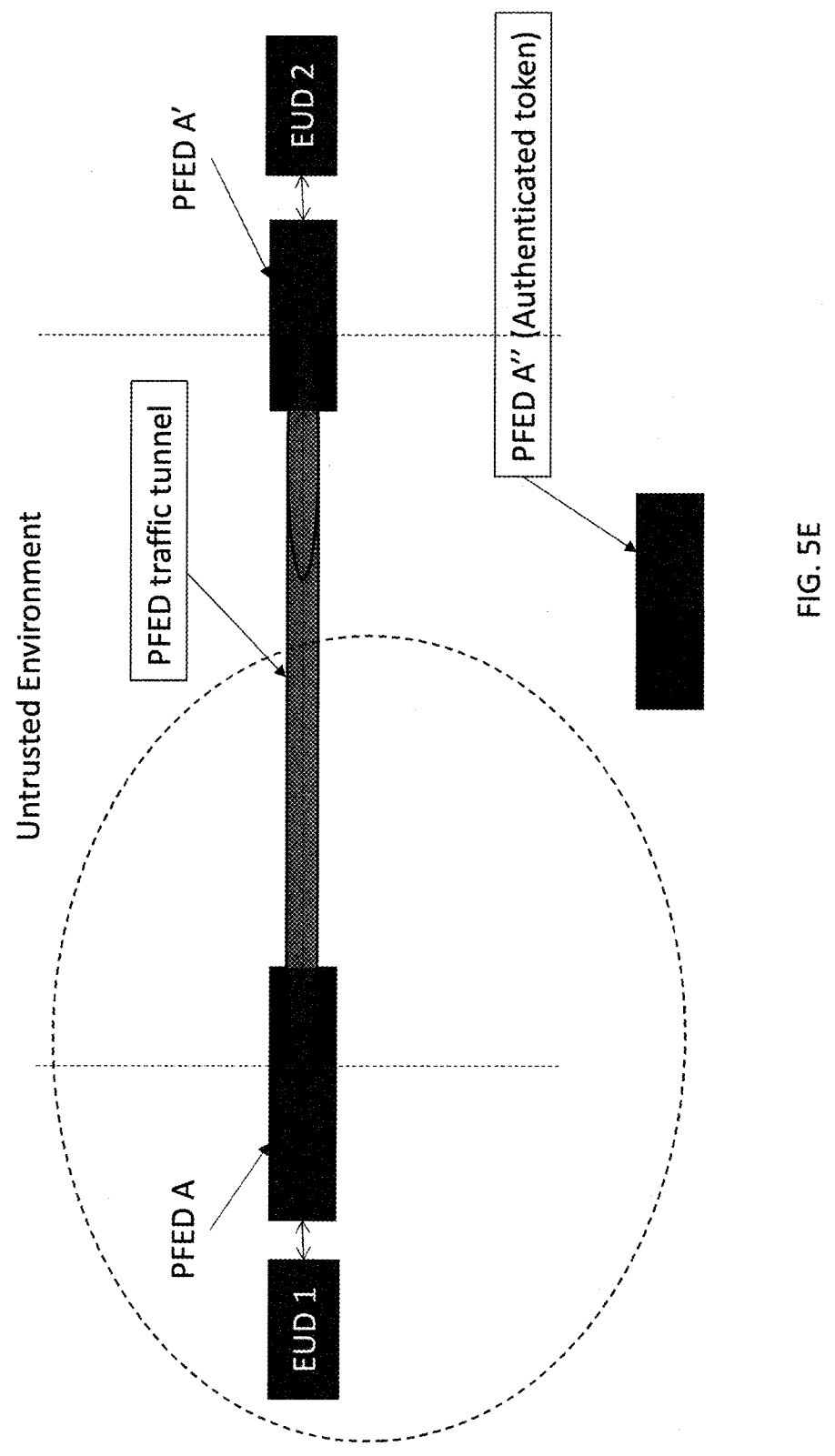
FIG. 5E is a schematic diagram illustrating the embodiment of FIG. 5 employing a certain type of proximity-limited auxiliary device for multifactored system activation, wherein the auxiliary device is disposed outside an established proximity limit.
Figure 5F:
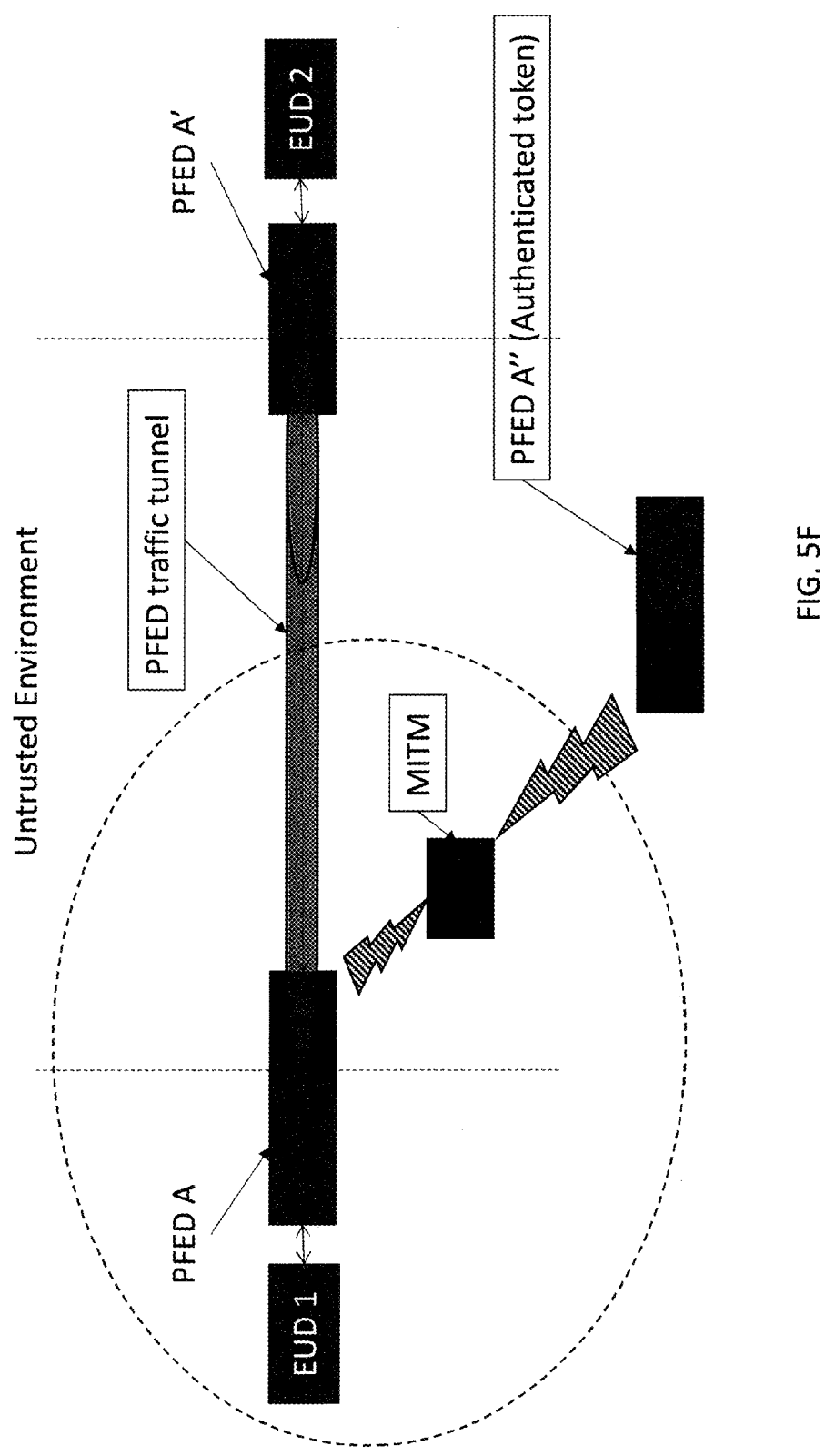
FIG. 5F is a schematic diagram illustrating the embodiment of FIG. 5 employing a certain type of proximity-limited auxiliary device for multifactored system activation, wherein the auxiliary device is disposed outside an established proximity limit but with a foreign device disposed within the proximity limit attempting to defeat a proximity check relative thereto.

FIGS. 5D-5F schematically illustrate the use of a token device to provide a proximity sensing feature in accordance with certain exemplary embodiments and applications. As noted herein, portable trusted devices like mobile phones are easily misplaced, lost, or stolen. Use of PFED-paired devices protectively isolates an untrusted communication network from the trusted side of a given device. In this illustrated embodiment a PFED-equipped wireless token device provides a convenient and independent factor which adds to the protection, whereby separation of a protected device and its PFED from the token device and its PFED beyond a certain limited proximity radius prompts the trusted system to safely render communication with the protected device inoperable. If the wireless token device is disposed within a predetermined proximity range as illustrated in FIG. 5D, the protected device's PFED remains enabled for normal operation. Conversely, if the wireless token device is disposed outside the predetermined proximity range as illustrated in FIGS. 5E and 5F, the protected device's PFED is disabled from normal operation.

The token device may be configured as illustrated in the embodiment of FIG. 5, provisioned for PFED-paired wireless communication with a host trusted device equipped with PFED A. In an exemplary application, the token device periodically beacons an encrypted "I'm here" message. PFED A may employ a timer, and if PFED A fails to detect the beacon before a certain timeout period it generates a proximity event. If PFED A does timely detect the beacon and authenticates the same, it restarts the timer and awaits the next beacon. Should the beacon fail to authenticate, the host PFED A identifies a beacon event and responds in predetermined manner based for instance on a certain applicable policy. Examples of event-driven responses include pausing traffic pending the beacon's reappearance, powering down the trusted side, and the like. In certain embodiments and applications the ebb and flow of network traffic may be tracked to determine the intervals in which a beacon broadcast is expected.

This would allow for tighter beacon event intervals for busier traffic and looser intervals for less busier traffic. For example, when a trusted host EUD is in use, it might be particularly important to ensure the token and host and/or their PFED devices are within enabling proximity, as illustrated in FIG. 5D. Thus a beacon event might require immediate remediation. But when the trusted host EUD is asleep, the proximity check could be more relaxed.

Because devices on trusted sides of a PFED-paired communication do not communicate directly to radio devices on the untrusted side (due to the complete isolation effected by PFED protected pairing), the trusted host's PFED A preferably initiates and times several challenge response transactions with the token device to confirm that the token device is disposed within acceptable range. PFED A references a predetermined upper time-limit for acceptable round trip time (for PFED communication), either at the factory during manufacture or during provisioning in the field. This aids primarily in detecting and guarding against any man in the middle (MITM) devices attempting to defeat the proximity check by for instance rebroadcasting traffic to a token actually disposed outside the requisite proximity range, or out-of-bounds. If a MITM device is present as illustrated in FIG. 5F, the round trip time should exceed an acceptable upper limit threshold.

This would be difficult through a wireless link without PFED architecture. Unlike typical proximity tests that sample signal strength to determine proximity distance, PFED pairing makes range detection practicable without needing to query the untrusted emitters directly. PFED pairing enables substantially accurate range detection just from examining the ebb and flow of normal traffic. Moreover, the required frequency of beacon emission may be regulated by detecting the amount of network traffic seen by the host device, thereby improving battery life of the token and increasing the precision of a proximity event.

Management Console Adaptation for Reconfiguring Encrypting Device

In certain embodiments of the subject trusted system, a management console may be coupled to one or both of the paired encrypting devices forming an encrypting module, such as a PFED module, serving remotely disposed trusted devices. The management console may be temporarily coupled to a given PFED device to reconfigure the same as required for proper operation. If the management console is disposed within the PFED device's trusted environment (within its trust boundary), the management console may be coupled directly via a data cable or other such physically wired measures. Otherwise, the management console may be cryptologically tethered through an auxiliary communication link via PFED device pairing, much like any other auxiliary device might be with the aid of correspondingly paired PFED devices.

Figures 6, 6A:
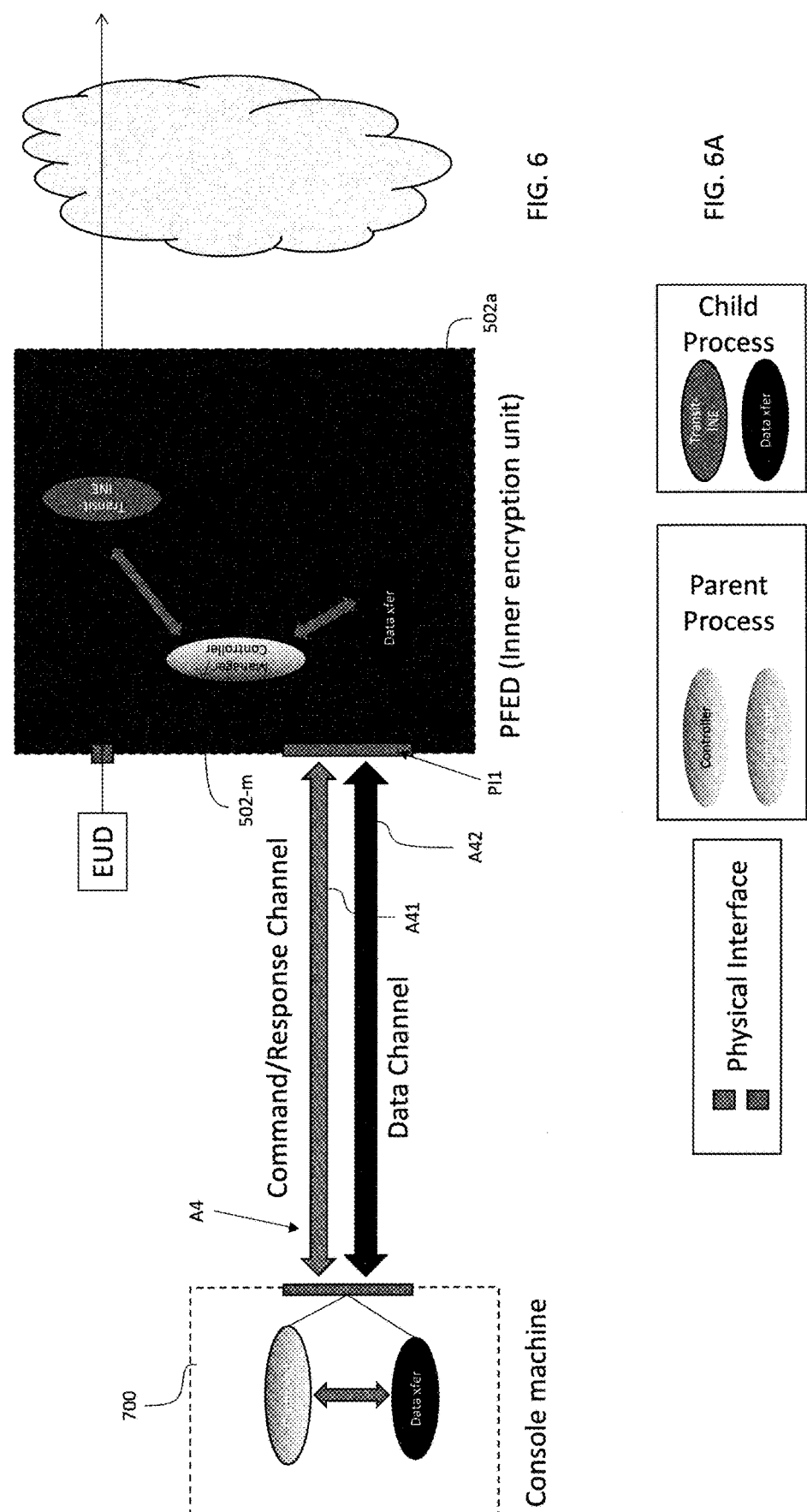
FIG. 6 is a schematic diagram illustrating local integration of an auxiliary device in the form of management console machine by cable connection to a main encrypting device such as shown in the embodiment of FIG. 5 for selective adaptation thereof.
FIG. 6A is a schematic diagram illustrating functional categories for certain features shown in FIG. 6.

FIGS. 6, 6A schematically illustrate local integration of a management console machine 700 by cable connection A4 to a physical interface PI1 to establish the communication paths defining a Command/Response Channel A41 and a Data Channel A42 to an Transit-INE encryption unit 502*a* of a PFED device. In the illustrated example, signals for both channels A41, A42 may travel on an Ethernet cable for instance, and distinguished from one another by a unique value in a type field of the Ethernet header. Preferably, all other Ethernet types would be blocked at the interface of the Transit-INE encryption unit 502*a*. The controller 502-*m* executes to monitor the interface PI1 for command messages from the command channel A41.

As noted in preceding paragraphs, auxiliary trusted devices may also include in certain embodiments a management console or the like which may be linked securely to the encrypting device of the trusted user device. The management console may be utilized then for selective adaptation of the trusted system by for instance enabling adjustment, calibration, or other adaptive reconfiguration of the same depending on the requirements of the particularly intended application.

Figures 7, 7A:
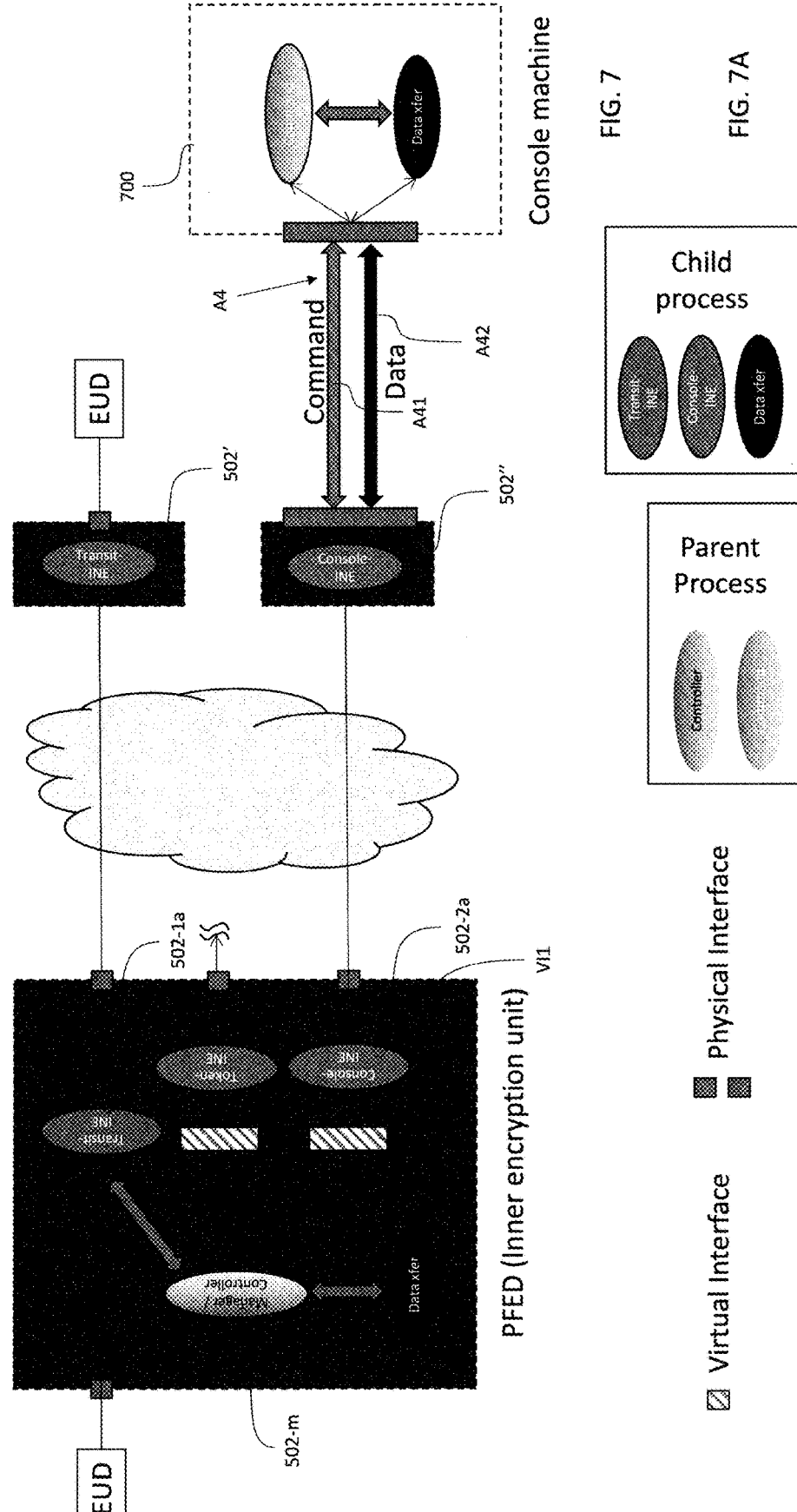
FIG. 7 is a schematic diagram illustrating remote integration of an auxiliary device in the form of management console machine by a cryptologically tethered auxiliary communication link established between main and auxiliary encrypting devices such as shown in the embodiment of FIG. 5 for selective adaptation thereof.
FIG. 7A is a schematic diagram illustrating functional categories for certain features shown in FIG. 7.

FIGS. 7, 7A schematically illustrate remote, or virtual, integration of the management console machine 700 to the Controller 502-*m*. In this exemplary case, the console machine 700 is treated as an auxiliary device of the remote PFED device whose encryption portion it is to reconfigure. As such, the console machine 700 is served by an additional auxiliary PFED device, and connects as in FIGS. 6, 6A to a suitable interface on the Console-INE 502″ of that auxiliary PFED device. As in the embodiments of FIGS. 5A, 5B, the remote PFED device is preferably configured as a multi-channel encrypting device including both a main encrypting device part establishing the main communication link with the PFED device of a trusted device EUD, and an auxiliary encrypting device part fanning out therefrom for establishing an auxiliary communication link with the PFED of the console machine 700. The multi-channel encrypting PFED device is thus equipped with an auxiliary encryption channel defined by a Console-INE encryption portion 502-2*a*. As shown, this auxiliary encryption channel may be in addition to one or more other auxiliary encryption channels in fan out arrangement with respect to the main transit encryption channel (defined by the Transit-INE portion 502-1*a*), such as for the Token-INE encryption portion illustrated in FIGS. 5A, 5B (or in place of that Token-INE encryption portion, depending on the particular application). In the interests of brevity and clarity, the Token-INE auxiliary channel is only partially indicated in FIG. 7.

Console messages from the console machine are transparently sent to the remote, or managed, PFED over this channel. They emerge from the Console-INE encryption portion 502-2*a* and are sent to the virtual interface VI1. The controller 502-*m* executes to monitor the virtual interface VI1 for command messages from the command channel A41 and respond with Data or Control messages as appropriate to the Console machine 700, as conveyed through the PFED-established cryptologic tether.

The remotely disposed management console 700 in the embodiment of FIGS. 7, 7A is thereby supported to operate essentially as if it were a locally integrated console (such as illustrated in FIGS. 6, 6A) as far as the controller is concerned. Preferably, such virtual interface would still only allow data of two incoming Ethernet types, dropping all others. This may be done, for example, with an eBPF filter. The advantages of such remote machine console integration are at least twofold. First, it obviates the need to be physically present to accomplish the same safe isolated console operation. Second, software code in both the console machine 700 and remote PFED encryption unit controller 502*a* may remain substantially the same as in the locally integrated case. As far as the PFED encryption unit manager/controller is concerned, the command interface behaves the same in either case. And the communications link across the untrusted environment would remain as secure as if the link were locally hardwired.

Figures 8, 8A:
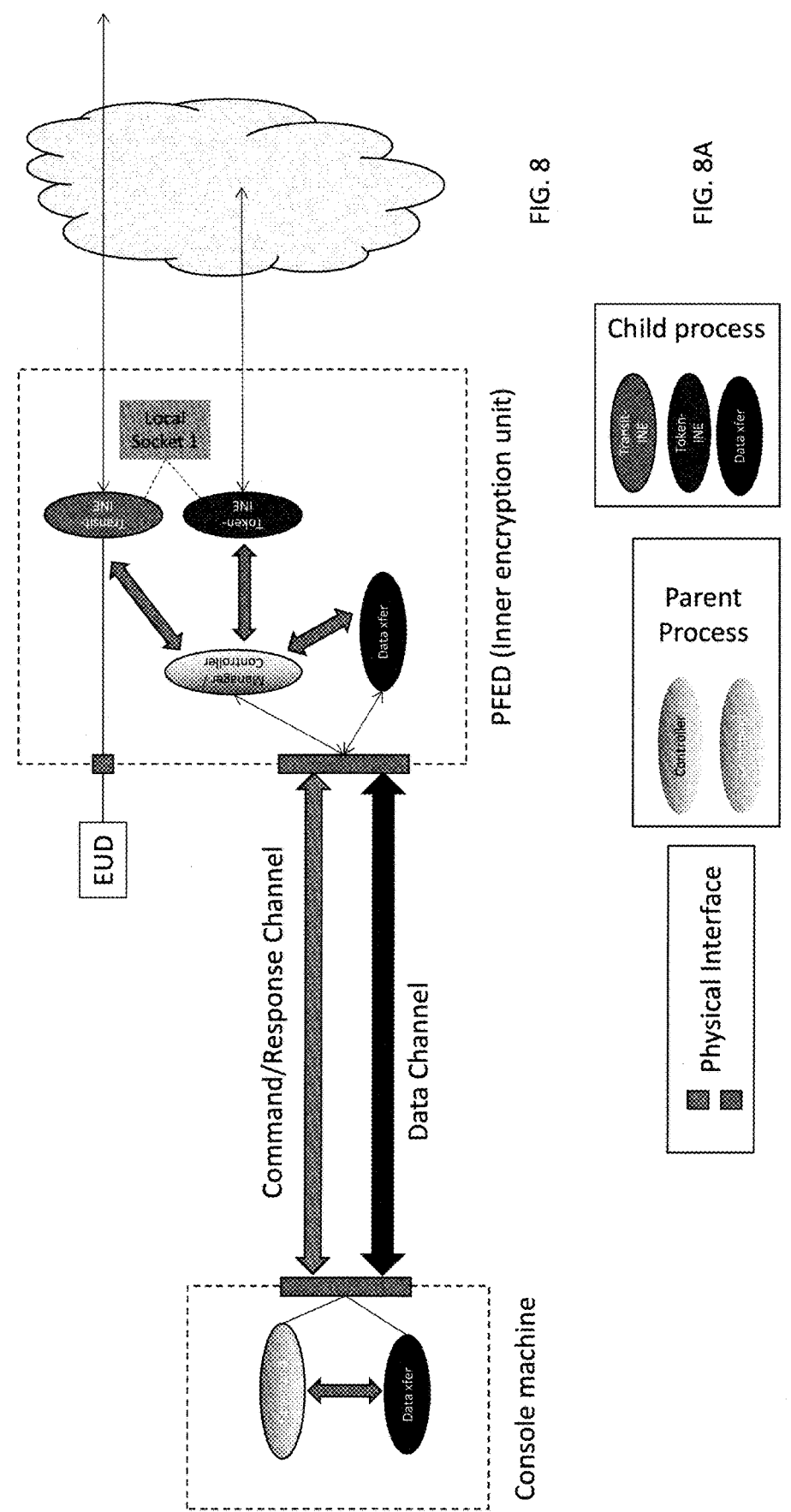
FIG. 8 is a schematic diagram illustrating local integration of an auxiliary device in the form of management console machine by cable connection to a multi-channel main encrypting device such as shown in the embodiment of FIG. 5 for selective adaptation thereof.
FIG. 8A is a schematic diagram illustrating functional categories for certain features shown in FIG. 8.
Figures 9, 9A:
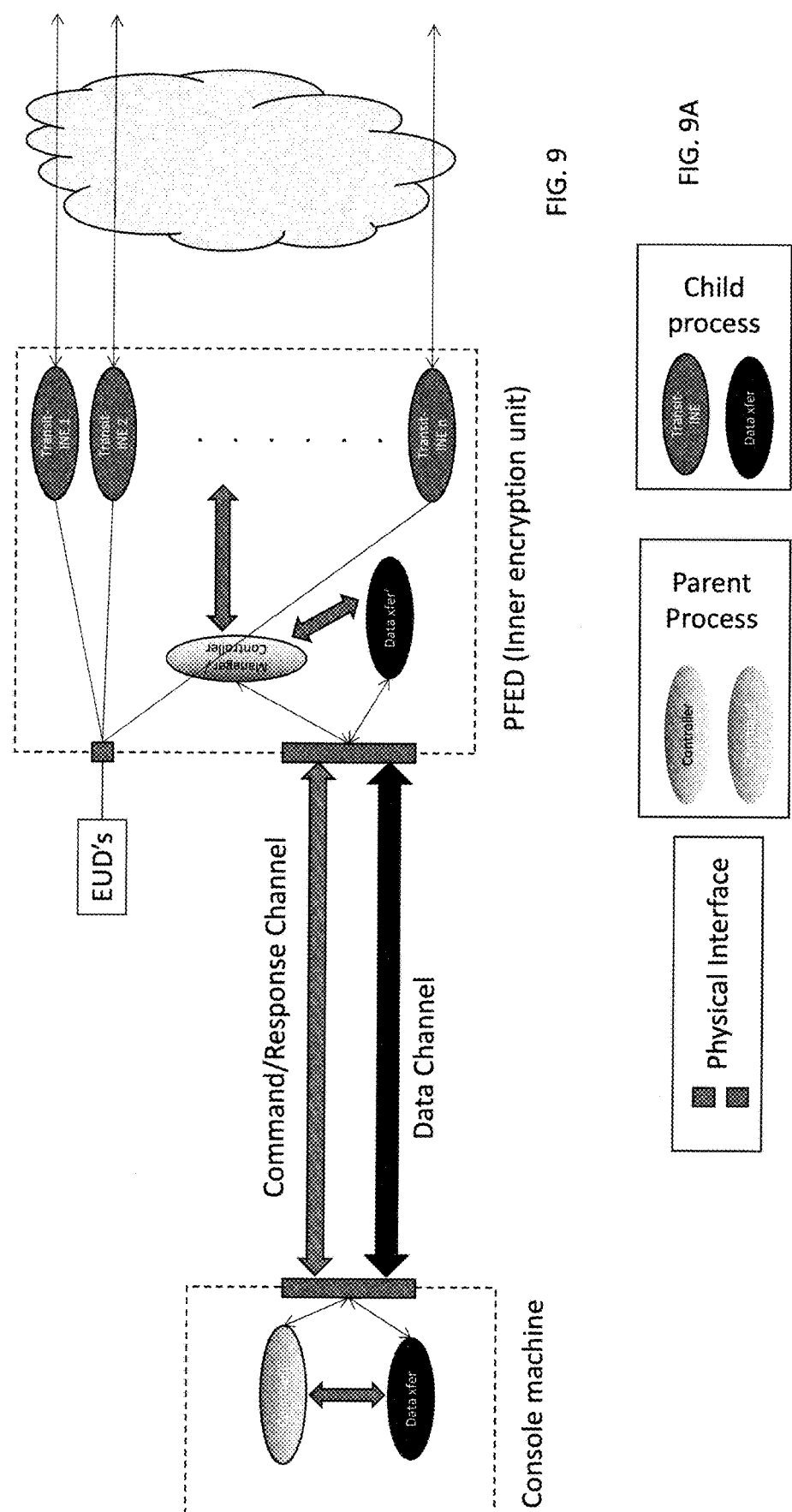
FIG. 9 is a schematic diagram illustrating local integration of an auxiliary device in the form of management console machine by cable connection to an encrypting device server in a hub & spoke enterprise application, for selective adaptation thereof.
FIG. 9A is a schematic diagram illustrating functional categories for certain features shown in FIG. 9.

FIGS. 8, 8A, 9, 9A schematically illustrate the local integration of a management console to a PFED device's inner encryption unit in certain other cases and embodiments. In FIGS. 8, 8A, local integration of the management console occurs with a PFED inner encryption unit is configured with an auxiliary Token-INE encryption channel, as shown. In FIGS. 9, 9A, local integration of the management console occurs with the bank of inner encryption units of a PFED server such as may be used, for example, in a hub & spoke enterprise application of the type illustrated in FIG. 4.

Figures 10, 10A:
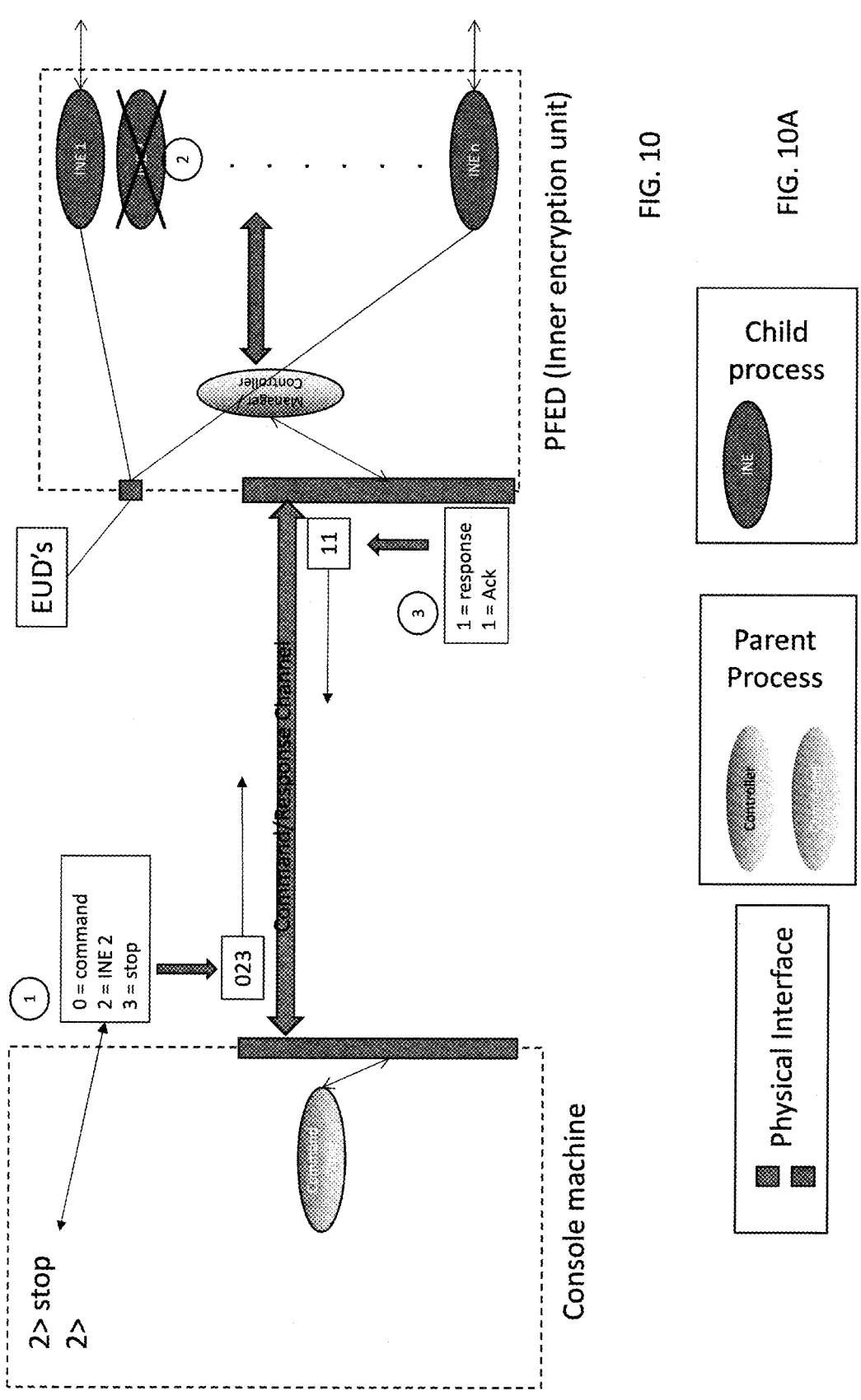
FIG. 10 is a schematic diagram illustrating local integration of an auxiliary device in the form of management console machine by cable connection to a main encrypting device such as shown in the embodiment of FIG. 5, for selective adaptation of the main encrypting device to carry out certain aspects of a command and response vectorization procedure.
FIG. 10A is a schematic diagram illustrating functional categories for certain features shown in FIG. 10.

FIGS. 10, 10A schematically illustrate certain aspects of a command and response vectorization procedure carried out for optimal isolation of a locally integrated management console from the given PFED device. The procedure preferably includes the following numbered processes as indicated in FIG. 10:

1. On the management console, convert a command string into a vector (for example, vector "023"="stop"). This can be done in any suitable manner known in the art. The idea is to reduce the burden of a recipient (i.e. a sensitive server) having to correctly parse a command given the attendant mistakes that may find their way into code. In this example, the vector is kept within a predetermined range and combination of digits. Send the vector over the command channel to the PFED server.
2. The PFED server's controller validates and completes the command. For example, it responds by stopping the INE 2 channel from further processing by use of a SIGTERM or other such parametric means.
3. The controller also informs the management console machine of resulting success or failure of command execution by selectively setting a response vector indicating as much.

The procedure establishes a one way command/response flow. Preferably, the managed PFED controller does not issue commands to the console machine, and only issues responses.

Figures 11, 11A:
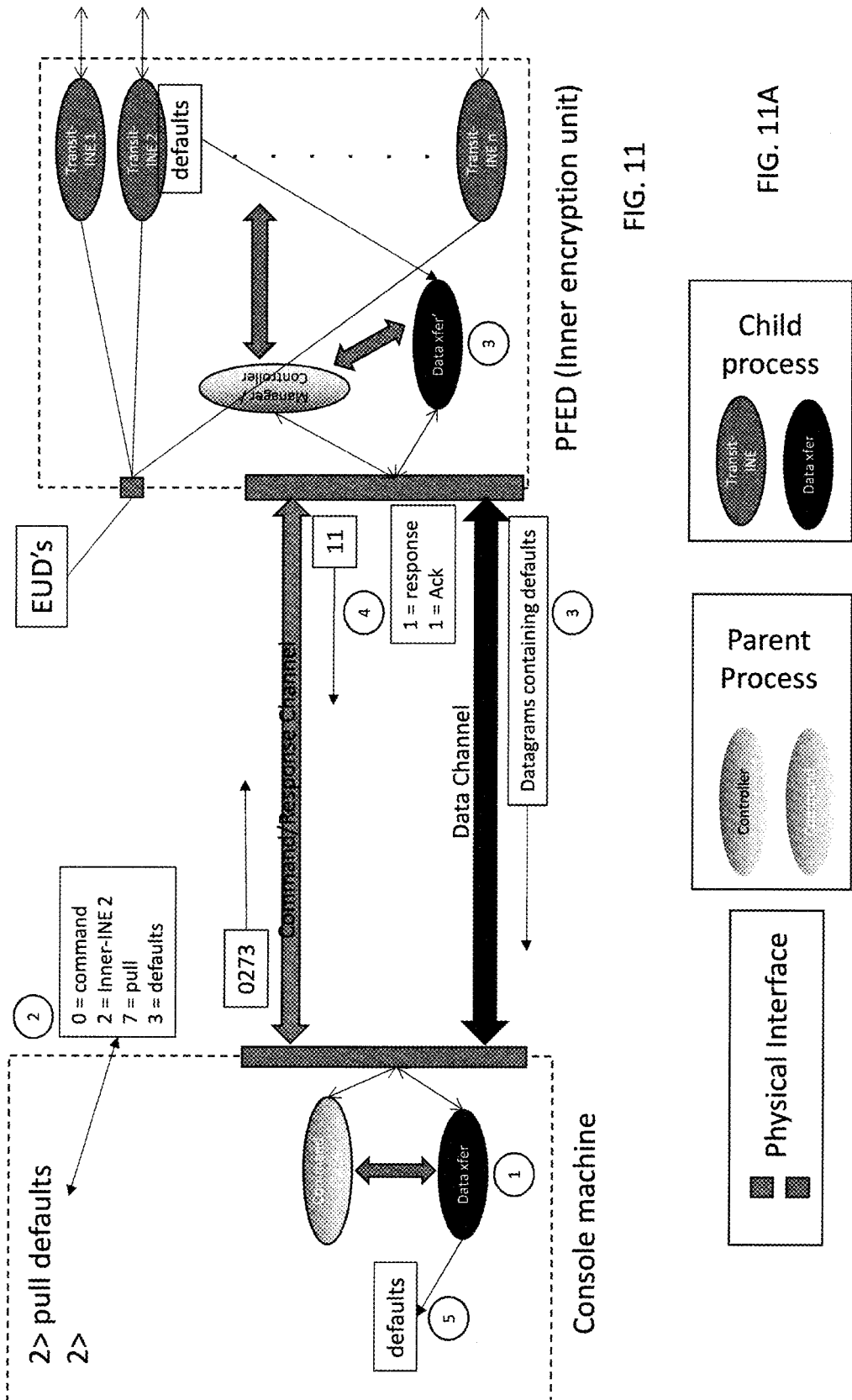
FIG. 11 is a schematic diagram illustrating local integration of an auxiliary device in the form of management console machine by cable connection to a main encrypting device such as shown in the embodiment of FIG. 5, for selective adaptation of the main encrypting device to carry out certain other aspects of a command vectorization and response procedure.
FIG. 11A is a schematic diagram illustrating functional categories for certain features shown in FIG. 11.

FIGS. 11, 11A schematically illustrate certain aspects of a command vectorization and response procedure carried out to transfer data. The procedure includes the following numbered processes as indicated in FIG. 11:

1. The console machine executes to pull default parameter values from the PFED server to which the console machine is coupled, and starts a data transfer agent (Data xfer) on the console machine.
2. The console machine vectorizes a command string and sends the resulting command vector to the PFED server over command channel.
3. The PFED server's controller validates the command and starts a data transfer agent on the managed PFED (Data xfer'), which then begins sending data to the console machine over the data channel.

4. Upon execution of the sending data transfer agent, the managed PFED controller sends a vector to the console machine indicating success or failure of the transfer. When the transfer is complete, Data xfer' exits to indicate completion of the transfer.

5. Optionally, depending on the requirements of the particularly intended application, the machine console may subject the local copy to additional processing before entering into storage.

Data may be sent in both directions using similar sequences of actions. The managed PFED controller is preferably configured to restrict what is sent or received.

Monitoring Agent Management Console Adaptation

Figure 12:
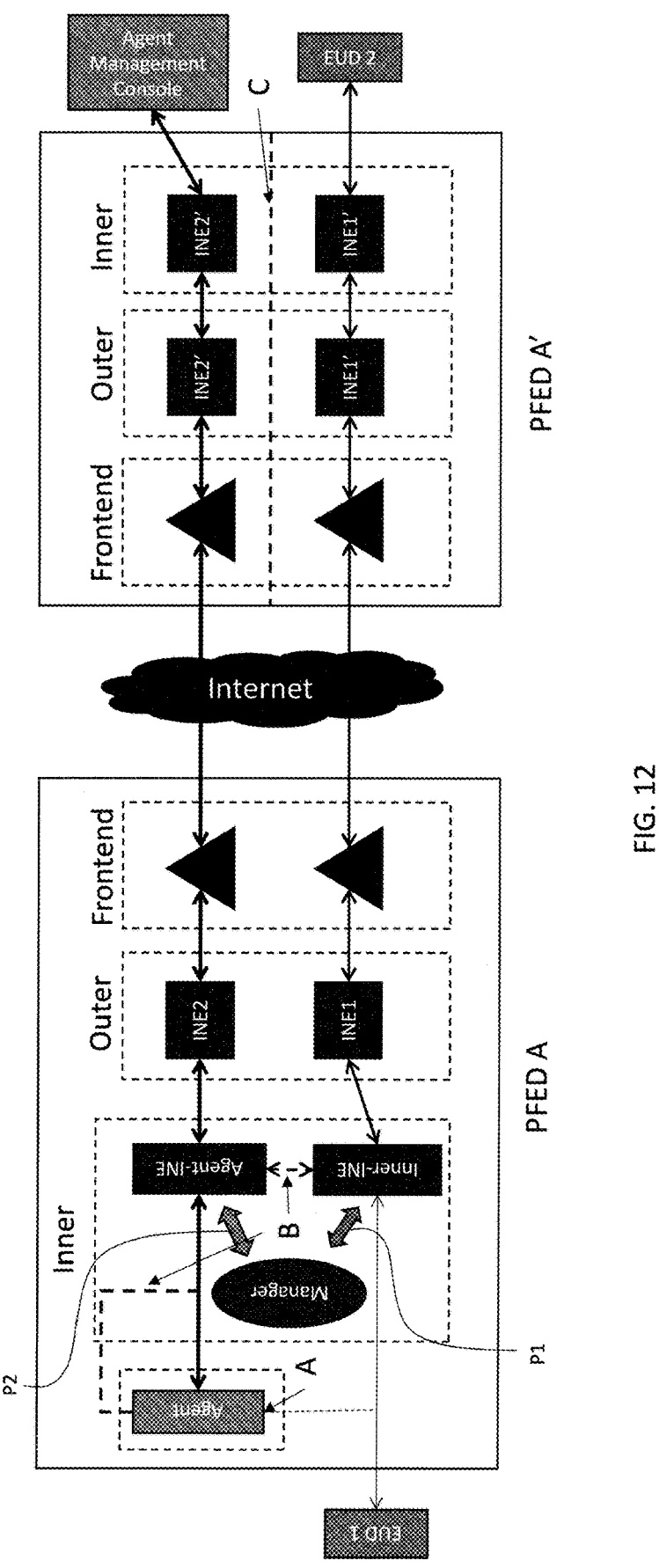
FIG. 12 is a schematic diagram illustrating remote integration of an auxiliary device in the form of an agent management console by a cryptologically tethered auxiliary communication link established between one channel of a multi-channel main encrypting device and an auxiliary encrypting device such as shown in the embodiment of FIG. 5 for selective adaptation of an agent machine therethrough.

Referring to FIG. 12, a secure point of presence Agent device may be employed in certain embodiments of the subject trusted system. Such Agent device is not be accessible to any element on the untrusted network and remains transparent to the trusted side of the PFED (transparent for instance to EUD 1). The device may be suitably employed to carry out various functions, such as a monitoring function. The Agent device in the illustrative embodiment shown is preferably implemented as a separate Software-On-Chip (SoC) or machine having a dedicated auxiliary PFED channel independent of the message transit channel for EUD 1. The Agent is managed on this auxiliary (out-of-band) channel by a remote Agent Management Console. As in preceding embodiments, encrypting device PFED A serving the trusted device EUD 1 is implemented with a multi-encryption channel configuration which includes a message transit channel for establishing a cryptologically tethered main communication link for message traffic with a corresponding portion/channel of PFED A' serving a remote trusted device EUD 2. The multi-channel encrypting device PFED A also includes an auxiliary encryption channel for establishing a cryptologically tethered auxiliary communication link for adaptation control/management traffic with a corresponding portion/channel of PFED A' serving the Agent Management Console, as shown.

As denoted by the broken line C, the remote encrypting device PFED A' does not necessarily need to house PFED paired end points for both the multiple encryption channels of PFED A. Each PFED paired end point may be defined by separate PFED devices for the remote EUD 2 and Agent Management Console. Alternatively, the PFED device for the Agent Management Console may be included within a separate PFED multi-channel server having encryption channels configured to pair respectively with multiple remote Agents.

The Manager of encrypting device PFED A is preferably configured to execute a parent process controlling both Inner-INE and Agent-INE processes to start, stop, and change the same based on certain predetermined policies P1, P2 suitable for the intended application. The Agent may run autonomously or may be managed depending on the requirements of the particularly intended application. The Agent is disposed outside the encryption unit of PFED A, but still within that encrypting device PFED A, and not part of the EUD 1 network address space. The Inner and Outer encryption units, as well as the Frontend communications unit are formed on separate machines in the illustrated embodiment, as indicated by the dashed block outlines.

The Agent A in this embodiment is operably coupled to monitor the traffic between EUD 1 and PFED A. The interface at the Agent A may be passive or active. If the Agent A is simply watching the blue wire it is of passive type. If the Agent A is responsive to a suitable commanded to interact with EUD 1 or any other element in that address space, the interface may become active and form part of the EUD 1-PFED A wire/network. Such interface would be safely configured through the cryptologically tethered auxiliary communication link by the Agent Management Console, served by the auxiliary encryption channel of PFED A—which in certain of the preceding embodiments does not directly serve a trusted device outside the Inner encryption unit (directly serving only the manager unit of PFED A in those embodiments).

A command path B may be established to extend from the Agent to the Agent-INE and on to the Inner-INE of the transit encryption channel. The Agent may utilize this command path B to effect control of the Inner-INE. Command data frames along this command path B would not reach the remote PFED A' of EUD 2 and would have no functionality towards a PFED encryption channel. Rather, any command/action intended for Inner-INE along command path B would affect only that Inner-INE unit. This could be, for example, a socket connection acting as a trip wire to accomplish a kill switch for the EUD 1 transit channel, or any other suitable protocol necessary to accomplish the Agent's intended functionality.

Uses of the Agent are open-ended. It may be a machine configured for instance to control the connectivity of the EUD 1. It may even interact with the EUD 1 if needed for the intended application, and if that EUD 1 so permits.

EXAMPLES

Figure 13:
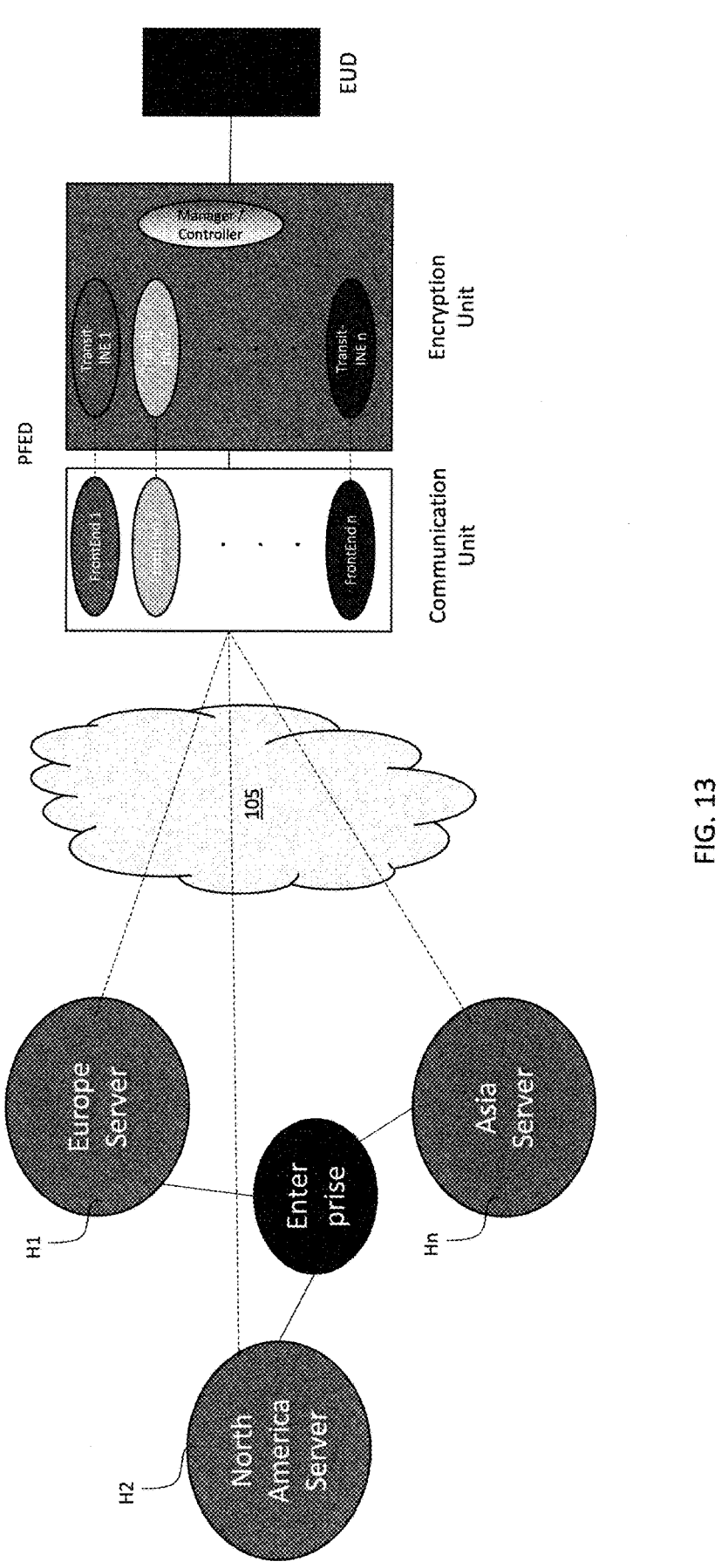
FIG. 13 is a schematic diagram illustrating certain aspects of one exemplary embodiment of the present invention configured for enterprise-wide application, adaptively establishing one of a plurality of main communication links with respective encrypting devices remotely distributed across an enterprise having multiple communication infrastructures.
Figure 13A:
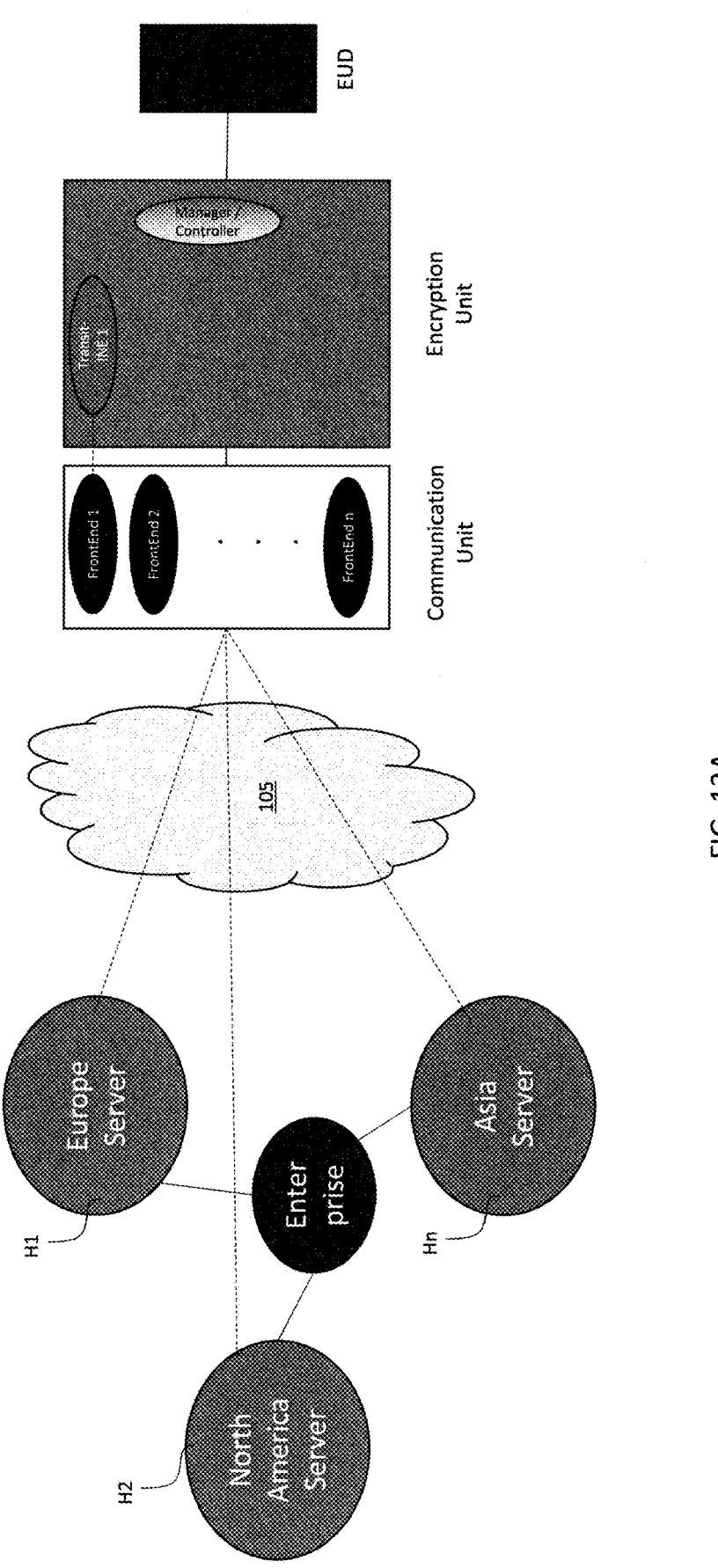
FIG. 13A is a schematic diagram illustrating certain aspects of an enterprise encrypting device server formed in accordance with one exemplary embodiment of the present invention for enterprise-wide application, adaptively establishing one of a plurality of main communication links to respective encrypting devices remotely distributed across an enterprise having multiple communication infrastructures.

FIGS. 13, 13A schematically illustrate variations of enterprise-wide applications of the trusted system to provide adaptive roaming of mobile trusted devices for functional tethering support by an optimally selected one of numerous available PFED server hubs of the enterprise. In the illustrated example, the enterprise includes a certain number n of hubs H1, H2, . . . Hn which are designated—by way of example—geographically to serve such regions as Europe, North America, . . . and Asia. Each trusted device is an EUD such as a mobile phone that is served by a multi-channel PFED encrypting device defining a plurality of alternative encryption channels for message transit. Each transit channel may be selectable to establish a main communication link (by which to transmit and receive message traffic) with one of a plurality of alternatively paired PFED encrypting devices. Each alternatively selectable channel in this embodiment accordingly includes a Transit-INE encryption unit and front end communication unit combination paired with corresponding units of a PFED encryption channel at one of the enterprise hubs H1, . . . Hn. Each channel's encryption unit portions are configured with separate keys for separate hubs. If fully equipped with a PFED encryption channel for each of the n enterprise hubs, the PFED device may support the EUD in this embodiment to functionally tether itself to any of the enterprise hubs H1, . . . Hn, whichever one provides optimal communications support at a given time and place.

So, for example, if an employee with a mobile phone that is supported by a single channel PFED device normally used in North America travels to Europe, communications to/from that mobile phone device would remain supported by the North America hub. This would be make for long distance calls with the latency, expense, and the like which comes typically with that. However, if the employee's mobile phone were equipped with the multiple PFED main encryption channel (transit) capability shown in FIG. 13, the PFED device's controller may execute to adaptively determine the optimal channel (and hub) to provide fastest and/or highest quality communication link to another PFED supported device.

Adaptive determination of optimal PFED channel may be carried out in any suitable manner known in the art. For example, when a user powers up the given PFED device upon arrival at a remote location, the PFED controller before passing any message traffic, and preferably as part of a boot sequence, may exercise each available encryption channel with a round trip timing test to a peer PFED device. The encryption channel yielding the shortest time would be activated for PFED support of the mobile phone. Such adaptive selection of the best PFED encryption channel may be continued to maintain optimally efficient yet trusted communication.

The enterprise-wide embodiment illustrated in FIG. 13A is similar to the enterprise-wide embodiment illustrated in FIG. 13, except that the given PFED device is equipped with a single-channel encryption unit but a multi-channel communication unit, as shown. So a plurality of alternatively selectable encryption channels are formed by the different combinations of encryption and particular communication units. The communication unit is actuated by the PFED controller to determine the shortest path to the destination using each FrontEnd 1, . . . FrontEnd n. Then all data coming from the encryption unit is routed to the FrontEnd adaptively selected by the process to be optimal in that regard.

A controller on the communication unit (not shown) may periodically check the timings and automatically shift to the FrontEnd offering the best path. No user interaction would be required to maintain the various encryption keys (for multiple encryption channels), and no communication would be required through the trust boundary between the communication and encryption units. The units would remain oblivious to each other.

If the mobile device's PFED were to re-key while connected to one hub's PFED server, and the FrontEnd in its communications unit transitions to another server in the meantime, a momentary mismatch in keys may occur between the corresponding PFED encryption units. Given the pair-wise only link inherent to PFED operation, the given PFED device may easily recover and re-key before resuming the flow of encrypted traffic. A suitable encrypted link known in the art with the capability to support more than two endpoints may be utilized to coordinate key updates in more complex manner, if necessary.

Figure 14:
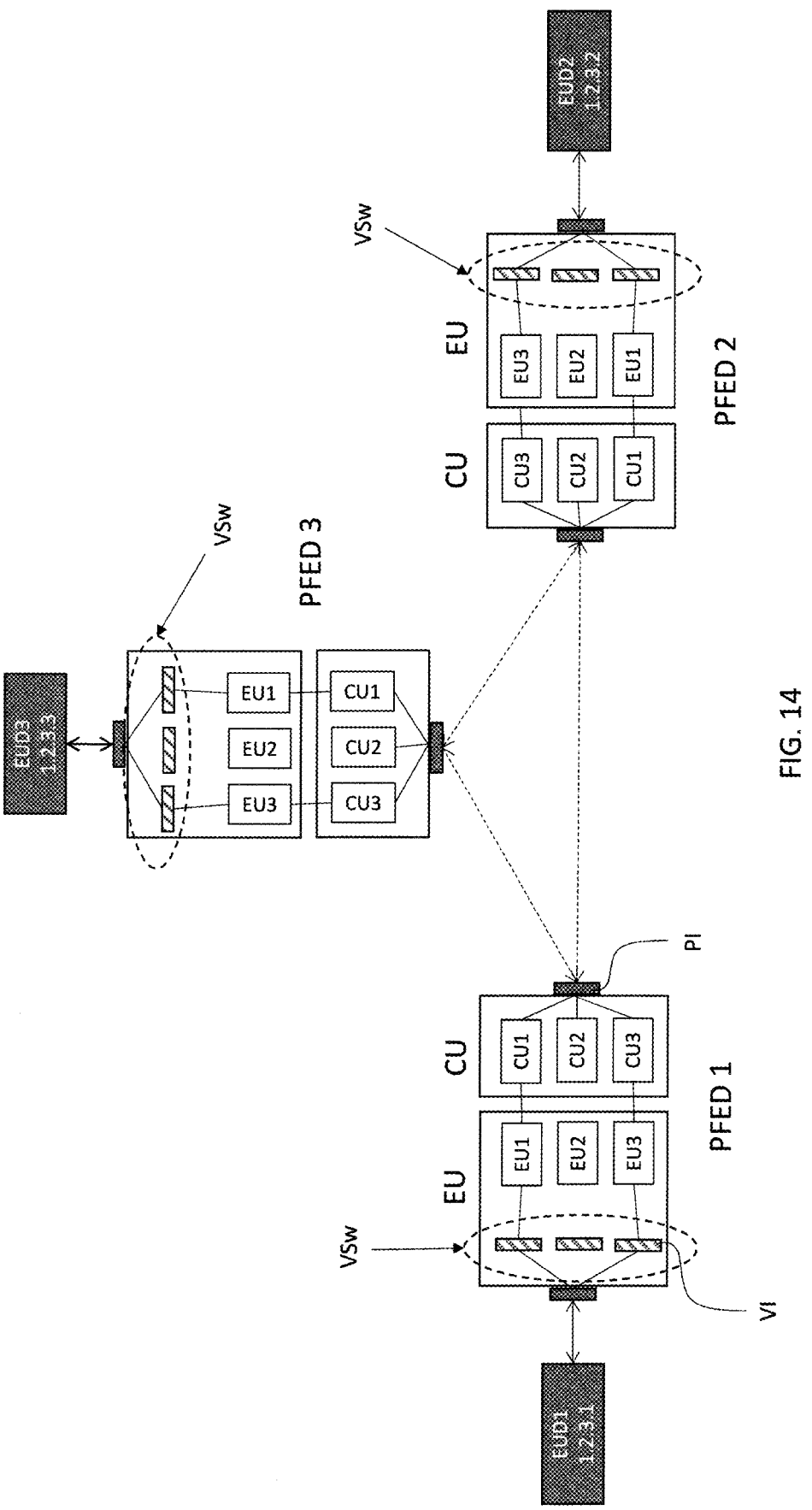
FIG. 14 is a schematic diagram illustrating certain aspects of encrypting devices of multi-channel configuration formed in accordance with an exemplary embodiment of the present invention cooperatively defining a mesh topology by which multiple combinations of encrypting devices may be selectively paired to establish main communication links therebetween.

FIG. 14 schematically illustrates an embodiment and application of the trusted system, wherein one or more encrypting devices PFED 1-PFED 3 may be suitably implemented with a multi-channel configuration by which multiple alternative encryption channels may be provided for selectively establishing main communication links with different ones of other encrypting device. The multi-channel encrypting device may be switched to cryptologically tether selectively to one of a plurality of other encrypting devices serving different trusted devices. A mesh topology with any suitable number of such switchable multi-channel PFED devices defining an addressable node may be formed thereby (not limited to just the three PFED nodes shown for illustrative purposes).

In the illustrated embodiment, the PFED device forming each node of the mesh topology is preferably formed with a plurality of channels defined by respective encryption and communication units (EU1-CU1, EU2-CU2, EU3-CU3) which are coupled preferably to virtually interfaced switches VI suitably implemented for instance by a software bridge or the like. Each PFED 1-PFED 3 device couples to a corresponding trusted device EUD1-EUD3 and to the untrusted network therebetween via suitable physical interfaces PL. In the example shown, each trusted device EUD1-EUD3 is illustratively addressed on a given mesh network 1.2.3.X at nodes 1.2.3.1, 1.2.3.2, 1.2.3.3.

Applications of such highly versatile mesh network of switchable PFED devices include for example Low Earth Orbit (LEO) satellite constellations in space requiring secure communications, which cannot maintain a hub and spoke topology because satellites positioned at opposite sides of the globe cannot reach a ground station (hub) at the same time. LEO's also require low SWAP and low cost because they typically have about 3-5 years of service life before they drop out of orbit and burn up.

A virtual switch is preferably though not necessarily implemented within the encryption unit of each PFED 1-PFED 3. Such virtual switch provides a degree of expandability that a physical switch external to the PFED cannot, since: 1) the physical switch would eventually run out of physical ports; and, 2) a data packet would not be labeled correctly to get to the correct EUD. An external switch box would serve only as a fixed router. With each node effectively formed by a multi-channel PFED, each path between nodes is independent both routing wise and cryptology wise. The channels of a PFED device on the trusted side are circuit switched while the channels on the untrusted side are packet switched. The banks of encryption and communication units EU, CU may be implemented virtually on a single machine. The trusted devices EUD 1-EUD 3 could add a routing feature that the PFED do not. For example, if EUD1 cannot reach EUD2 but is able to reach EUD3, and if EUD3 is able to reach EUD2, then EUD1 may send its message to EUD3, which may then forward on to EUD2.

Figure 14A:
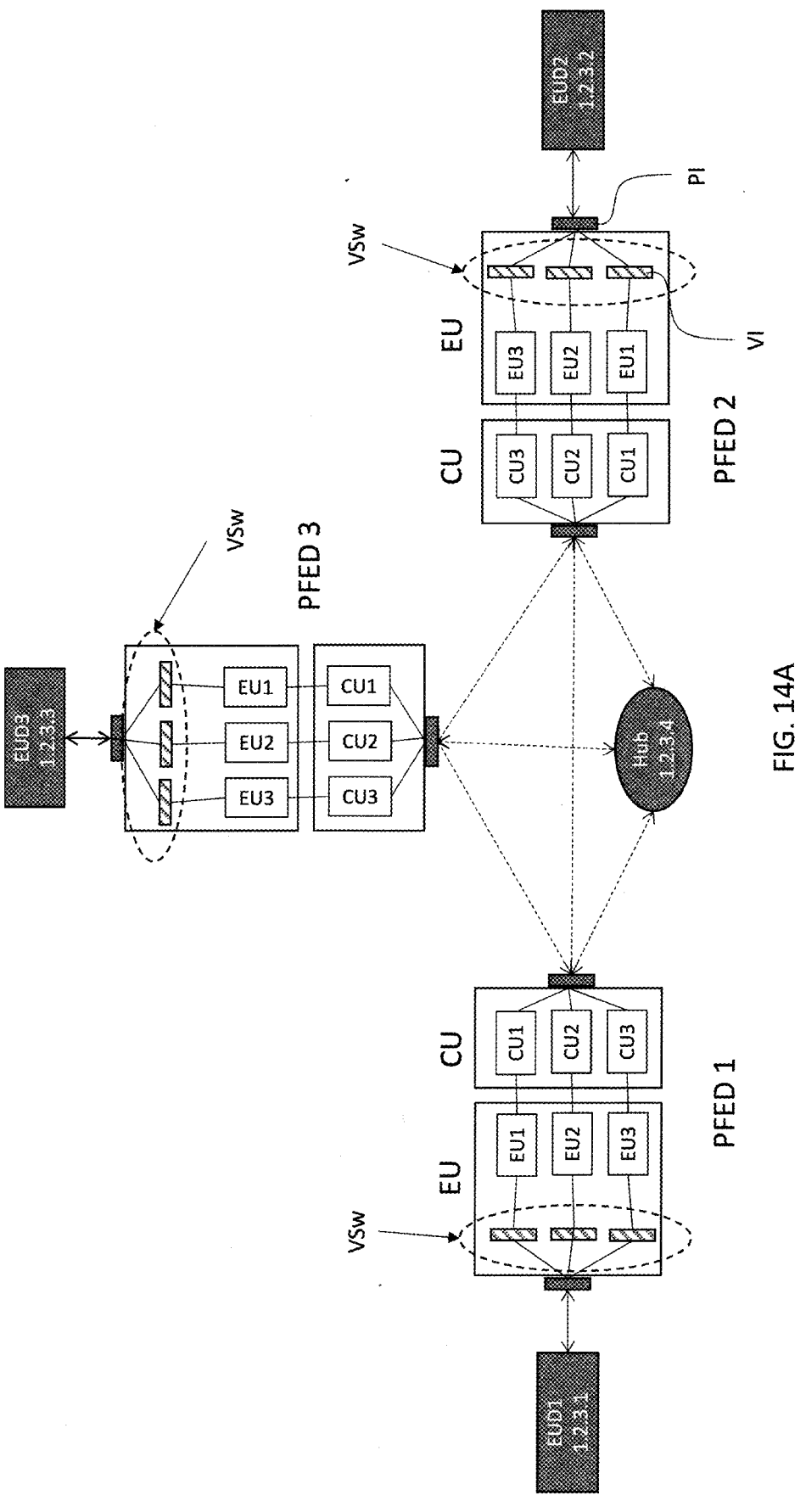
FIG. 14A is a schematic diagram illustrating certain aspects of encrypting devices of multi-channel configuration, where the encrypting devices are switchable to pair with one another directly in different selective combinations as in the embodiment of FIG. 14, and to pair indirectly in selective combinations through an encrypting device server in a hub & spoke enterprise application.

FIG. 14A schematically illustrates a variation of the preceding embodiment, where the encrypting devices PFED 1-PFED 3 are not only switchable to pair with one another directly in different selective combinations as shown in FIG. 14, they may also pair indirectly in selective combinations via hairpin routing through a PFED server hub of the given enterprise equipped with an adaptive Manager. In the interests of brevity and clarity, the hub's PFED devices are not separately shown. The need for such hairpin routing may arise, for example, if direct accessibility between any pair of PFED devices is interrupted or lost. They may yet be paired indirectly if they remain accessible to the hub server.

Figure 15:
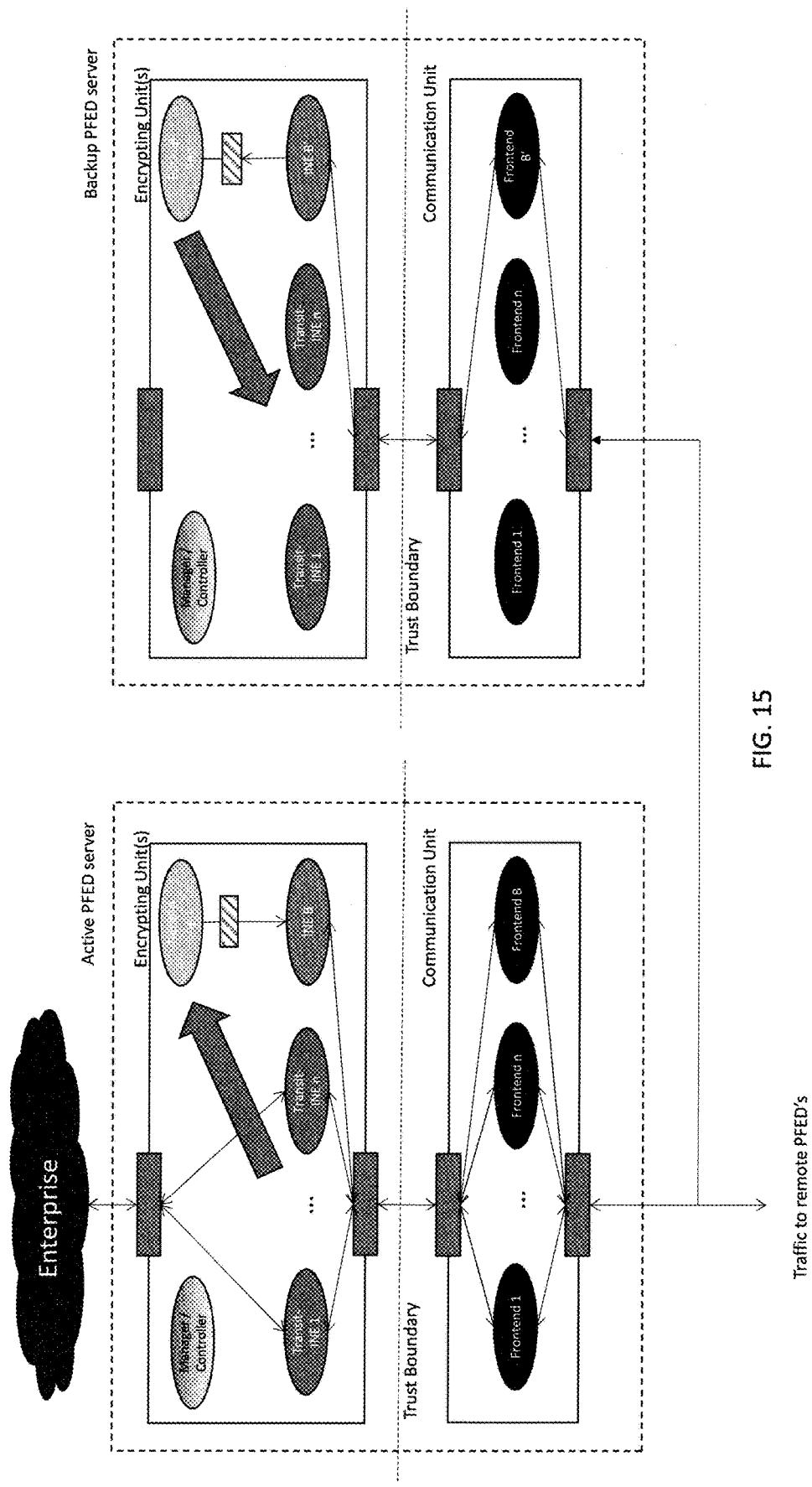
FIG. 15 is a schematic diagram illustrating certain aspects of an enterprise encrypting device server formed in accordance with another exemplary embodiment of the present invention, wherein an active enterprise encrypting device server is equipped with a backup encrypting device server.

FIG. 15 schematically illustrates a trusted system according to another alternate embodiment of the present invention, wherein an Active PFED server is equipped with a Backup PFED server as shown. The Active PFED server shown normally operates to control n traffic channels, each with its own Transit-INE encryption portion. The Backup PFED server is preferably a duplicate of the Active PFED server, and is connected only to that Active PFED server. When a channel is subjected to an event that changes its underlying state/configuration, a Backup Application process executes to detect the change and communicates the changeover to a backup encryption portion INE B (within a backup channel). The Backup Application process runs on the backup PFED server provided as shown. This could happen in real-time or at scheduled intervals. Then when the running Active PFED server encounters a disruption, the Backup PFED server activates to continue processing the flow of encrypted traffic in place of the Active PFED server.

The Backup PFED server may be disposed physically adjacent to the Active PFED server, or it may be disposed remotely therefrom. The PFED link between INE B and INE B' enables this remote disposition. Plaintext key material that normally would not leave an existing computing unit without additional protection (e.g. encrypting with a separate process and/or interface) can safely be sent in the clear to the remote end as-is and through the existing interface path. The cryptologic tethering between PFED linked trusted environments ensures that no key material appears in plaintext form outside the trust boundary. Still, complete separation often presents problems with normal IT processes which must be suitably addressed.

Figure 16:
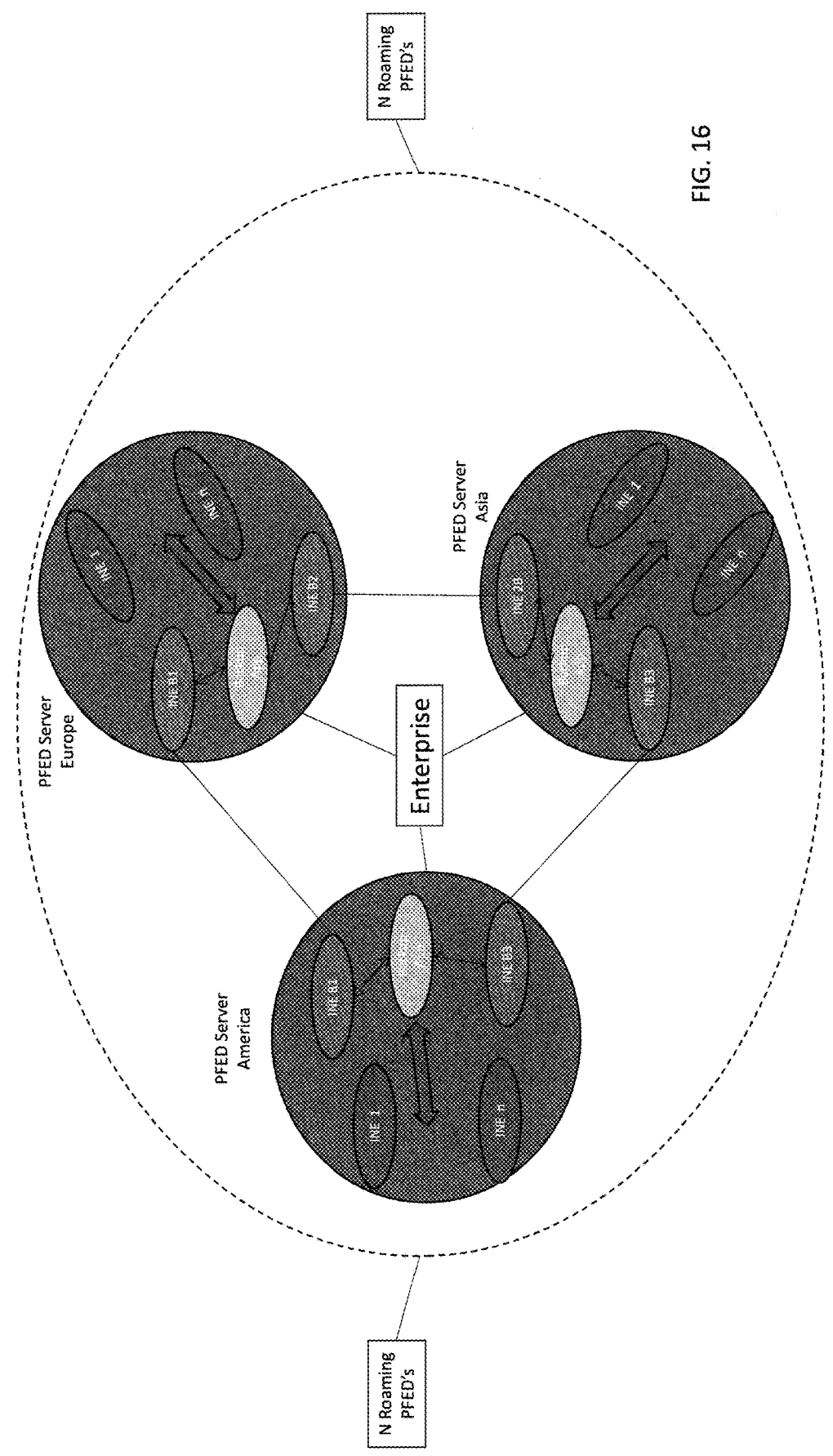
FIG. 16 is a schematic diagram illustrating an exemplary an enterprise-wide application of the embodiment of FIG. 15, wherein a plurality of backup-equipped enterprise encrypting device servers are employed within respective hubs of the enterprise.

FIG. 16 schematically illustrates an enterprise-wide application of the trusted system with backup-equipped PFED servers such as illustrated in FIG. 15 employed within respective hubs of the enterprise. This application reflects the combination of the PFED device roaming capability with a distributed set of access points across the enterprise that automatically synchronize the cryptography using the backup channels (between matched backup encryption unit portions INE B1, INE B2, INE B3) between each PFED server. In the case illustrated, a single roaming PFED encryption unit INE does not experience disruption as it transitions between each access point, even in the event of a potential key mismatch. Additionally, this embodiment is resilient in the sense that if one node (PFED server of a hub) were to go down, it is backed up to the other two PFED servers linked thereto, and may be re-constituted quickly and easily.

Figure 17:
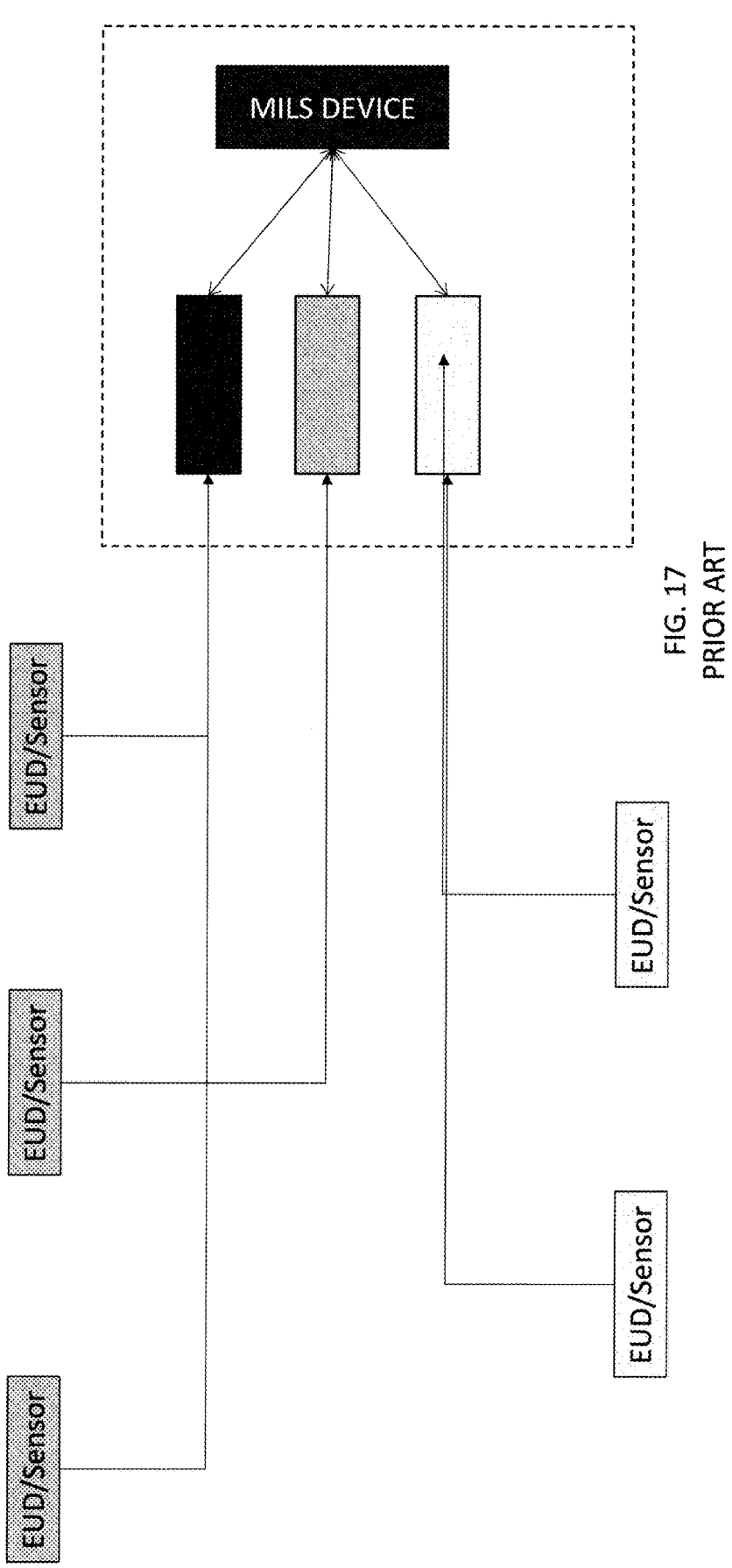
FIG. 17 is a schematic diagram illustrating an example of a conventional architecture to preserve high assurance by maintaining physical or virtually partitioned separation between communication paths for various trusted and untrusted components; and, FIG. 17A is a schematic diagram illustrating the example shown in FIG. 17 but with a trusted system incorporated in accordance with various embodiments of the present invention to preserve high assurance while permitting shared use of a common communication path.

FIG. 17 schematically illustrates a conventional application employing Multiple Independent Levels of Security/Safety (MILS) architecture where high assurance is preserved by effectively maintaining physical or suitably partitioned separation between communication paths for various trusted and untrusted components. Components assigned to different segregated communication paths are non-bypassable. That is, the components cannot use other communication paths, nor can they bypass any security monitors that are in place. End user devices/sensors of multiple trust levels of security communicate with a given MILS device through respective dedicated busses and interfaces as shown. In such applications, high assurance is maintained at the expense of flexibility and adaptability in architecture.

Figure 17A:
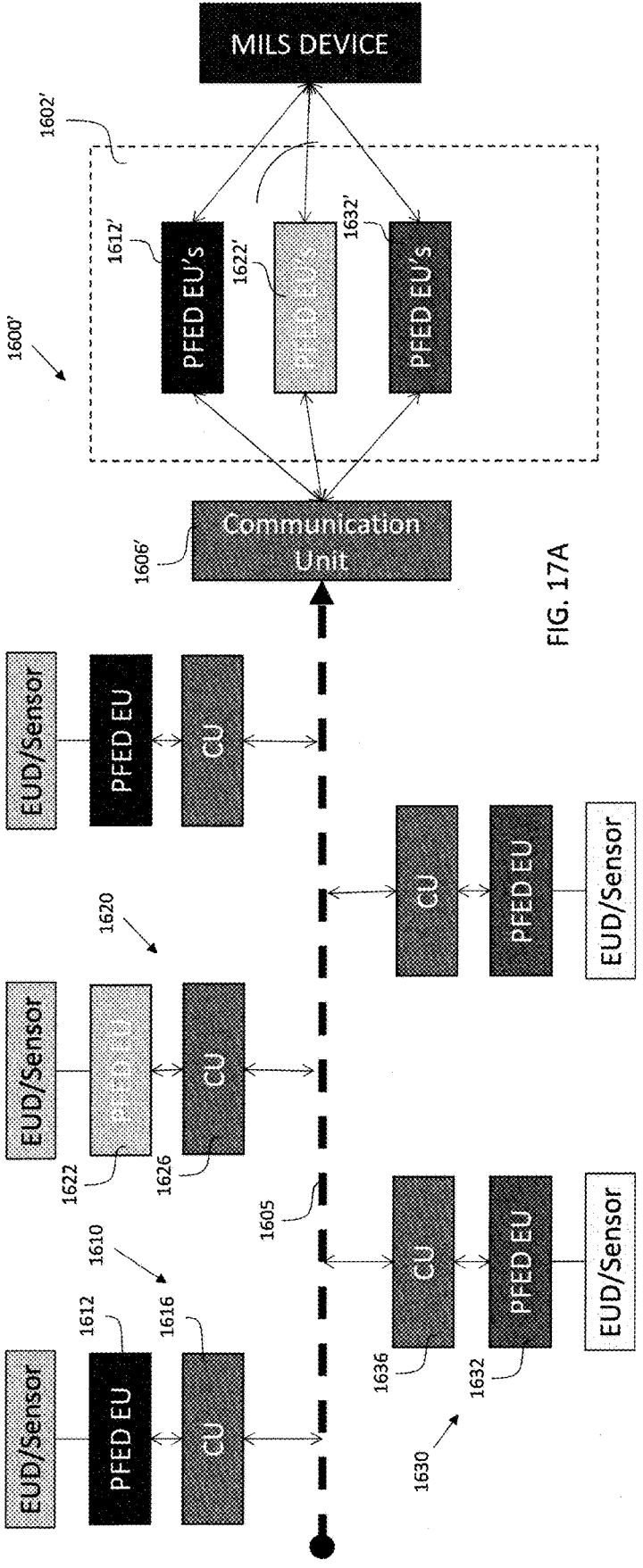

FIG. 17A schematically illustrates in contrast one exemplary embodiment of the present invention implemented in a MILS application to preserve high assurance separation of different security classification levels while permitting their shared use of a common communication path. As shown, a plurality of EUD/Sensor components at different security share a common communication path 1605, such as a shared bus, to communicate with a MILS device. The physical separation provided by dedicated busses for the different classification levels is replaced by cryptographic separation, greatly simplifying the physical implementation of the MILS device. As shown, each of the EUD/Sensor components communicates with the MILS device through with a modular pairing of PFED encrypting devices. This not only obviates the need for separate physical wiring to protectively segregate different classification level communications, but also permits the use of a common communication path 1605 disposed in an untrusted environment.

Each EUD/Sensor component is served by its own designated PFED encrypting device 1610, 1620, 1630 duly configured for the given component's security level. The MILS device is correspondingly served by a multi-transit channeled PFED encrypting device 1600'. The EUD/Sensor components' PFED devices 1610, 1620, 1630 each include an encryption unit 1612, 1622, 1632 suitably configured for its given security classification level, as well as a communications unit 1616, 1626, 1636 by which message traffic may be bidirectionally conveyed to/from a communications unit 1606' of the MILS device. The MILS device includes a bank of encryption units 1602' defining one or more individual encryption units 1612', 1622', 1632' paired with one of the EUD/Sensor components' encryption units 1612, 1622, 1632. In this way, a trusted communication link may be established between each EUD/Sensor component and the MILS device through a corresponding channel of the PFED device 1600'.

Although this invention has been described in connection with specific embodiments and forms thereof, it will be appreciated that various modifications other than those described or mentioned above may be resorted to without departing from the spirit or scope of the invention as defined in the appended claims. For example, functionally equivalent elements may be substituted for those specifically shown and described, certain features may be used independently of other features, and in certain cases, particular locations of elements or particular ordering of method steps or processes may be reversed or interposed, all without departing from the spirit or scope of the invention as defined in the appended claims.

What is claimed is:

1. A high assurance system for maintaining secure communication between trusted user devices in adaptable manner across an untrusted environment, comprising:

first and second main encrypting devices respectively coupled to the trusted user devices, said first and second main encrypting devices being cryptologically tethered to one another by a main communication link established exclusively therebetween to traverse the untrusted environment in cryptologically protected manner; and, at least one auxiliary encrypting device coupled to a trusted auxiliary device, said auxiliary encrypting device being cryptologically tethered to said first main encrypting device by an auxiliary communication link established exclusively therebetween to traverse the untrusted environment between one of the trusted user devices and the trusted auxiliary device in cryptologically protected manner;

wherein each of said main and auxiliary encrypting devices includes a processor and memory, and each of said main and auxiliary communication links established between tethered encrypting devices maintains logical and physical isolation of the trusted user devices coupled to said tethered encrypting devices from the untrusted environment in a manner independent of any communication protocol of the untrusted environment; and, wherein each of said main and auxiliary encrypting devices defines a portal for traversing a trust boundary between trusted and untrusted environments, and each of said main and auxiliary encrypting devices includes:

at least one encryption unit configured to encrypt message data for transmission and decrypt received encrypted message data; and, at least one communication unit coupled to said encryption unit by a connectionless interconnect, said communication unit being configured to transmit and receive encrypted message data through a corresponding one of said main and auxiliary communication links.

2. The system as recited in claim 1, wherein:

said communication unit is disposed in the untrusted environment;

at least said first main encrypting device is of multi-channel configuration defining a plurality of channels, said first main encrypting device including:

a transit channel having at least one said encryption unit for encrypting and decrypting message data passing through said main communication link;

at least one auxiliary channel having at least one said encryption unit for encrypting and decrypting message data passing through said auxiliary communication link; and, a manager unit coupled to said transit and auxiliary channels for controlling said encryption units thereof.

3. The system as recited in claim 2, comprising a plurality of said auxiliary encrypting devices coupled respectively to a plurality of trusted auxiliary devices, and said first main encrypting device defines a plurality of auxiliary channels, wherein:

a first of the trusted auxiliary devices includes an authentication token, said first auxiliary encrypting device coupling the authentication token through a first auxiliary communication link to said first main encrypting device for adaptively optimized activation thereof; and, a second of the trusted auxiliary devices defining a management console for driving selective reconfiguration of said first main encrypting device, said second auxiliary encrypting device coupling the management console through a second auxiliary communication link to said first main encrypting device for adaptively optimized reconfiguration thereof.

4. The system as recited in claim 2, wherein each of said main and auxiliary encrypting devices includes at least one channel formed by a plurality of said encryption units disposed in a multiple inline encryption unit configuration, said plurality of encryption units defining at least inner and outer inline network encryption (INE) portions disposed along the channel.

5. The system as recited in claim 4, wherein:

the trusted auxiliary device includes an authentication token, said auxiliary encrypting device coupling the authentication token through said auxiliary communication link to said first main encrypting device for multifactored activation thereof; and, the authentication token forms a wireless crypto-ignition key (CIK) token having a predetermined proximity range, the wireless CIK token being inoperable when disposed beyond the predetermined proximity range relative to said first main encrypting device.

6. The system as recited in claim 4, wherein the trusted auxiliary device includes a management console for driving selective reconfiguration of said first main encrypting device, said auxiliary encrypting device coupling said management console through said auxiliary communication link to said first main encrypting device for adaptively optimized reconfiguration thereof.

7. The system as recited in claim 6, wherein said first main encrypting device includes an agent unit operably coupled to an inner INE portion of said auxiliary channel for cryptologically tethered communication with said management console, said agent unit being configured responsive to said management console to monitor communication traffic between said first main encrypting device and the trusted user device coupled thereto.

8. The system as recited in claim 4, further comprising a management console disposed in locally integrated manner within the trusted environment of said first main encrypting device for driving selective reconfiguration thereof, said management console being operably coupled to said manager unit of said first main encrypting device by both a data channel and a command-response channel, wherein commands are passed between said management console and said manager unit in vectorized form for optimal local isolation therebetween.

9. The system as recited in claim 1, further comprising:

an enterprise server configured to include a plurality of said second main encrypting devices for a plurality of trusted user devices and a manager unit coupled to said second main encrypting devices for controlling said encryption units thereof, said enterprise server adaptively establishing different main communication links between said first main encrypting device and selected ones of said second main encrypting devices; and, a management console disposed in locally integrated manner within the trusted environment of said enterprise server for driving selective reconfiguration of said second main encrypting devices thereof, said management console being operably coupled to said manager unit of said enterprise server by both a data channel and a command-response channel, wherein commands are passed between said management console and said manager unit in vectorized form for optimal local isolation therebetween.

10. A trusted system for cryptologically secured communication in adaptable manner between remotely disposed trusted devices operating within respective trusted environments separated by an untrusted environment, comprising:

a plurality of encrypting devices respectively coupled to different trusted devices, corresponding ones of said encrypting devices being mutually paired to establish a uniquely dedicated communication link therebetween across the untrusted environment, said encrypting devices being thereby cryptologically tethered;

at least one of said encrypting devices having a multi-channel configuration defining a plurality of encryption channels;

wherein each of said encrypting devices includes a processor and memory, and each of said communication links established between mutually paired encrypting devices maintains logical and physical isolation between the trusted and untrusted environments in a manner independent of any communication protocol of the untrusted environment; and, wherein each of said encrypting devices defines a portal for traversing a trust boundary between trusted and untrusted environments, and each of said encrypting devices includes:

at least one encryption unit configured to encrypt data traffic for transmission and decrypt received encrypted data traffic; and, at least one communication unit coupled to said encryption unit by a connectionless interconnect, said communication unit being configured to transmit and receive encrypted data traffic through a corresponding communication link.

11. The trusted system as recited in claim 10, wherein:

said encrypting device of multi-channel configuration includes:

a transit channel having at least one said encryption unit for encrypting and decrypting message data passing through a first of said communication links;

at least one auxiliary channel having at least one said encryption unit for encrypting and decrypting message data passing through a second of said communication links; and, a manager unit coupled to said transit and auxiliary channels for controlling said encryption units thereof; and, at least one of the trusted devices includes a management console coupled through one of said communication links to said auxiliary channel of said multi-channel encrypting device for adaptively optimized reconfiguration thereof.

12. The trusted system as recited in claim 11, wherein said multi-channel encrypting device includes an agent unit operably coupled to an encryption unit of said auxiliary channel for cryptologically tethered communication with said management console, said agent unit being configured responsive to said management console to monitor communication traffic between said multi-channel encrypting device and the trusted user device coupled thereto.

13. The trusted system as recited in claim 11, wherein:
said encrypting device of multi-channel configuration includes a plurality of auxiliary channels; and,
at least one of the trusted devices includes an authentication token coupled through one of said communication links to one of said auxiliary channels of said multi-channel encrypting device for multifactored activation thereof.

14. A high assurance method for cryptologically tethered communication in adaptable manner between first and second user devices operating within respective trusted environments separated by an untrusted environment, comprising:
establishing at least one set of first and second main encrypting devices coupled respectively to the first and second user devices, said first and second main encrypting devices each having a processor and memory;
mutually pairing said first and second main encrypting devices to establish a uniquely dedicated main communication link therebetween across the untrusted environment;
establishing at least one auxiliary encrypting device coupled to an auxiliary device operating within a trusted environment, said auxiliary encrypting device having a processor and memory;
mutually pairing said first main encrypting device and said auxiliary encrypting device to establish a uniquely dedicated auxiliary communication link therebetween across the untrusted environment; and,
establishing said main and auxiliary communication links between mutually paired encrypting devices to maintain logical and physical isolation between the trusted and untrusted environments in a manner independent of any communication protocol of the untrusted environment, said main and auxiliary communication links thereby defining a portal traversing a trust boundary between the trusted and untrusted environments; and,
wherein each of said main and auxiliary encrypting devices:
executes at least one encryption unit to encrypt message data for transmission and decrypt received encrypted message data; and,
executes at least one communication unit coupled to said encryption unit by a connectionless interconnect to transmit and receive encrypted message data through a corresponding one of said main and auxiliary communication links.

15. The method as recited in claim 14, wherein:
said communication unit is executed in the untrusted environment; and,
at least said first main encrypting device is established to be of multi-channel configuration defining a plurality of channels, said first main encrypting device thereby establishing:
a transit channel wherein at least one said encryption unit is executed for encrypting and decrypting message data passing through said main communication link;
at least one auxiliary channel wherein at least one said encryption unit is executed for encrypting and decrypting message data passing through said auxiliary communication link; and,
a manager unit executed to control said encryption units of said transit and auxiliary channels.

16. The method as recited in claim 15, comprising coupling a plurality of said auxiliary encrypting devices respectively to a plurality of trusted auxiliary devices, and
configuring said first main encrypting device to define a plurality of auxiliary channels, wherein:
a first of the trusted auxiliary devices includes an authentication token coupled by said first auxiliary encrypting device through a first auxiliary communication link for adaptively optimized activation of said first main encrypting device; and,
a second of the trusted auxiliary devices defines a management console executable to drive selective reconfiguration of said first main encrypting device, said second auxiliary encrypting device coupling the management console through a second auxiliary communication link for adaptively optimized reconfiguration of said first main encrypting device.

17. The method as recited in claim 15, wherein:
the trusted auxiliary device is configured to include an authentication token coupled by said auxiliary encrypting device through said auxiliary communication link for multifactored activation of said first main encrypting device; and,
the authentication token is configured to remain inoperable beyond a predetermined proximity range relative to said first main encrypting device.

18. The method as recited in claim 15, wherein the trusted auxiliary device is configured to include a management console for driving selective reconfiguration of said first main encrypting device, said auxiliary encrypting device coupling said management console through said auxiliary communication link for adaptively optimized reconfiguration of said first main encrypting device.

19. The method as recited in claim 18, wherein said first main encrypting device is configured to include an agent unit operably coupled to an inner INE portion of said auxiliary channel for cryptologically tethered communication with said management console, said agent unit being configured responsive to said management console to monitor communication traffic between said first main encrypting device and the trusted user device coupled thereto.

20. The system as recited in claim 14, further comprising:
establishing an enterprise server to include a plurality of said second main encrypting devices for a plurality of trusted user devices and a manager unit coupled to said second main encrypting devices for controlling said encryption units thereof;

adaptively establishing different main communication links between said first main encrypting device and selected ones of said second main encrypting devices of said enterprise server;

locally integrating a management console within the trusted environment of said enterprise server for driving selective reconfiguration of said second main encrypting devices thereof;

operably coupling said management console to said manager unit of said enterprise server by both a data channel and a command-response channel; and, passing commands between said management console and said manager unit in vectorized form for optimal local isolation therebetween.

\* \* \* \* \*